US012209951B2

United States Patent
Mehta et al.

(10) Patent No.: US 12,209,951 B2
(45) Date of Patent: Jan. 28, 2025

(54) METHOD AND SYSTEM FOR SPECTRAL IMAGING OF DENSITY, ANISOTROPY, AND ORIENTATION

(71) Applicant: CZ Biohub SF, LLC, San Francisco, CA (US)

(72) Inventors: Shalin Mehta, San Francisco, CA (US); Ivan Ivanov, San Francisco, CA (US); Li-Hao Yeh, San Francisco, CA (US)

(73) Assignee: CZ Biohub SF, LLC, San Francisco, CA (US)

( * ) Notice: Subject to any disclaimer, the term of this patent is extended or adjusted under 35 U.S.C. 154(b) by 137 days.

(21) Appl. No.: 18/055,984

(22) Filed: Nov. 16, 2022

(65) Prior Publication Data

US 2023/0124259 A1      Apr. 20, 2023

Related U.S. Application Data

(63) Continuation of application No. PCT/US2021/034243, filed on May 26, 2021.
(Continued)

(51) Int. Cl.
   *G01N 21/21*      (2006.01)
   *G01N 21/31*      (2006.01)

(52) U.S. Cl.
   CPC ............ *G01N 21/21* (2013.01); *G01N 21/31* (2013.01); *G01N 2201/02* (2013.01); *G01N 2201/127* (2013.01)

(58) Field of Classification Search
   CPC ..... G01J 4/00; G01N 2021/217; G01N 21/21; G01N 21/274; G01N 21/31;
(Continued)

(56) References Cited

U.S. PATENT DOCUMENTS

| 7,289,211 B1 | 10/2007 | Walsh, Jr. et al. |
| 2016/0041064 A1 | 2/2016 | Morishita |

(Continued)

FOREIGN PATENT DOCUMENTS

CN         103134756 A    6/2013

OTHER PUBLICATIONS

International Application No. PCT/US2021/034243, International Preliminary Report on Patentability mailed on Dec. 8, 2022, 12 pages.
(Continued)

*Primary Examiner* — Hina F Ayub
(74) *Attorney, Agent, or Firm* — Kilpatrick Townsend & Stockton LLP

(57) ABSTRACT

A method of measuring optical properties of a specimen includes generating illumination light at a plurality of illumination wavelengths and, for each of the plurality of illumination wavelengths, directing the illumination light to impinge on the specimen, collecting sample light passing through the specimen, and detecting the collected sample light using a polarization state analyzer to form a set of polarization channels. The method also includes receiving a calibration tensor, converting the set of polarization channels for each of the illumination wavelengths into Stokes parameter maps using the calibration tensor, denoising the Stokes parameter maps, and deconvolving the Stokes parameter maps to provide density, anisotropy, and orientation measurements of the specimen. The method can multiplex intrinsic density, anisotropy, and orientation measurements of the specimen and density, anisotropy, and orientation measurements of labeled fluorescent molecules.

18 Claims, 33 Drawing Sheets

Related U.S. Application Data

(60) Provisional application No. 63/030,839, filed on May 27, 2020.

(58) Field of Classification Search
CPC .......... G01N 21/6458; G01N 2201/02; G01N 2201/127; G02B 21/0092
See application file for complete search history.

(56) References Cited

U.S. PATENT DOCUMENTS

| | | |
|---|---|---|
| 2017/0196459 A1 | 7/2017 | Lam et al. |
| 2019/0154783 A1 | 5/2019 | Kaditz et al. |
| 2021/0103011 A1* | 4/2021 | Noh .................... G01R 33/032 |

OTHER PUBLICATIONS

International Application No. PCT/US2021/034243, International Search Report and Written Opinion mailed on Sep. 27, 2021, 13 pages.

\* cited by examiner

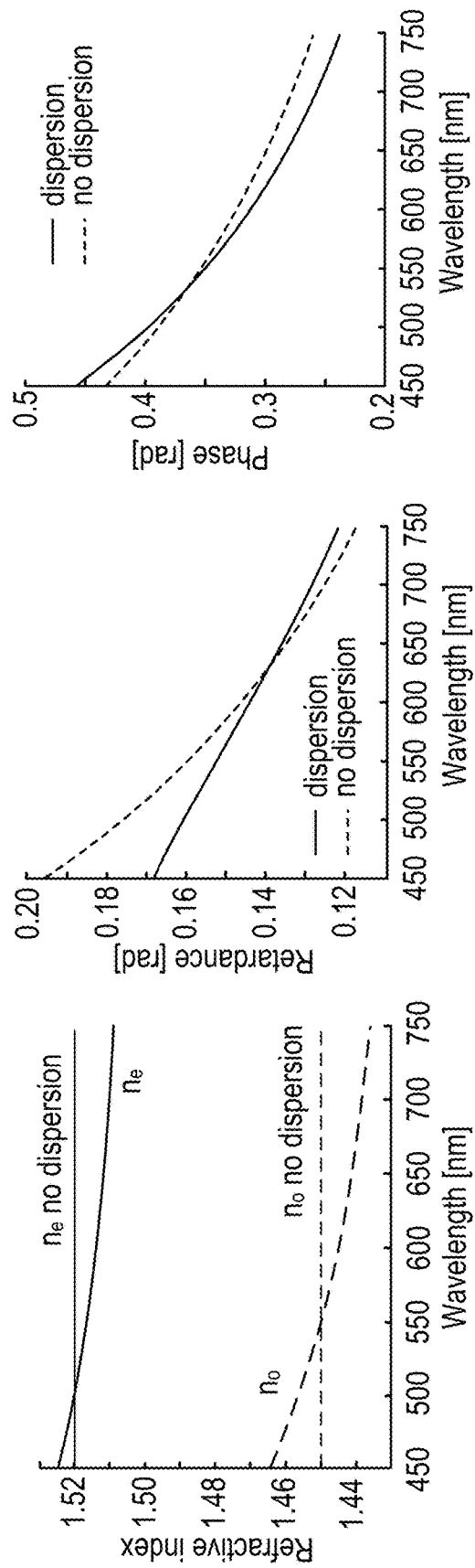
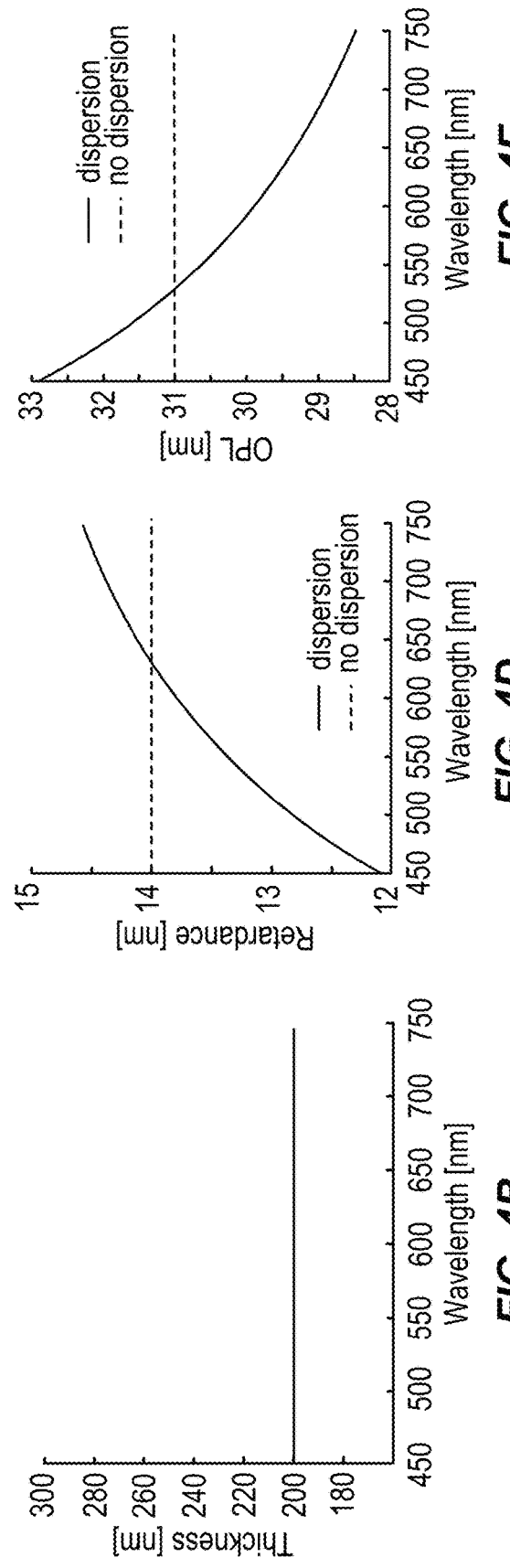
FIG. 4A  FIG. 4C  FIG. 4E
FIG. 4B  FIG. 4D  FIG. 4F

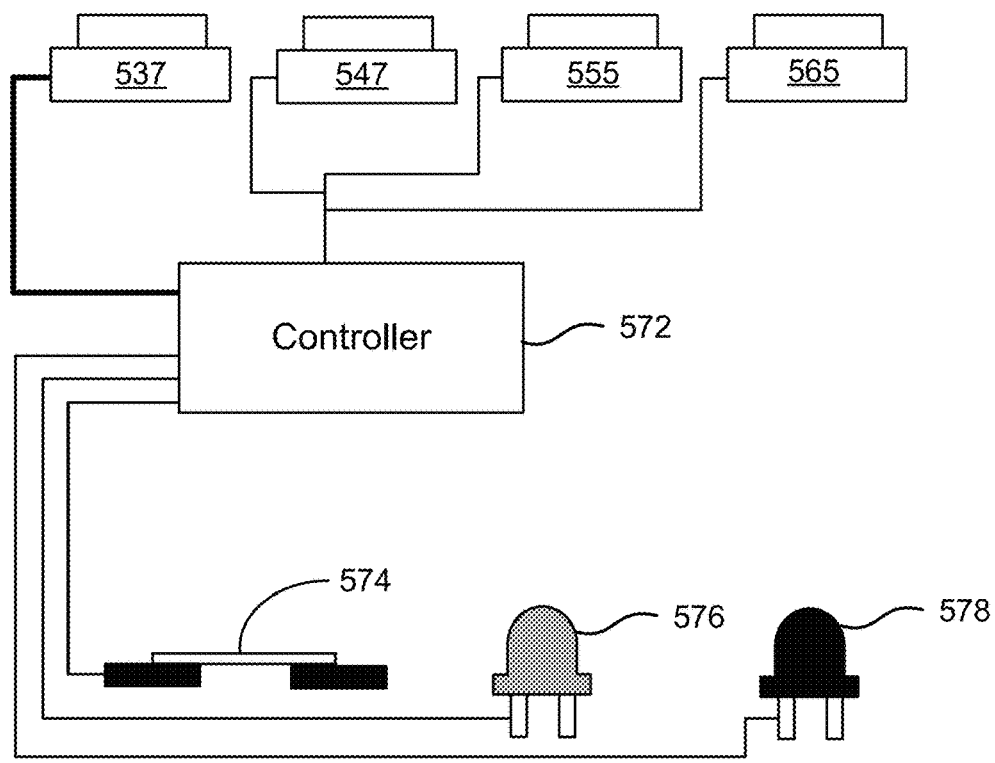
FIG. 5B
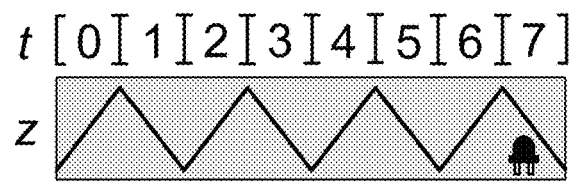
FIG. 5C
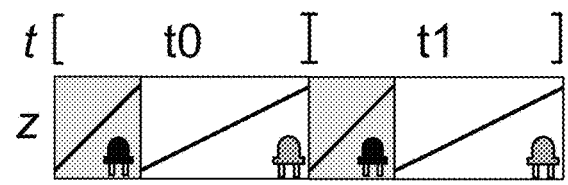
FIG. 5D

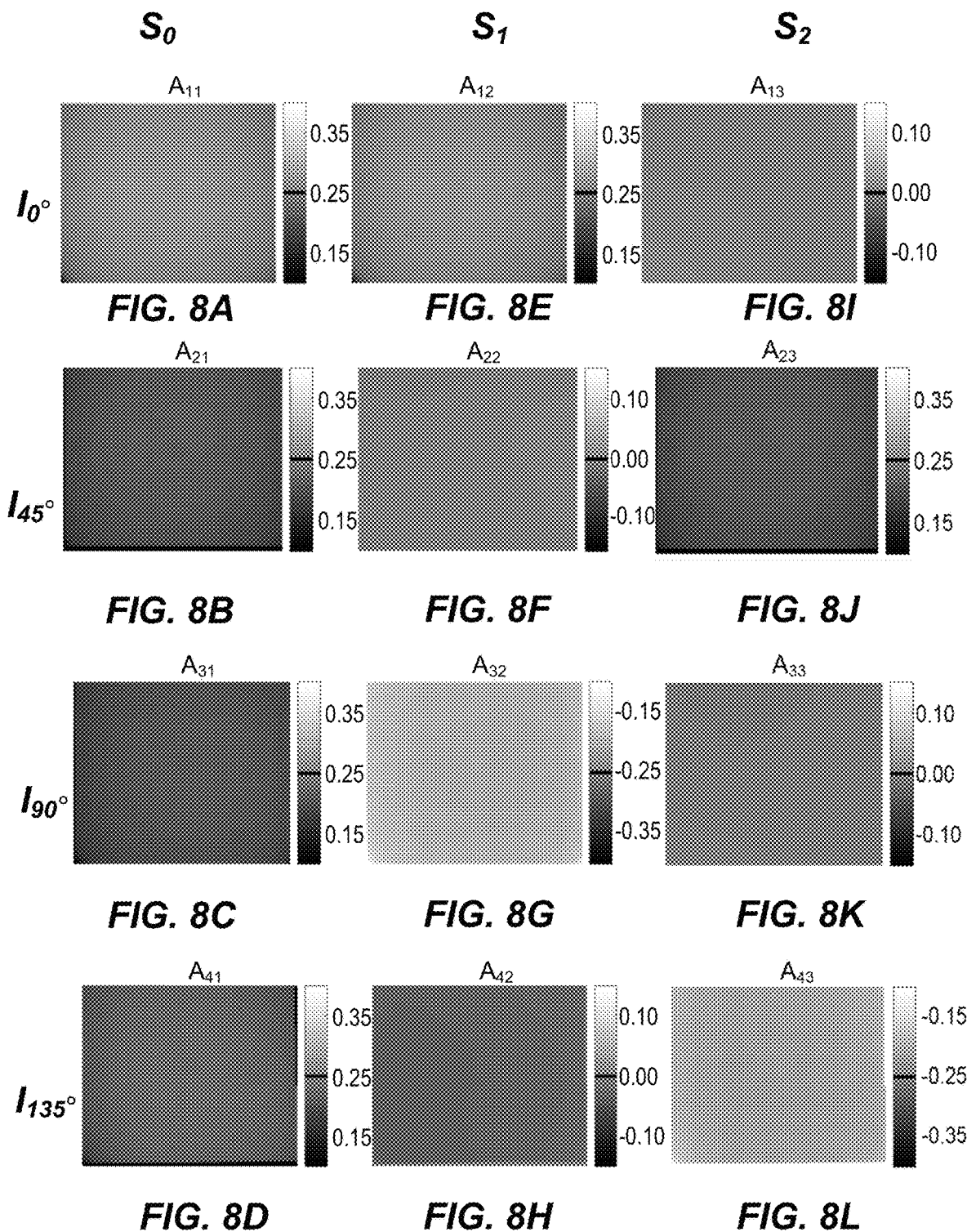

| Wavelength | 435 nm | 460 nm | 500 nm | 525 nm |
|---|---|---|---|---|
| $S_{in,\lambda}$ | $\begin{bmatrix} 1 \\ 0.029 \\ 0.126 \end{bmatrix}$ | $\begin{bmatrix} 1 \\ -0.004 \\ 0.102 \end{bmatrix}$ | $\begin{bmatrix} 1 \\ -0.030 \\ 0.074 \end{bmatrix}$ | $\begin{bmatrix} 1 \\ -0.050 \\ 0.064 \end{bmatrix}$ |
| $A_\lambda$ | $\begin{bmatrix} 0.254 & 0.252 & -0.002 \\ 0.175 & 0.028 & -0.165 \\ 0.186 & -0.189 & -0.002 \\ 0.218 & -0.051 & 0.200 \end{bmatrix}$ | $\begin{bmatrix} 0.279 & 0.277 & 0.000 \\ 0.202 & 0.031 & -0.195 \\ 0.197 & -0.199 & -0.006 \\ 0.259 & -0.079 & 0.236 \end{bmatrix}$ | $\begin{bmatrix} 0.275 & 0.274 & -0.010 \\ 0.208 & -0.004 & -0.208 \\ 0.191 & -0.191 & -0.011 \\ 0.232 & -0.043 & 0.220 \end{bmatrix}$ | $\begin{bmatrix} 0.279 & 0.279 & -0.001 \\ 0.207 & -0.014 & -0.208 \\ 0.190 & -0.188 & -0.013 \\ 0.234 & -0.027 & 0.224 \end{bmatrix}$ |

| Wavelength | 580 nm | 660 nm | 740 nm | 770 nm |
|---|---|---|---|---|
| $S_{in,\lambda}$ | $\begin{bmatrix} 1 \\ -0.055 \\ 0.059 \end{bmatrix}$ | $\begin{bmatrix} 1 \\ -0.075 \\ 0.051 \end{bmatrix}$ | $\begin{bmatrix} 1 \\ -0.074 \\ 0.059 \end{bmatrix}$ | $\begin{bmatrix} 1 \\ -0.070 \\ 0.072 \end{bmatrix}$ |
| $A_\lambda$ | $\begin{bmatrix} 0.289 & 0.289 & 0.000 \\ 0.211 & -0.013 & -0.211 \\ 0.196 & -0.194 & -0.015 \\ 0.253 & -0.026 & 0.242 \end{bmatrix}$ | $\begin{bmatrix} 0.264 & 0.265 & -0.001 \\ 0.190 & 0.026 & -0.188 \\ 0.200 & -0.195 & -0.018 \\ 0.237 & -0.027 & 0.223 \end{bmatrix}$ | $\begin{bmatrix} 0.243 & 0.244 & -0.001 \\ 0.228 & -0.066 & -0.220 \\ 0.242 & -0.234 & -0.020 \\ 0.241 & -0.028 & 0.231 \end{bmatrix}$ | $\begin{bmatrix} 0.214 & 0.215 & -0.001 \\ 0.260 & 0.091 & -0.247 \\ 0.262 & -0.252 & -0.020 \\ 0.256 & -0.025 & 0.229 \end{bmatrix}$ |

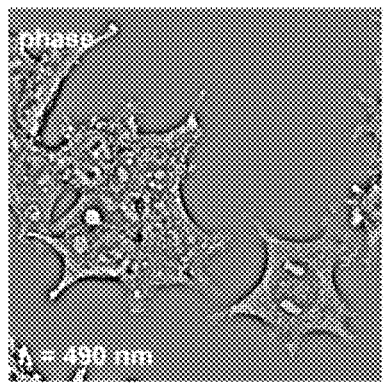
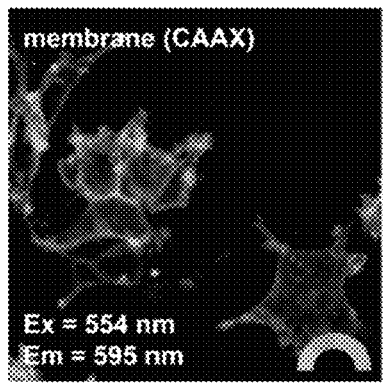
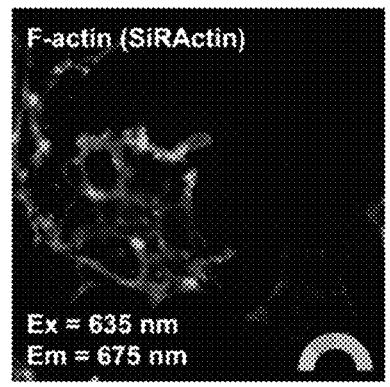
*FIG. 26A*  *FIG. 26B*  *FIG. 26C*
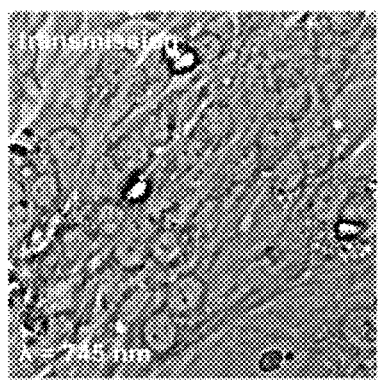
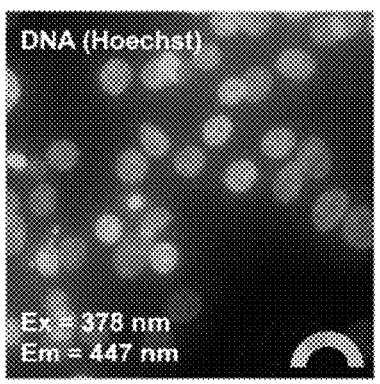
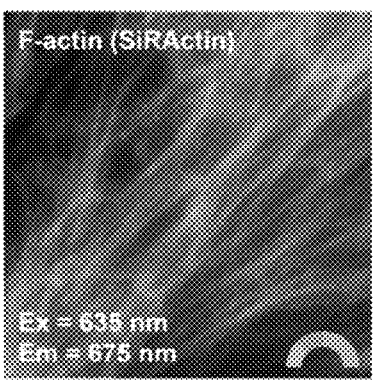
*FIG. 26D*  *FIG. 26E*  *FIG. 26F*

METHOD AND SYSTEM FOR SPECTRAL IMAGING OF DENSITY, ANISOTROPY, AND ORIENTATION

CROSS-REFERENCES TO RELATED APPLICATIONS

This application is a continuation of International Patent Application No. PCT/US2021/034243, filed May 26, 2021, entitled "Method and System for Spectral Imaging of Density, Anisotropy, and Orientation," which claims priority to U.S. Provisional Patent Application No. 63/030,839, filed on May 27, 2020, entitled "Method and System for Spectral Imaging of Density, Anisotropy, and Orientation," the disclosures of which are hereby incorporated by reference in their entirety for all purposes.

BACKGROUND OF THE INVENTION

Various methods have been used to measure biological architecture and activity. Optical microscopy has opened a unique window into structures and processes in the liquid and solid phase. To develop new therapeutics, it is important to map the structure of human tissue and cells in a healthy state, in a disease state, and in response to therapeutic interventions. Further, understanding the interactions of cells with other organisms, such as viruses, may require the ability to see organelles, proteins, and DNA in human cells.

Despite the progress that has been made in microscopy and the measurement of optical properties of materials, there exists a need in the art for improved methods and systems for performing high-speed spectral imaging of three-dimensional (3D) density, 3D anisotropy, and 3D orientation of specimens.

SUMMARY OF THE INVENTION

Embodiments of the present invention relate generally to methods and systems for performing spectral imaging of density, anisotropy, orientation, and depolarization in three-dimensional (3D) space, with or without the use of fluorescent labels. Methods and systems described herein utilize calibration and deconvolution to achieve fast imaging of anisotropy and density of specimens with or without label at multiple wavelengths. When imaging specimens in transmission without a label, the density, anisotropy, and orientation of the specimen are measured in terms of the specimen's optical path length (OPL), retardance, and slow axis orientation. When imaging labeled specimens in fluorescence mode, the density, anisotropy, and orientation of the specimen are measured in terms of fluorophore concentration, anisotropy of fluorescent dipoles, and orientation of fluorescent dipoles. The apparatus enables broadband imaging using wire-grid polarizing beam splitters or wire-grid polarization analyzers and allows multiplexing of label-free and fluorescence measurements. The three-dimensional data is acquired either by scanning the specimen or by defocusing the detectors. The quantitative reconstruction of density, anisotropy, orientation, and degree of polarization at each wavelength is achieved using calibration and deconvolution algorithms.

In a particular embodiment, a spectral quantitative imaging of density and anisotropy, is provided that utilizes four broadband detection paths in parallel to acquire four polarization-channels of a specimen. Utilizing optical components and their arrangements that are designed to work across the visible spectrum but may have imperfections, embodiments of the present invention utilize a calibration algorithm that returns an instrument tensor that characterizes imperfections in the light path at the location of the field of view and at each wavelength. The inventors have determined that this instrument tensor formalism enables high resolution measurement of the Stokes representation of light at all locations of the imaging volume. Moreover, deconvolution methods are utilized that allow recovery of the specimen's physical properties from background corrected volumes of the Stokes parameters. Utilizing the acquisition, calibration, and deconvolution methods described herein, a common detection module allows measurement of the specimen optical path length, retardance, and slow axis orientation in transmission mode, as well as measurement of fluorophore concentration, anisotropy of fluorescent dipoles, and orientation of fluorescent dipoles in epi-illumination mode. In a specific embodiment, the four broadband detection paths are defocused relative to each other to enable single-shot measurement of optical path length, retardance, and slow axis orientation.

According to an embodiment of the present invention, a system is provided. The system includes an illumination source, a specimen stage operable to support a specimen, imaging optics, and a polarization state analyzer optically coupled to the imaging optics. The system also includes one or more processors in communication with the illumination source and the polarization state analyzer. The one or more processors are configured to perform operations comprising generating a plurality of illumination wavelengths, positioning the specimen at a plurality of specimen positions and orientations, and receiving an array of multiple sets of polarization channels from the polarization state analyzer. The one or more processors are further configured to perform operations comprising computing a calibration tensor, receiving a calibration tensor associated with the imaging optics, converting the array of multiple sets of polarization channels into Stokes parameter maps, deconvolving the Stokes parameter maps to provide 3D density, 3D anisotropy, and 3D orientation measurements of the specimen at multiple wavelengths, denoising the Stokes parameter maps to sensitively detect changes in density, anisotropy, and orientation by enhancing the data correlation across spatial and temporal dimensions, and segmenting specific structures from dispersion of density, anisotropy, and orientation from above measurements.

According to another embodiment of the present invention, a method of measuring optical properties of a specimen is provided. The method includes generating illumination light at a plurality of illumination wavelengths and, for each of the plurality of illumination wavelengths, directing the illumination light to impinge on the specimen, collecting sample light passing through the specimen, and detecting the collected sample light using a polarization state analyzer to form a set of polarization channels. The method also includes receiving a calibration tensor, converting the set of polarization channels for each of the illumination wavelengths into Stokes parameter maps using the calibration tensor, and deconvolving the Stokes parameter maps to provide density, anisotropy, and orientation measurements of the specimen.

According to a specific embodiment of the present invention, a method of measuring optical properties of a specimen is provided. The method includes a) generating illumination light at a predetermined wavelength $\lambda_i$, b) positioning the specimen at a predetermined axial position $z_j$, c) directing the illumination light at the predetermined wavelength to be incident on the specimen, and d) collecting sample light passing through the specimen. The method also includes e) forming a set of polarization channels of the specimen associated with the predetermined wavelength and the predetermined axial position, f) incrementing j to j+1 to define an updated predetermined axial position $z_{j+1}$, and g) repeating b) through f) a plurality of times to provide multiple sets of polarization channels of the specimen. The method further includes h) incrementing i to i+1 to define an updated predetermined wavelength $\lambda_{i+1}$, repeating a) through h) a plurality of times to provide an array of multiple sets of polarization channels of the specimen, receiving a calibration tensor, converting the array of multiple sets of polarization channels into Stokes parameter maps using the calibration tensor, and deconvolving the Stokes parameter maps to provide density, anisotropy, and orientation measurements of the specimen.

According to an embodiment, each set of polarization channels can include a plurality of polarization channels. The plurality of polarization channels can include a first image obtained using light having a polarization state aligned with 0°, a second image obtained using light having a polarization state aligned with 45°, a third image obtained using light having a polarization state aligned with 90°, and a fourth image obtained using light having a polarization state aligned with 135°. The specimen can be disposed in an image plane orthogonal to the predetermined axial position. Forming the set of polarization channels of the specimen can include capturing an image of the specimen using a set of four cameras, each camera of the set of four cameras being operable to image one of four distinct polarization states. Forming the set of polarization channels of the specimen can include capturing an image of the specimen using a single camera having a polarization-resolved pixel format. Each set of polarization channels can include a plurality of images, each of the plurality of images being associated with one of the predetermined axial position or the updated predetermined axial positions. The specimen can include primary human cells or human tissue, for example, primary human cells or human tissue that are not labeled. The specimen can include liquid crystals that are doped or undoped. The specimen can include non-model organisms or genetically labeled, cultured cells.

According to another specific embodiment of the present invention, a system is provided. The system includes a spectral illumination source, a specimen stage operable to support a specimen and translate the specimen in three dimensions, imaging optics, and a polarization state analyzer optically coupled to the imaging optics. The system also includes one or more processors in communication with the spectral illumination source and the polarization state analyzer. The one or more processors are configured to perform operations comprising generating illumination light at a plurality of wavelengths and, for each of the plurality of wavelengths, collecting sample light passing through the specimen, detecting the collected sample light using the polarization state analyzer to form a plurality of polarization channels, receiving a calibration tensor associated with the imaging optics, converting the plurality of polarization channels into Stokes parameter maps, and deconvolving the Stokes parameter maps to provide density, anisotropy, orientation, and depolarization measurements of the specimen.

According to an embodiment, the spectral illumination source can include an optical source operable to generate light in a plurality of distinct wavelength bands. The polarization state analyzer can include a set of four cameras, each camera being operable to image each of four distinct polarization states. The polarization state analyzer can include a single camera having a polarization-resolved pixel format. The plurality of polarization channels can include a first image obtained using light having a polarization state aligned with 0°, a second image obtained using light having a polarization state aligned with 45°, a third image obtained using light having a polarization state aligned with 90°, and a fourth image obtained using light having a polarization state aligned with 135°. Converting the plurality of polarization channels into Stokes parameter maps can include using an inverse of the calibration tensor. The specimen can include comprises a primary sample.

According to a particular embodiment of the present invention, a method of measuring optical properties of a specimen is provided. The method includes directing illumination light at a plurality of wavelengths to be incident on the specimen and, for each of the plurality of wavelengths, collecting sample light passing through the specimen, and detecting the collected sample light using a polarization state analyzer to form a plurality of polarization channels. The method also includes receiving a calibration tensor, converting the plurality of polarization channels for each of the plurality of wavelengths into Stokes parameter maps using the calibration tensor, and deconvolving the Stokes parameter maps to provide density, anisotropy, orientation, and depolarization measurements of the specimen.

According to an embodiment of the present invention, the polarization state analyzer can include a set of four cameras, each camera of the set of four cameras being operable to image each of four distinct polarization states. All cameras of the set of four cameras can be located at a same axial position in image space that is conjugate to a single plane in the specimen volume. All cameras of the set of four cameras can be located at a same axial position in image space and conjugate to different planes in the specimen volume via independent modification of their aperture planes.

According to another particular embodiment of the present invention, a system is provided. The system includes a fluorescent excitation source, a dichroic mirror operable to reflect fluorescent excitation light emitted by the fluorescent excitation source, and a specimen stage operable to support a specimen. The system also includes imaging optics operable to receive fluorescent emission light emitted by the specimen, a polarization state analyzer optically coupled to the imaging optics, and one or more processors in communication with the polarization state analyzer. The one or more processors are configured to perform operations comprising detecting the fluorescent emission light using the polarization state analyzer to form an array of multiple sets of polarization channels, receiving a calibration tensor associated with the imaging optics, converting the array of multiple sets of polarization channels into Stokes parameter maps using the calibration tensor, and deconvolving the Stokes parameter maps to provide 3D density, 3D anisotropy, 3D orientation, and depolarization measurements of the specimen.

According to an embodiment of the present invention, the system can further include a spectral illumination source operable to provide transmission illumination light at a plurality of wavelengths. The specimen stage can be operable to translate the specimen in three dimensions. The imaging optics can be further operable to receive light from the spectral illumination source transmitted through the specimen. The one or more processors can be further configured to perform operations including generating the transmission illumination light at the plurality of wavelengths, collecting sample light passing through the specimen, detecting the collected sample light using the polarization state analyzer to form a second array of a plurality of polarization channels, converting the second array of the plurality of polarization channels into Stokes parameter maps, and deconvolving the Stokes parameter maps to provide density, anisotropy, orientation, and depolarization measurements of the specimen. The fluorescent excitation light and the transmission illumination light can be provided sequentially. The specimen stage can be translated in an axial direction at a first rate during provision of the fluorescent excitation light and the specimen stage can be translated in the axial direction at a second rage during provision of the transmission illumination light. The system can further include an immersion media operable to match a refractive index of the specimen to increase contrast. The polarization state analyzer can include a set of four cameras, each camera of the set of four cameras being operable to image light in one of four distinct polarization states. The polarization state analyzer can further include a beam splitter operable to direct light along a first optical path or a second optical path, a first polarizing beam splitter disposed along the first optical path and operable to direct light having a first polarization state to a first lens and a first camera and light having a third polarization state orthogonal to the first polarization state to a third lens and a third camera, a half wave plate disposed along the second optical path, and a second polarizing beam splitter disposed along the second optical path and operable to direct light having a second polarization state to a second lens and a second camera and light having a fourth polarization state orthogonal to the second polarization state to a fourth lens and a fourth camera. The polarization state analyzer can include a single camera having a polarization-resolved pixel format. Each set of polarization channels can include a plurality of images associated with a different axial position of the specimen. The array of multiple sets of polarization channels can be arrayed as a function of different illumination wavelengths. Each set of polarization channels can include a first image obtained using light having a polarization state aligned with 0°, a second image obtained using light having a polarization state aligned with 45°, a third image obtained using light having a polarization state aligned with 90°, and a fourth image obtained using light having a polarization state aligned with 135°. Converting the array of multiple sets of polarization channels into Stokes parameter maps can include using an inverse of the calibration tensor.

Numerous benefits are achieved by way of the present invention over conventional techniques. For example, embodiments of the present invention provide methods and systems that perform rapid measurement of specimen anisotropy at multiple wavelengths utilizing broadband polarizing components. As described herein, broadband optical components are utilized in a broadband imaging path that functions at a variety of wavelengths extending over a wide wavelength range, enabling operation of the system with high fidelity at a variety of specific predetermined wavelengths as appropriate to the particular application. Utilizing calibration algorithms and calibration tensors that characterize deviations in the broadband components as an "instrument tensor" across the field of view, deviations in the components are corrected. Moreover, embodiments of the present invention provide for material characterization without the use of labels or, alternatively, using labels. The same optical path and system provide improved specificity for label-free detection of structures based on their dispersion properties. Utilizing multiple cameras, some embodiments of the present invention provide single-shot imaging of density and anisotropy at high speed by defocusing the cameras relative to each other.

Moreover, embodiments of the present invention provide compact imaging systems that can incorporate commercially available polarization sensitive cameras that are utilized in machine vision applications and can be attached to the detection paths of many microscopes. Using multiple (e.g., four) cameras, systems with large fields of view are provided that can operate in both transmission and fluorescence imaging modes. The commercial applications of the technology described herein are widespread, including material inspection, for example, the high throughput inspection of silicon wafers, and mineralogy, for example, quantitative identification of crystal identity in a sample. Medical applications include digital pathology, for example, high throughput imaging of histopathological slides; neuroscience, for example, fast imaging of myelination, action potential, and fast label-free imaging of interactions among primary cells; cell biology and biophysics, for example, imaging of organelle dynamics without blur, imaging contractility of cardiomyocytes, and fluctuations in density and curvature of cells; and tissue biology, for example, imaging architecture of thick tissues using light in the near infrared (NIR) or shortwave infrared (SWIR) spectrum.

These and other embodiments of the invention along with many of its advantages and features are described in more detail in conjunction with the text below and attached figures.

BRIEF DESCRIPTION OF THE DRAWINGS

FIGS. 4A-4F are theoretical plots of quantitative retardance and phase as a function of wavelength for dispersive and non-dispersive materials, when thickness of optical section does not depend on the wavelength. This model applies to specimens that are thinner than optical section.

FIG. 5B is a simplified schematic diagram illustrating a camera control and synchronization system according to an embodiment of the present invention.

FIG. 5C is a plot illustrating stage position as a function of time for rapid depth scanning in a single channel according to an embodiment of the present invention.

FIG. 5D is a plot illustrating stage position as a function of time for depth scanning in multiple channels according to an embodiment of the present invention.

FIGS. 8A-8L illustrate components of a calibration tensor and their deviation from the theoretical values according to an embodiment of the present invention.

FIG. 9 is a table illustrating calibrated Stokes vectors for illumination light S_in and the average calibration matrix ⟨ A_λ⟩ at eight different wavelengths.

FIG. 26A is a phase image of a plasma membrane in HEK293T cells according to an embodiment of the present invention.

FIG. 26B is a fluorescence anisotropy and orientation image of a plasma membrane in HEK293T cells labeled with CAAX-mScarlet according to an embodiment of the present invention.

FIG. 26C is a fluorescence anisotropy and orientation image of F-actin in HEK293T cells labeled with SiR-Actin according to an embodiment of the present invention.

FIG. 26D is a transmission image of iPSC-derived cardiomyocytes according to an embodiment of the present invention.

FIG. 26E is a fluorescence anisotropy and orientation image of DNA stained with a nucleic acid stain according to an embodiment of the present invention.

FIG. 26F is a fluorescence anisotropy and orientation image of F-actin labeled with SiR-actin according to an embodiment of the present invention.

DETAILED DESCRIPTION OF SPECIFIC EMBODIMENTS

Embodiments of the present invention relate generally to methods and systems for performing spectral imaging of three-dimensional (3D) variations in density, anisotropy, orientation, and depolarization with and without the use of labels. Spectral imaging of density, anisotropy, orientation, and depolarization enables spectral analysis of physical properties of the specimen, which can be used to identify specific materials in label-free images. Specimens suitable for measurement using embodiments of the present invention can include biological materials, for example cells and tissues, as well as inorganic materials, for example mineral crystals and plastics. As described more fully herein, embodiments of the present invention utilize a detector system that can replace the camera module of many microscopes, making this system easy to integrate. Utilizing calibration and deconvolution algorithms, the methods and systems provide the opportunity to measure a specimen's density, anisotropy, orientation of anisotropy, and depolarization at multiple wavelengths at high speed. As an example, with through-focus acquisition, embodiments of the present invention can acquire 30 volumetric measurements of density and anisotropy per second at a single wavelength.

In an embodiment, a specimen is illuminated by polarized or unpolarized light at chosen wavelengths and the image is formed using a broadband detector that simultaneously captures multiple polarization-resolved views of the specimen. As an example, two implementations of the simultaneous broadband detector are described herein: A) an image splitter with four polarization-resolved paths, each recording one polarization state, and B) a single camera with a polarization analysis grid overlaid on neighboring pixels. Calibration algorithms are used to correct for non-ideal performance of optical components and generate maps of the Stokes parameters of the light. That is, the 3D distribution of Stokes parameters of light at different wavelengths are computed using a pre-calibrated instrument tensor as a function of wavelength of illumination, $A_\lambda^{-1}$. Then, deconvolution algorithms are used to recover the 3D distribution of absorption (or inversely, transmission), density (i.e., phase delay), anisotropy in refractive index, orientation of the slow axis, and depolarization.

In the following figures, similar components and/or features may have the same reference label. Where the reference label is used in the specification, the description is applicable to any one of the similar components having the same reference label.

Figure 1A:
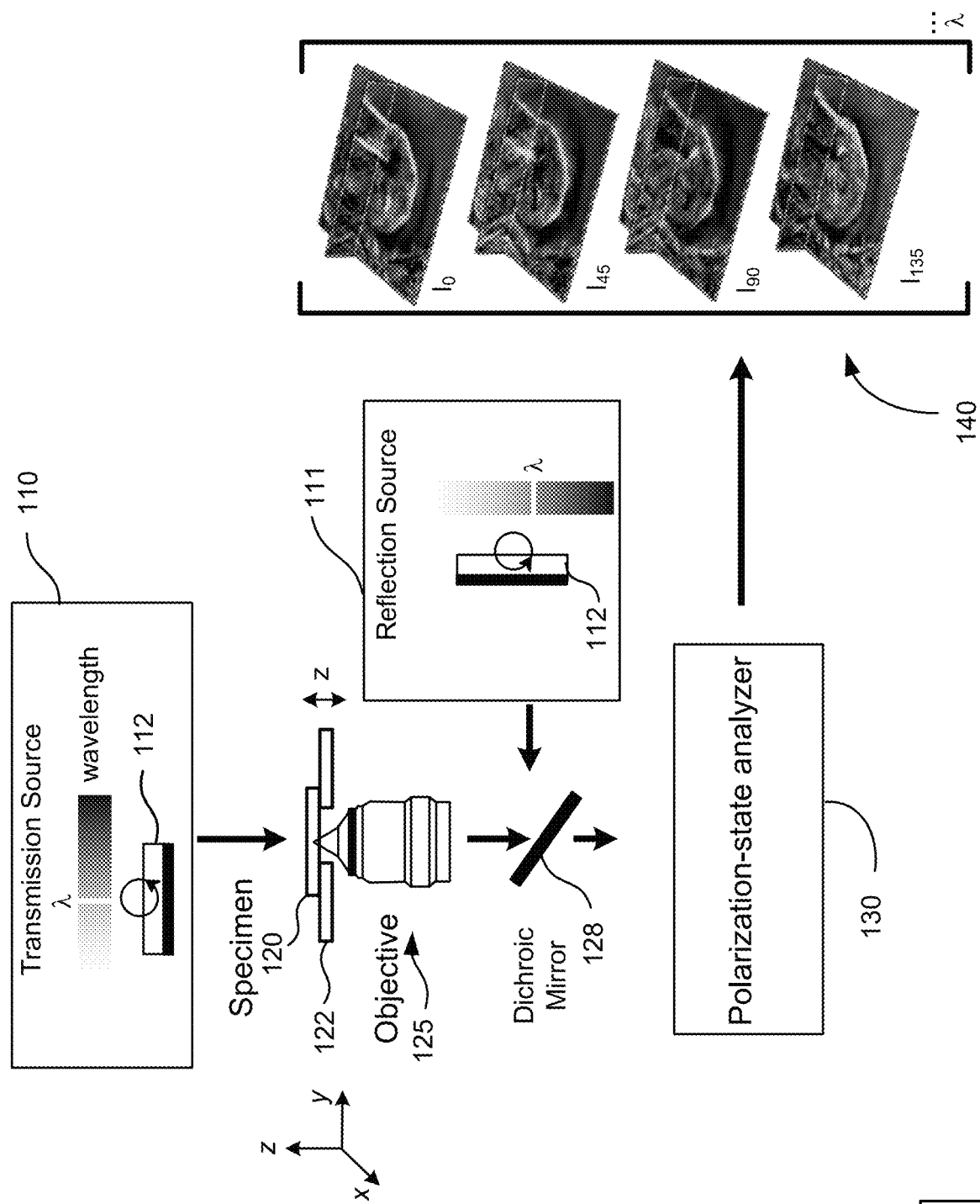
FIGS. 1A and 1B form a schematic diagram illustrating a spectral data acquisition and processing system according to an embodiment of the present invention.
Figure 1B:
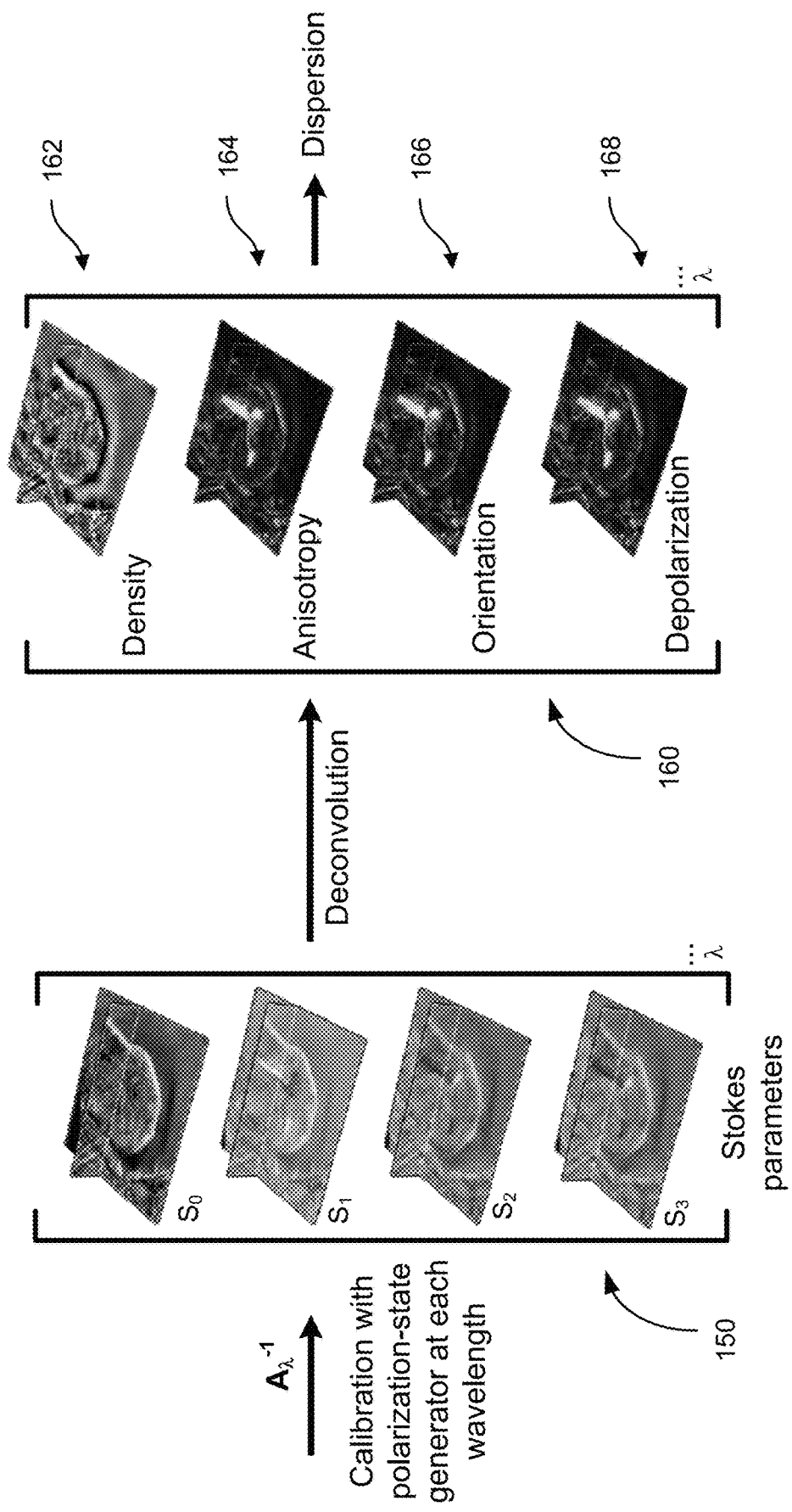

FIGS. 1A and 1B form a schematic diagram illustrating a spectral data acquisition and processing system according to an embodiment of the present invention. As described more fully in relation to FIGS. 1A and 1B, several modules and methods of implementing the modules, including calibration of the instrument tensor to capture deviations of the polarizing components from their ideal performance as well as evaluation of the optical system's performance are described. Further, description is provided in relation to deconvolution, which is utilized to reconstruct specimen properties.

Referring to FIGS. 1A and 1B, the data acquisition and processing system, which can be referred to as a spectral polarization-resolved imaging apparatus, can be integrated with conventional microscope components by modifying the microscope illumination and attaching the detection module described herein. In relation to the illumination module, in the transmission mode of operation, transmission source 110 is utilized. Transmission source can be implemented as a partially coherent light source in Kohler illumination. As an example, transmission source 110 can be implemented using a white light source integrated with an adjustable spectral filter, for example, a light emitting diode (LED) MCWHL6 available from Thorlabs, Inc. that emits white light used with an interference filter. Alternatively, multiple sources at different wavelengths, for example, a set of LEDs, each operating at a different wavelength, can be combined to generate a tunable emission source. Accordingly, transmission source 110 provides a tunable light emitter operable to emit a predetermined wavelength or band of wavelengths that can be scanned over a wavelength range, for example, from 400 nm to 800 nm. As described more fully herein, multiple measurements, each made using a predetermined emission wavelength, provide imaging information over the wavelength range.

Circular polarizer 112 is placed at or near the condenser back focal plane to achieve left-hand circular excitation in the illustrated implementation. As described in relation to FIGS. 16 and 17, in addition to left-hand circularly polarized light, the polarization state of transmission source 110 may be further modulated to multiplex with programmable polarization-sensitive modules present in the detection path. The use of circularly polarized illumination light provides orientation independence in the measurements (i.e., orientation independence on the detection side) and enables the measurement of birefringence as the polarized illumination light interacts with birefringent specimens. Depending on the diversity of polarization states used for detection, the detection system can be a full Stokes polarimeter or a linear Stokes polarimeter. Full Stokes polarimetry reports the handedness of the circularly polarized light and utilizes elliptical states with a selected handedness.

In addition to operation in transmission imaging mode, embodiments of the present invention provide reflection source 111 that can enable a fluorescence imaging mode in which fluorophores in specimen 120 are excited by isotropically polarized light or unpolarized light via dichroic mirror 128. In fluorescence mode, light emitted by specimen is transmitted by dichroic mirror 128 and detected by polarization state analyzer 130. Thus, in addition to label-free transmission imaging, fluorescence imaging utilizing labels can be performed. As an example, using spectral fluorescence imaging, the interaction of two fluorescent dipoles (e.g., cytoskeleton interacting with a cell membrane) can be imaged.

Referring once again to FIGS. 1A and 1B, transmission source 110 is a spectral source that enables scanning of the emission wavelength. As the wavelength emitted by transmission source 110 is scanned and passed through circular polarizer 112, light at predetermined wavelengths or wavelength bands is directed to impinge on specimen 120, which is supported by specimen stage 122.

Light at predetermined wavelengths or wavelength bands is directed to impinge on specimen 120, which is supported by specimen stage 122 at an axial position measured along the z-axis, resulting in a sample plane (x-y plane), also referred to as a specimen plane, over which the specimen is imaged. Specimen stage 122 is translatable in x, y, and z, enabling sampling of the specimen at different lateral positions as well as different axial positions, enabling the 3D imaging described herein. Objective 125 is utilized to collect light transmitted through specimen 120 so that this collected light can be imaged using polarization state analyzer 130. Objective 125 may also be translated axially to acquire 3D data sets.

Figure 5A:
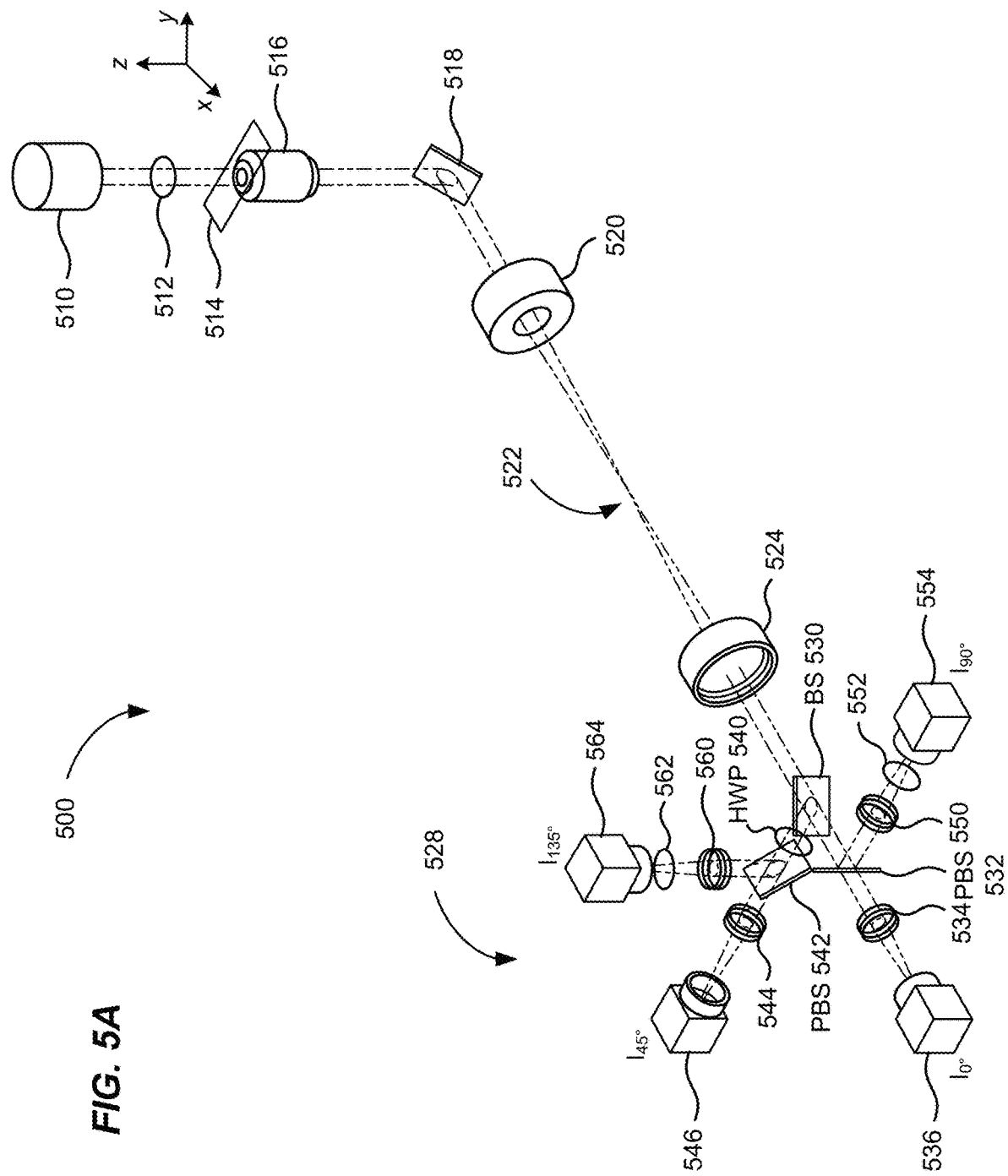
FIG. 5A is a simplified schematic diagram illustrating a spectral, multi-camera polarization-resolved imaging system according to an embodiment of the present invention.

Polarization state analyzer 130 is an accurate imaging Stokes polarimeter that is able to describe linear, circular, and elliptical states of polarization as well as the degree of polarization. Additional description related to polarization state analyzer 130 is provided in relation to FIGS. 5, 14, 15, 16, 17, and 18, which describe various optical arrangements that can be utilized to implement polarization state analyzer 130. As an example, FIG. 5A illustrates an optical system that utilizes a multi-camera design utilizing four polarization-resolved paths using linear polarization states.

Figure 13A:
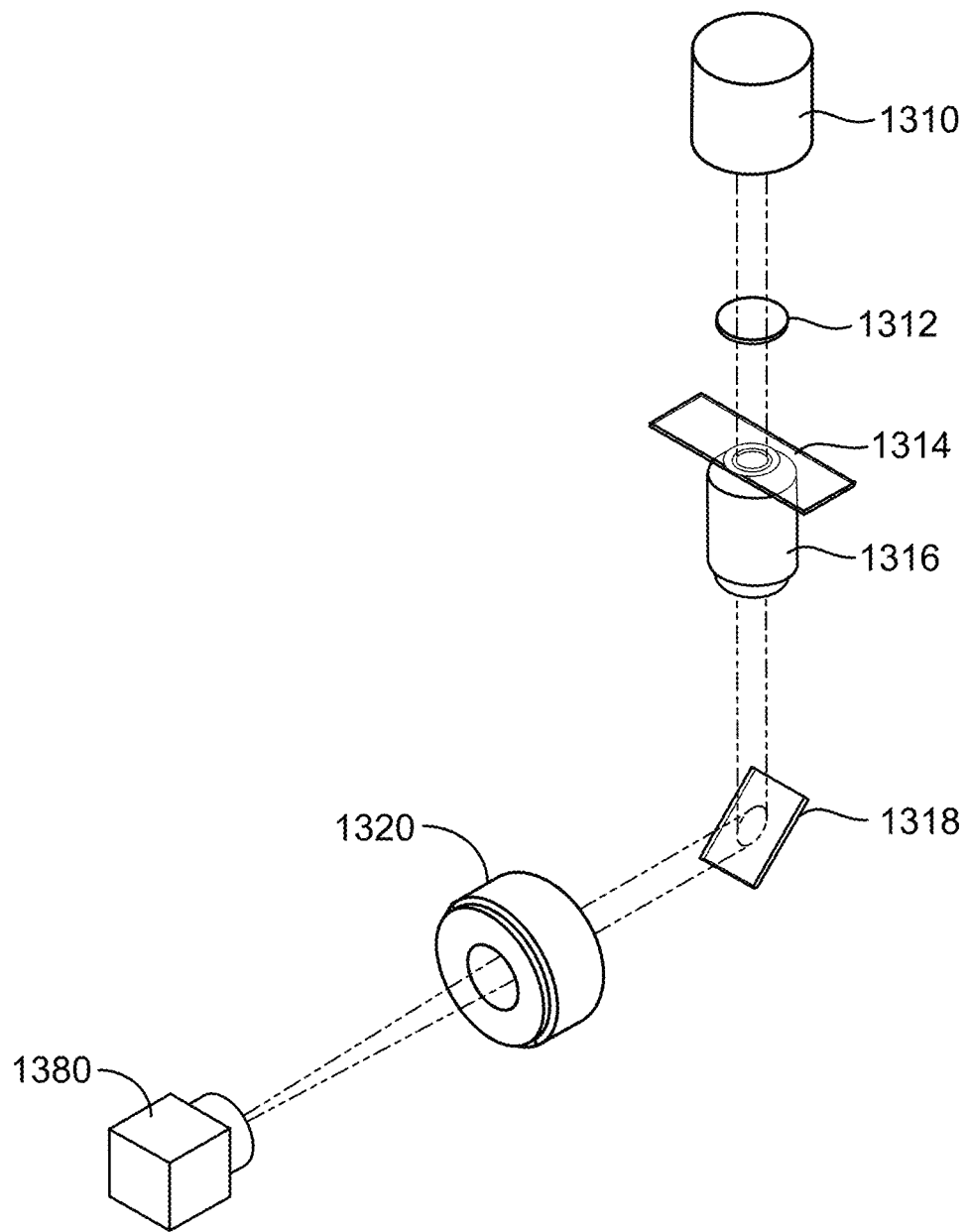
FIG. 13A is a simplified schematic diagram illustrating the use of a single camera to perform polarization-resolved imaging according to an embodiment of the present invention.
Figure 13B:
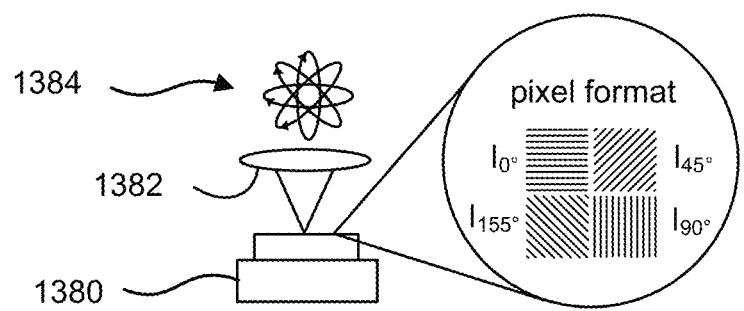
FIG. 13B is a simplified schematic diagram illustrating the use of a single camera to perform polarization-resolved imaging according to an embodiment of the present invention.

In summary, polarization state analyzer 130 can be implemented using four polarization sensitive cameras and associated optics or a single, four-channel polarization sensitive camera. The single polarization sensitive camera, as described in relation to FIGS. 13A and 13B, provides benefits including a simple alignment process for a given field of view. The use of four polarization sensitive cameras generally provides a larger field-of-view, higher extinction ratio, and increased light sensitivity; enables controls over the detected polarization state of each camera; and enables independent placement of the detected image planes, for example along different axial positions. Thus, for an illumination wavelength with the specimen positioned at a given z-axis position (i.e., an axial position), polarization state analyzer 130 provides a set of polarization channels for each illumination wavelength. As described more fully below, a number of different illumination wavelengths can be utilized to provide an array of sets of polarization channels.

Referring to FIGS. 1A and 1B, image array 140 includes a set of polarization channels for each predetermined wavelength (λ). Each set of polarization channels includes images that are formed by imaging the intensity in each of a set of polarization channels (i.e., linearly polarized along a direction aligned with 0° ($I_0$), linearly polarized along a direction aligned with 45° ($I_{45}$), linearly polarized along a direction aligned with 90° ($I_{90}$), and linearly polarized along a direction aligned with 135° ($I_{135}$) for the images illustrated in image array 140). As an example, eight wavelengths can be utilized to provide an image array including a set of four polarization channels (images $I_0$, $I_{45}$, $I_{90}$, and $I_{135}$) for each of the eight wavelengths, resulting in 32 polarization channels, i.e., multiple sets of polarization channels. Image array 140 is subsequently collected with the specimen positioned at different axial positions along the z-axis to provide an array of multiple sets of polarization channels.

As described herein, multiple, polarization-resolved images are obtained, using four cameras, a single camera with pixel sets that includes four polarization-resolved pixels, or the like to produce a set of polarization channels. Illumination at different wavelengths results in multiple sets of polarization channels. Multiple z-positions results in an array of multiple sets of polarization channels. Another nomenclature that can be utilized to describe embodiments of the present invention is that the camera, also referred to as a detector, produces an image array of 3-dimensions: x, y, and p (polarization channel) analogous to the set of polarization channels. The illumination at different wavelengths results in image array of 4-dimensions: x, y, p and λ (i.e., wavelength) analogous to multiple sets of polarization channels. Multiple z-positions result in an image array of 5-dimensions: x, y, p, λ, and z (i.e., depth) analogous to the array of multiple sets of polarization channels. In alternative embodiments, the order of acquisition of the dimensions λ, z can be different, or only one of the dimensions λ, z may be acquired. As will be evident to one of skill in the art, the 4-dimensional array x, y, p and λ allows spectral measurement of orientation and anisotropy in 2D. Addition of measurements at multiple z-positions results in the extension to the 5-dimensional array and the spectral measurement of orientation, anisotropy, and density in 3D.

A birefringent specimen changes the Stokes vector of the input light. The sets of polarization channels for each wavelength, also referred to as image array 140, collected at a number of axial positions, can be converted into the Stokes parameters $S_0$, $S_1$, $S_2$, and $S_3$ (150) using the inverse of the calibration tensor (i.e., $A_\lambda^{-1}$). More information of obtaining the calibration tensor $A_\lambda$ is given below.

$$S_{specimen} = A_\lambda^{-1} * I$$

The measured Stokes parameters of the specimen are measured relative to the Stokes parameters in the background. Background correction is performed as follows:

$$S_0^{corr} = S_0/S_0^{BG}$$

$$S_1^{corr} = S_1 - S_1^{BG}$$

$$S_2^{corr} = S_2 - S_2^{BG}$$

$$S_3^{corr} = S_3 - S_3^{BG}$$

The $S_1$, $S_2$, and $S_3$ Stokes parameters are then normalized by dividing by the total intensity $S_0$:

$$S_1^{norm} = S_1^{corr}/S_0^{corr}$$

$$S_2^{norm} = S_2^{corr}/S_0^{corr}$$

$$S_3^{norm} = S_3^{corr}/S_0^{corr}$$

The Stokes images can be used to calculate the specimen transmission (t), retardance (ρ), the orientation (ω) of the slow axis of the material, and degree of polarization of the transmitted light (DOP):

$$t = S_0^{corr}$$

$$\rho = \frac{\lambda}{2\pi} \operatorname{asin}\left(\sqrt{S_1^{norm^2} + S_2^{norm^2}}\right)$$

$$\omega = \frac{1}{2} \operatorname{atan}\left(\frac{-S_1^{norm}}{S_2^{norm}}\right)$$

$$DOP = \sqrt{S_1^{norm^2} + S_2^{norm^2} + S_3^{norm^2}}$$

Above pixel-wise data can be further analyzed with deconvolution algorithms to account for diffraction effects. In particular, density (phase) can be recovered from spatial variations in transmission. Assuming negligible scattering, the intensity variations encode the average phase in the focal plane via the transport of intensity (TIE) equation. Transfer function formalism is used to retrieve 2D and 3D phase from this average TIE phase contrast.

Depolarization can only be measured using a full Stokes polarimeter. With a linear Stokes polarimeter that is sensitive to three Stokes parameters (i.e., $S_0$, $S_1$, and $S_2$), depolarization cannot be deconvolved. By extending the detector to a full Stokes polarimeter that reports all four Stokes parameters (i.e., $S_0$, $S_1$, $S_2$, and $S_3$), in addition to density 162, anisotropy 164, and orientation 166, depolarization can be deconvolved as illustrated by depolarization 168 in FIG. 1B. That is, full Stokes polarimetry sensitive to the handedness of detected light (left-handed versus right-handed) is provided by some embodiments of the present invention. As will be evident to one of skill in the art, the anisotropy and the depolarization can be uncoupled by knowledge of the degree of polarization of the detected light.

Figure 2:
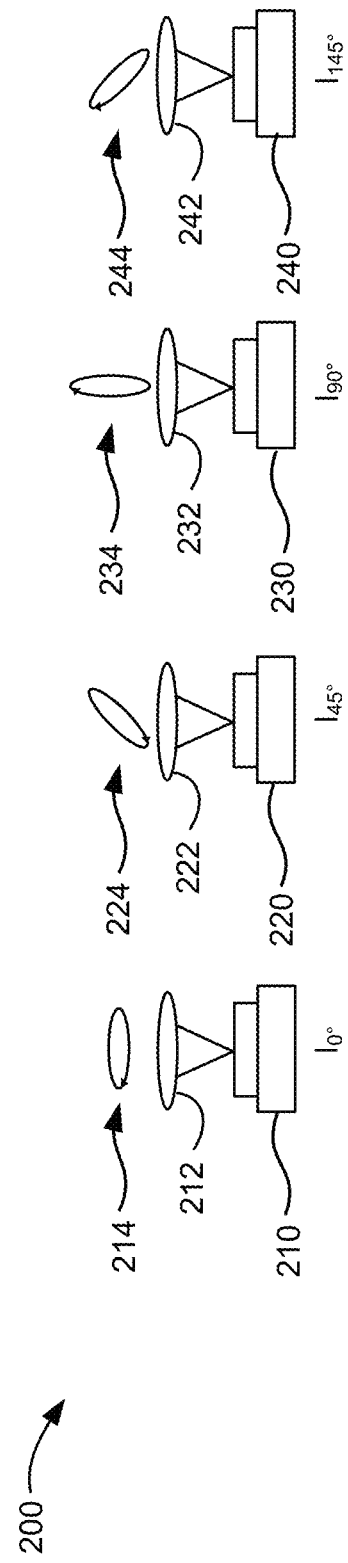
FIG. 2 is a simplified schematic diagram illustrating the use of multiple cameras to perform polarization-resolved imaging according to an embodiment of the present invention.

Image data of different polarization-resolved channels can be recorded on separate cameras which operate in parallel. FIG. 2 is a simplified schematic diagram 200 illustrating the use of multiple cameras to perform polarization-resolved imaging according to an embodiment of the present invention. As discussed in more detail in relation to FIG. 5A, light in a first polarization state 214 (e.g., light aligned with a direction of 0°) is incident on lens 212 that focuses light onto polarization-resolved camera 210. Accordingly, an image characterizing the intensity of the light having the first polarization state (i.e., $I_0°$) is detected using polarization-resolved camera 210. Light in a second polarization state 224 (e.g., light aligned with a direction of 45°) is incident on lens 222 that focuses light onto polarization-resolved camera 220. Accordingly, an image characterizing the intensity of the light having the second polarization state (i.e., $I_{45}°$) is detected using polarization-resolved camera 220. Light in a third polarization state 234 (e.g., light aligned with a direction of 90°) is incident on lens 232 that focuses light onto polarization-resolved camera 230. Accordingly, an image characterizing the intensity of the light having the third polarization state (i.e., $I_{90}°$) is detected using polarization-resolved camera 230. Light in a fourth polarization state 244 (e.g., light aligned with a direction of 135°) is incident on lens 242 that focuses light onto polarization-resolved camera 240. Accordingly, an image characterizing the intensity of the light having the fourth polarization state (i.e., $I_{135°}$) is detected using polarization-resolved camera 240.

In the embodiment illustrated in FIG. 2, sensitive and economical machine vision cameras are utilized that provide excellent imaging performance for brightfield microscopy. In some cases, the time resolution of anisotropy measurements is limited by the acquisition frame rate of the cameras. Accordingly, embodiments of the present invention can utilize high-throughput cameras that can live-stream data at ~100 frames per second. Faster imaging up to 1,000 frames per second can be achieved for smaller fields of view.

Specialized cameras can record up to 1,000,000 frames per second for periods of time limited by the size of the internal storage unit, typically a few seconds. Such cameras are also now available with integrated polarizers and can be utilized to enable high-speed imaging of high-birefringence samples.

The inventors have determined that the primary source of image noise in the imaging system is photon shot noise. This noise can be reduced to increase the SNR of reconstructed data by averaging several frames acquired during a quick succession in time. Machine learning-based methods may also be employed to denoise images from a single acquisition.

Given the set of density, anisotropy, orientation and depolarization at various wavelengths as illustrated by measurement set 160, the dispersion characteristics of the specimen can be determined. Thus, these physical properties enable label-free identification of biological and manmade materials with increasing specificity.

FIGS. 3A-3F are theoretical plots of quantitative retardance and phase as a function of wavelength for dispersive and non-dispersive materials. Dispersion refers to the change in refractive index of a material with wavelength. The ordinary and extraordinary refractive index of a dispersive material may change at a different rate.

Figure 3A:
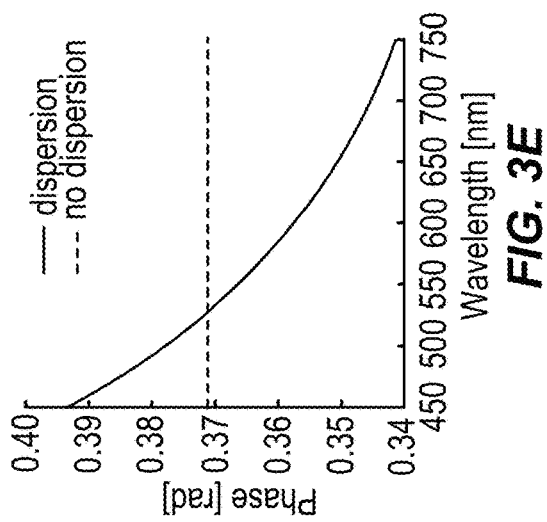
FIGS. 3A-3F are theoretical plots of quantitative retardance and phase as a function of wavelength for dispersive and non-dispersive materials, when thickness of optical section depends on the wavelength. This model applies to specimens that are thicker than optical section.

FIG. 3A illustrates the dependence of refractive index of a hypothetical material with wavelength in the presence and absence of dispersion. In the absence of dispersion, the ordinary and extraordinary refractive indices of this material are constant with wavelength, $n_o$=1.45 and $n_e$=1.52, respectively. In the presence of dispersion, the ordinary and extraordinary refractive indices of the material decrease with wavelength. The rate of change of the ordinary refractive index with wavelength is higher than the rate of change of the extraordinary refractive index with wavelength.

Figure 3C:
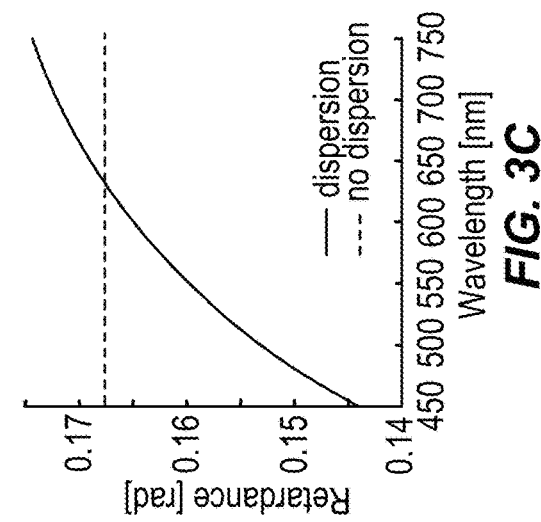
Figure 3B:
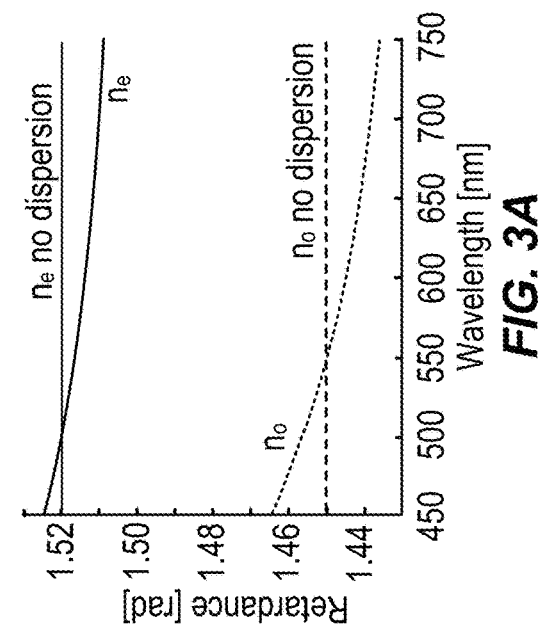

FIG. 3B is a plot of the sample thickness d imaged by the microscope as a function of wavelength. The axial volume captured by a microscope depends on the depth of imaging field and the depth of illumination field. The thickness of a sample observed by the microscope scales linearly with wavelength $d \sim \lambda/NA^2$, provided that the actual sample thickness is always greater than the axial imaging depth of the microscope.

FIG. 3C is a plot of sample retardance in radians as a function of wavelength. The measured sample retardance depends on the difference of ordinary and extraordinary refractive indices and the sample thickness. The sample retardance in radians is given by $$\gamma(\text{rad}) = (n_e - n_o)d\frac{2\pi}{\lambda}.$$

For non-dispersive materials, the sample retardance in radians will be constant with wavelength. Dispersive materials will show a change in the retardance, measured in radians, with wavelength. The rate of change in retardance with wavelength will depend on the rate of change of the ordinary and extraordinary refractive indices with wavelength.

Figure 3E:
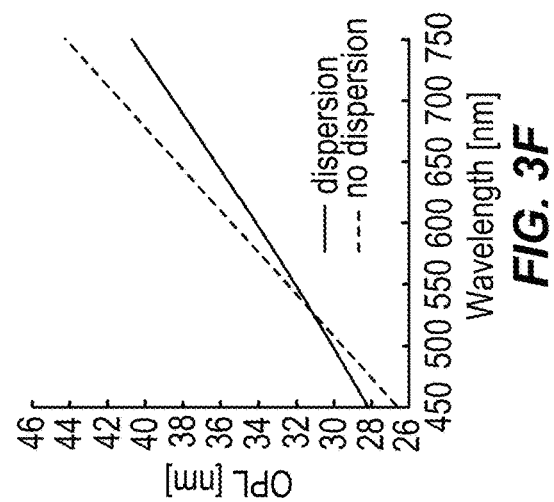
Figure 3D:
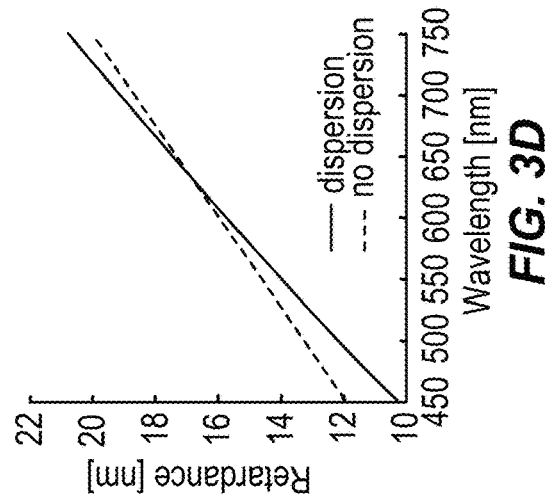

FIG. 3D is a plot of sample retardance in nanometers as a function of wavelength. The sample retardance may also be expressed in units of length, for example nanometers. The sample retardance in nanometers is given by $\gamma(\text{nm})=(n_e-n_o)d$. The sample retardance measured in nanometers will change with wavelength in the presence or absence of dispersion by the material. The rate of change of retardance with wavelength will depend on the rate of change of the ordinary and extraordinary refractive indices with wavelength.

FIG. 3E is a plot of sample phase in radians as a function of wavelength. The phase density of a material depends on its thickness and on the difference of its refractive index and the refractive index of the surrounding material. The phase density in radians is given by $$\phi(\text{rad}) = \left[\frac{n_e + n_o}{2} - n_m\right]d\frac{2\pi}{\lambda}.$$

In FIG. 3E, the sample is immersed in a medium of refractive index $n_m$=1.33. The measured phase in radians is constant with wavelength for non-dispersive materials. The phase changes with wavelength for dispersive materials. The rate of change of phase with wavelength will depend on the rate of change of the ordinary and extraordinary refractive indices with wavelength.

Figure 3F:
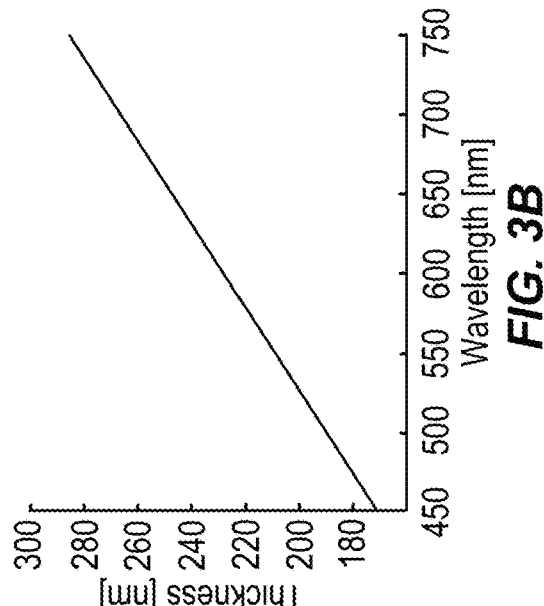

FIG. 3F is a plot of sample optical path length in nanometers as a function of wavelength. The phase delay that a material introduces may also be expressed in terms of the optical path length (OPL) change, given in units of length, for example nanometers. The OPL in nanometers is given by $$\phi(\text{rad}) = \left[\frac{n_e + n_o}{2} - n_m\right]d.$$

The sample OPL will change with wavelength in the presence or absence of dispersion by the material. The rate of change of OPL with wavelength will depend on the rate of change of the ordinary and extraordinary refractive indices with wavelength.

FIGS. 4A-4F illustrate wavelength-dependent retardance and phase when the sample thickness is much smaller than the axial imaging volume of the microscope. In this case, the full sample thickness is captured by the microscope at all wavelengths, i.e., d=const.

When the sample thickness is constant with wavelength, the sample retardance measured in nanometers will be constant for non-dispersive materials (FIG. 4D). The OPL measured in nanometers will also be constant with wavelength for non-dispersive materials (FIG. 4F). The sample retardance and phase measured in radians will change with wavelength for dispersive and non-dispersive materials as illustrated in FIGS. 4C and 4E and the sample retardance and phase measured in nanometers will also change with wavelength for dispersive materials (FIGS. 4D and 4F).

Different materials are expected to display different dispersion characteristics in the measured label-free physical properties. Thus, measurements at multiple wavelengths can be used to identify distinct sample components in label-free images. Furthermore, spectral fluorescence imaging can be used to observe the 3D dynamics of multiple fluorophores, enabling the investigation of their mutual interactions.

FIG. 5A is a simplified schematic diagram illustrating a spectral, multi-camera polarization-resolved imaging system according to an embodiment of the present invention. As described more fully below, the optical system 500 illustrated in FIG. 5A can be utilized to perform imaging of a three-dimensional specimen, for example, biological materials, such as cells and tissues, as well as inorganic materials, such as mineral crystals and plastics.

Referring to FIG. 5A, illumination source 510 is utilized to generate illumination light. As discussed in relation to FIGS. 1A-1B, illumination light from illumination source can be generated at different wavelengths or wavelength bands. Alternatively, illumination source 510 can output broad-spectrum light and spectral filters can be used to isolate specific wavelength bands. The spectral filters can be interchanged to illuminate the specimen with light of different wavelengths. Holographic diffusers and other optical elements can be utilized to homogenize the illumination light.

Light output by illumination source 510 is directed to circular polarizer 512 to generate illumination light with a predetermined polarization state. Circular polarizers designed for specific wavelength can be interchanged to match the wavelength output by illumination source 510. Alternatively, a broadband circular polarizer can be used. A broadband circular polarizer can be constructed using a wire-grid linear polarizer (for example, WP25M-UB from Thorlabs, Inc.) and an achromatic quarter wave plate (AQWP10M-580 from Thorlabs, Inc.) with fast or slow axis oriented at 22.5 relative to the transmission axis of the linear polarizer.

The illumination light then impinges on a specimen supported on specimen holder 514, also referred to as a sample stage. Light scattered as it passes through the specimen is collected by imaging optics 516, reflected off mirror 518, and directed toward lens 520, which may be a tube lens. Lens 520 serves to focus the scattered light at image plane 522, which typically serves as the camera port of the microscope.

In order to provide polarization channels, light propagating away from image plane is collimated using lens 524 and directed to four-camera polarization-resolved imaging system 528. Polarization optics are positioned in the back focal plane of lens 524. Although a four camera design utilizing four linearly polarized detection paths is illustrated in FIG. 5A, as discussed in relation to FIG. 13B, other optical designs can be utilized to implement a polarization-resolved imaging system.

As illustrated in FIG. 5A, four-camera polarization-resolved imaging system 528 includes beam splitter 530, which is generally a 50/50 beam splitter, for example, a silver sputtered non-polarizing 50/50 beam splitter with substantially uniform transmission over a predetermined wavelength range (e.g., a broadband non-polarizing beam splitter). Light incident on beam splitter 530 is split into two optical paths: a first optical path directed toward polarizing beam splitter 532 and a second optical path directed toward half wave plate and polarizing beam splitter 542.

Considering the first optical path directed from beam splitter 530 toward polarizing beam splitter 532, along this first path, the light transmitted through beam splitter 530 impinges on polarizing beam splitter 532, which splits the incident light into the 0° and 90° components. Light having a polarization aligned at 0° passes through polarizing beam splitter 532 and is focused by lens 534 onto camera 536. In one embodiment, an ultra-flat wire-grid polarizing beam splitter, which provides high broadband contrast and low image distortion, is utilized for beam splitter 532. As illustrated in FIG. 5A, each optical path includes a focusing lens so that the corresponding camera can form an image of the specimen positioned in the specimen plane of specimen holder 514. Thus, camera 536 captures an image of the specimen at 0° of polarization. In some embodiments, the focal length of lens and lens 534 is the same, but this is not required by the present invention. Utilizing lenses with predetermined optical characteristics, Nyquist sampling of the specimen is achieved to maximize the spatial resolution.

Considering the second optical path directed from beam splitter 530 toward half wave plate 540, the light reflected from beam splitter 530 is rotated by −45° in polarization as it passes through half wave plate 540 and impinges on polarizing beam splitter 542. As an example, a super-achromatic half wave plate can be utilized. Light having a polarization aligned at 45° is rotated by −45° after passing through half wave plate 540, is transmitted through polarizing beam splitter 542, and is focused by lens 544 onto camera 546. Thus, camera 546 captures an image of the specimen at 45° of polarization. Accordingly, the combination of a half wave plate with fast axis at −22.5° and a polarizing beam splitter with transmission axis at 0° results in paths sensitive to 45° and, as described below, 135° polarization.

Returning again to the first optical path, light having a polarization aligned at 90°, after passing through beam splitter 530, reflects from polarizing beam splitter 532 along a third optical path and is focused by lens 550. In the optical paths that incorporate reflection from a polarizing beam splitter, i.e., the third optical path and the fourth optical path, a clean-up polarizer is utilized to filter light reflected from the polarizing beam splitter before the light impinges on a camera. As will be evident to one of skill in the art, some broadband polarizing beam splitters, for example, based on wire-grid or nano-grid polarizers, provide higher extinction in transmission (i.e., transmission of the p-polarized state) than in reflection (i.e., reflection of the s-polarized state). Thus, the purity of the transmitted p-polarized state (i.e., the ratio of p-polarized light to s-polarized light transmitted by the polarizing beam splitter) can be higher than the purity of the reflected s-polarized state (i.e., the ratio of s-polarized light to p-polarized light reflected by the polarizing beam splitter). Accordingly, embodiments of the present invention utilize clean-up polarizers to increase the purity of the reflected s-polarized state. Referring to FIG. 5A, clean-up polarizer 552 is utilized to filter light reflected from polarizing beam splitter 532 along a third optical path before the filtered light impinges on camera 554. Thus, camera 554 captures an image of the specimen at 90° polarization.

Returning again to the second optical path, light having a polarization aligned at 135° is rotated by −45° by half wave plate 540, reflects from polarizing beam splitter 542 along a fourth optical path and is focused by lens 560. Since, as discussed above, some broadband polarizing beam splitters, for example, based on wire-grid or nano-grid polarizers, provide higher extinction in transmission (i.e., transmission of the p-polarized state) than in reflection (i.e., reflection of the s-polarized state) and, as a result, the purity of the transmitted p-polarized state (i.e., the ratio of p-polarized light to s-polarized light transmitted by the polarizing beam splitter) can be higher than the purity of the reflected s-polarized state (i.e., the ratio of s-polarized light to p-polarized light reflected by the polarizing beam splitter), cleanup polarizer 562 is utilized to filter light reflected from polarizing beam splitter 542 along the fourth optical path before the filtered light impinges on camera 564. Thus, camera captures an image of the specimen at 135° polarization.

Utilizing four-camera polarization-resolved imaging system 528, the specimen can be imaged with diverse polarization states and wavelengths, thereby acquiring information related to the 3D density and anisotropy of the specimen. During imaging, at each illumination wavelength, four-camera polarization-resolved imaging system 528 is utilized to collect through-focus intensities from four polarization-sensitive detection channels associated with cameras 536, 546, 554, and 564, respectively. In order to provide 3D reconstructions, specimen holder 514 is translated along the z-direction to enable imaging of different x-y planes within the specimen. Alternatively, objective 516 may also be translated along the z-direction to enable imaging of different x-y planes within the specimen.

As described herein, each set of polarization channels is transformed into the Stokes parameters through the pre-calibrated instrument matrix, AA, to represent the state of scattered light in each focal plane under each illumination. Then, the deconvolution algorithm described herein is utilized to convert these Stokes parameters associated with different illumination wavelengths (i.e., multiple sets of Stokes parameters arrayed by the wavelength of illumination) into the 3D density and anisotropy information of the specimen.

Although the embodiment illustrated in FIG. 5A utilizes detection of linearly polarized light along 0°, 45°, 90°, and 135°, embodiments of the present invention are not limited to this particular implementation. The design of four-camera polarization-resolved imaging system 528 may be modified to encode other polarization states or focal planes. For example, a full Stokes polarimeter can be implemented using light having a circular polarization state, a second image can be obtained using light having an elliptical polarization state aligned with 0°, a third image can be obtained using light having an elliptical polarization state aligned with 60° and a fourth image can be obtained using light having an elliptical polarization state aligned with 120°. One of ordinary skill in the art would recognize many variations, modifications, and alternatives.

FIG. 5B is a simplified schematic diagram illustrating a camera control and synchronization system according to an embodiment of the present invention. In the embodiment illustrated in FIG. 5B, microscope automation is leveraged to provide fast imaging in label-free and fluorescence modes of operation as well as multiplexed label-free, i.e., transmission, and fluorescence imaging. The four cameras 536, 546, 554, and 564 illustrated in FIG. 5A are shown in FIG. 5B as main camera 537 and secondary cameras 547, 555, and 565. In some embodiments, main camera 537 corresponds to camera 546, which captures an image of the specimen at 45° of polarization, but this is not required and cameras 536, 554, or 564 can be utilized as main camera 537. Controller 572 is coupled (e.g., electrically coupled) to main camera 537 and secondary cameras 547, 555, and 565 and serves to synchronize the operation of main camera 537 and secondary cameras 547, 555, and such that all four cameras capture images simultaneously. Not only is the exposure signal of main camera 537 used to trigger secondary cameras 547, 555, and 565, but is used by drive controller 572, which is programmed to move piezoelectric z-stage 574 and to shutter light source 576 (i.e., an LED operating as a fluorescent excitation light source) and light source 578 (i.e., an LED providing light for transmission imaging) using TTL pulses. Accordingly, based on the operation of main camera 537, the axial motion of the specimen using piezoelectric z-stage 574 along the z-direction as illustrated in FIG. 5A is controlled as well as the operation of the fluorescent and transmission imaging light sources. It should be noted that although light source 576 and light source 578 are illustrated as individual light sources, each of these light sources could be a multiple LED light source or other comparable light source that can provide output light at different wavelengths. Accordingly, the scope of multichannel illumination described herein not only includes fluorescent and transmission illumination, but different wavelengths for both fluorescent and transmission illumination. The fluorescent and transmission illumination/imaging can be performed alone or in combination in a multiplexed implementation. One of ordinary skill in the art would recognize many variations, modifications, and alternatives.

FIG. 5C is a plot illustrating stage position as a function of time for rapid depth scanning in a single channel according to an embodiment of the present invention. The motion of piezoelectric z-stage 574 is plotted as a function of time over 8 exposure cycles. During all 8 exposure cycles, transmission imaging is performed using illumination of the specimen using light source 578. During imaging, the exposure of the cameras is illustrated by camera exposure timeline 579. In some embodiments, each step of the piezoelectric stage is correlated with an exposure of the cameras. Piezoelectric z-stage 574, from an initial position, translates in a first direction during exposure cycle [0], reaching a maximum distance from the initial position, and then translates in a second, opposite direction during exposure cycle [1], returning to the initial position by the end of exposure cycle [1]. This process is repeated three additional times during exposure cycles [2]-[7]. Thus, as illustrated in FIG. 5C, piezoelectric z-stage 574 can be stepped in a custom triangle waveform during label-free imaging, obtaining a z-stack of images, each in one of multiple polarizations. Using the illustrated signals, synchronization is provided for the cameras, the piezoelectric z-stage, and the light sources in order to enable high speed imaging. Although FIG. 5C illustrates single wavelength illumination using light source 578, in other embodiments, different wavelengths are used for different exposure cycles, for example a first wavelength emitted by light source 578 during exposure cycle [0] and a second wavelength emitted by light source 578 during exposure cycle [1]. Thus, in addition to z-stacks of images for multiple polarizations at a single wavelength, z-stacks of images for multiple polarizations at multiple wavelengths can be obtained.

FIG. 5D is a plot illustrating stage position as a function of time for depth scanning in multiple channels according to an embodiment of the present invention. As illustrated in FIG. 5D, for combined fluorescence and label-free imaging, the piezoelectric z-stage is stepped in a saw tooth pattern with a differing rates of translation: a first rate of translation during illumination using light source 578 and a second, lower rate of translation during illumination using light source 576. As illustrated by camera exposure timeline 577, camera exposures during transmission imaging are more rapid than the elongated camera exposures utilized during fluorescent imaging. Two multichannel exposure cycles, with both transmission and fluorescent imaging in each exposure cycle, are illustrated and the inventors have determined that rapid modulation of the light sources and compatible optics reduce or eliminate the need for filter cube switching. Moreover, the multichannel scanning and multiplexed imaging illustrated by the stage scanning profile in FIG. 5D is applicable to the other imaging systems described herein, enabling collection of both fluorescent and transmission images of a specimen, either concurrently or sequentially, using any of the imaging systems described herein.

As an example of multichannel imaging, also referred to as multiplexed imaging, both transmission and fluorescent images were obtained and are discussed in relation to FIGS. 26A-26F. As illustrated in these figures, one benefit of the broadband detection enabled by embodiments of the present invention is that anisotropy and density can be measured at multiple wavelengths in transmission and the same broadband detection path can be used to measure anisotropy and density in fluorescence. Fluorophores bound to anisotropic structures will align with the structures, whereas, for fluorophores bound to isotropic structures, the alignment of the fluorophores will be random. Accordingly, anisotropy measurements in fluorescence using a variety of fluorescent labels are enabled by embodiments of the present invention.

FIG. 26A is a phase image of a plasma membrane in HEK293T cells according to an embodiment of the present invention. In this figure, the image brightness encodes intensity. A bright white pixel is fluorescent and isotropic and a bright colored pixel is fluorescent and anisotropic with orientation that matches the color. The field of view illustrated in FIG. 26A is also imaged in the images shown in FIGS. 26B and 26C. In order to multiplex phase and fluorescence images shown in FIG. 26A-26C, the multichannel scanning profile illustrated in FIG. 5D was utilized.

FIG. 26B is a fluorescence anisotropy and orientation image of a plasma membrane in HEK293T cells labeled with CAAX-mScarlet according to an embodiment of the present invention. In FIGS. 26B and 26C, the image brightness encodes intensity, the saturation of the color encodes anisotropy, and the color encodes orientation, with the color legend in the bottom right portion of FIGS. 26B and 26C showing the mapping of orientation to color. A bright white pixel is fluorescent and isotropic and a bright colored pixel is fluorescent and anisotropic with orientation that matches the color. In order to obtain the fluorescence image shown in FIG. 26B, the multichannel scanning profile illustrated in FIG. 5D was utilized. In this image, the isotropic signal from the membrane labeled with CAAX-mScarlet is illustrated and can be overlaid with the phase image shown in FIG. 26A.

FIG. 26C is a fluorescence anisotropy and orientation image of F-actin in HEK293T cells labeled with SiR-Actin according to an embodiment of the present invention. In order to obtain the fluorescence image shown in FIG. 26C, the multichannel scanning profile illustrated in FIG. 5D was utilized. In this image, the anisotropic bundles of F-actin stained with SiR-actin are visible in fluorescence.

Figure 27A:
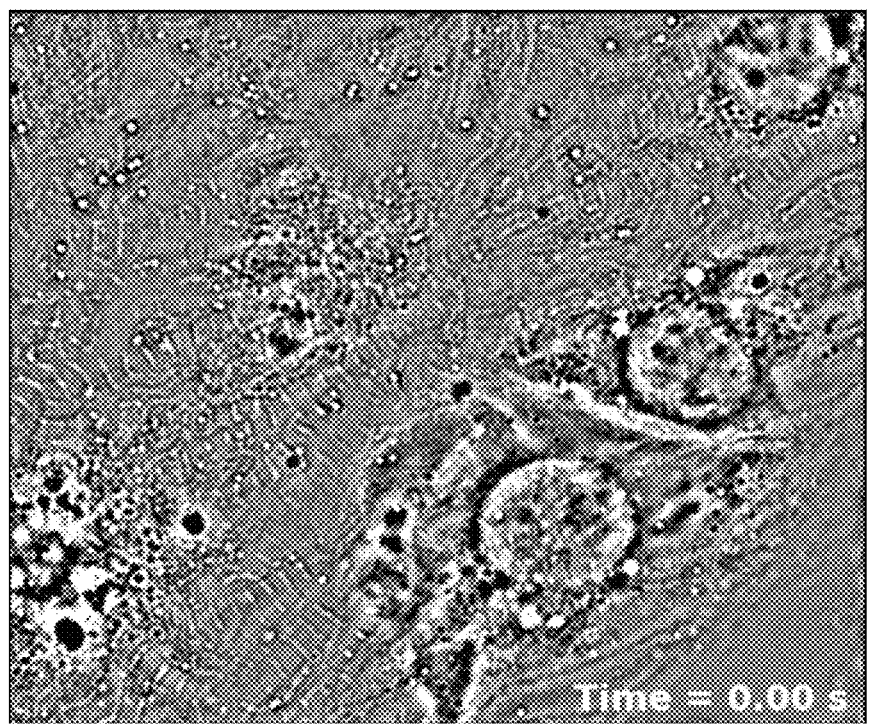
FIG. 27A is a phase image of cardiomyocytes obtained using embodiments of the present invention.
Figure 27B:
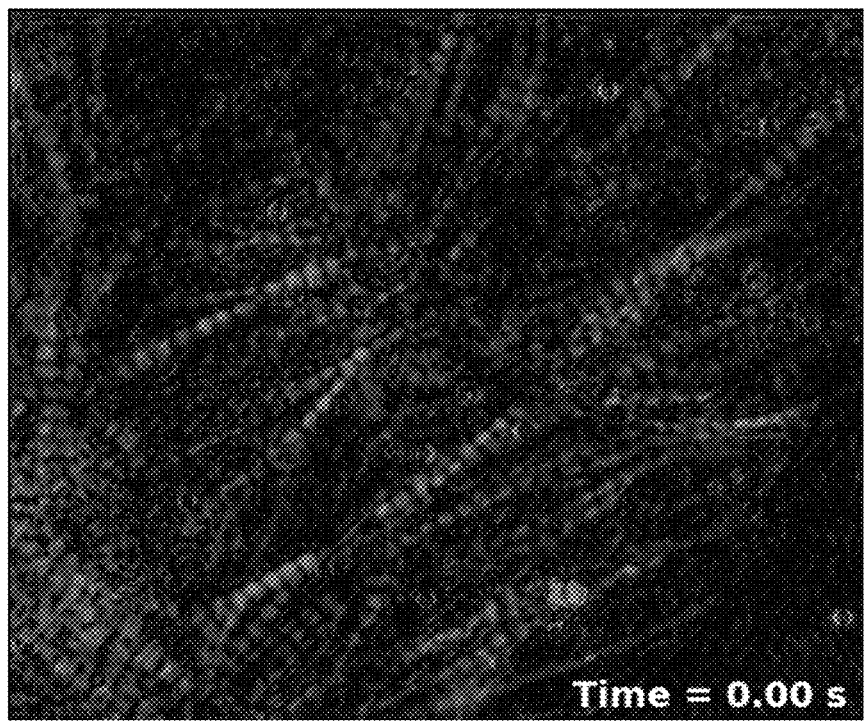
FIG. 27B is a retardance and orientation overlay image of the cardiomyocytes obtained using embodiments of the present invention.

FIG. 26D is a transmission image of iPSC-derived cardiomyocytes according to an embodiment of the present invention. The field of view illustrated in FIG. 26D is also imaged in the images shown in FIGS. 26E and 26F. In the transmission image shown in FIG. 26A, the overall cell morphology is visible. Using embodiments of the present invention, the combined measurement of phase and retardance of iPSC-derived cardiomyocytes, including the formation of an overlay image showing both phase and retardance, enables label-free imaging of myofibril distribution while resolving components of sarcomeres. iPSC derived cardiomyocytes can beat fast depending on their functional state. The contractile activity and 3D architecture of sarcomeres can be imaged in terms of the phase and retardance using the fast z-scanning mode illustrated in FIG. 5C. FIG. 27A is a phase image of cardiomyocytes obtained using embodiments of the present invention. FIG. 27B is a retardance and orientation overlay image of the cardiomyocytes obtained using embodiments of the present invention. As illustrated in FIG. 27B, the phase and retardance overlay shows the position of z-disks and A-bands. Accordingly, label-free imaging of myofibril distribution while resolving components of sarcomere dynamics in iPSC-derived cardiomyocytes is provided by embodiments of the present invention.

FIG. 26E is a fluorescence anisotropy and orientation image of DNA stained with a nucleic acid stain according to an embodiment of the present invention. In this image, DNA stained with Hoechst-33342 appears isotropic and the positions of the nuclei shown in FIGS. 26D and 26E can be correlated.

FIG. 26F is a fluorescence anisotropy and orientation image of F-actin labeled with SiR-actin according to an embodiment of the present invention. This fluorescence image shows the actin network that is not visible in transmission and the fluorophore orientation perpendicular to the fibers.

Accurate calibration of the imaging system is utilized in order to convert the recorded raw intensity images into Stokes images that can be used for reconstruction of the sample properties. In order to determine the calibration tensor A), for the imaging system, the imaging system is subjected to known Stokes vectors. In an embodiment, calibration of the imaging system is performed in three steps—1) spatial registration of the four cameras, 2) calibration of the transmitted light source polarization state, and 3) computing an instrument tensor which maps the Stokes parameters of the illumination light to the intensity images recorded by the four-camera polarization-resolved imaging system. The calibration tensor formalism extends the previously described instrument matrix formalism to account for spatial variations in the optical system. When the instrument tensor is either sampled or averaged to capture a location-independent calibration, it is the same as the instrument matrix. Fluorescence anisotropy measurements further require calibration of the fluorescence light source polarization state. It is important to note that the calibration process described herein works at each wavelength and enables correction of deviations from the broadband performance that is commonly encountered in polarization optics.

Figure 6A:
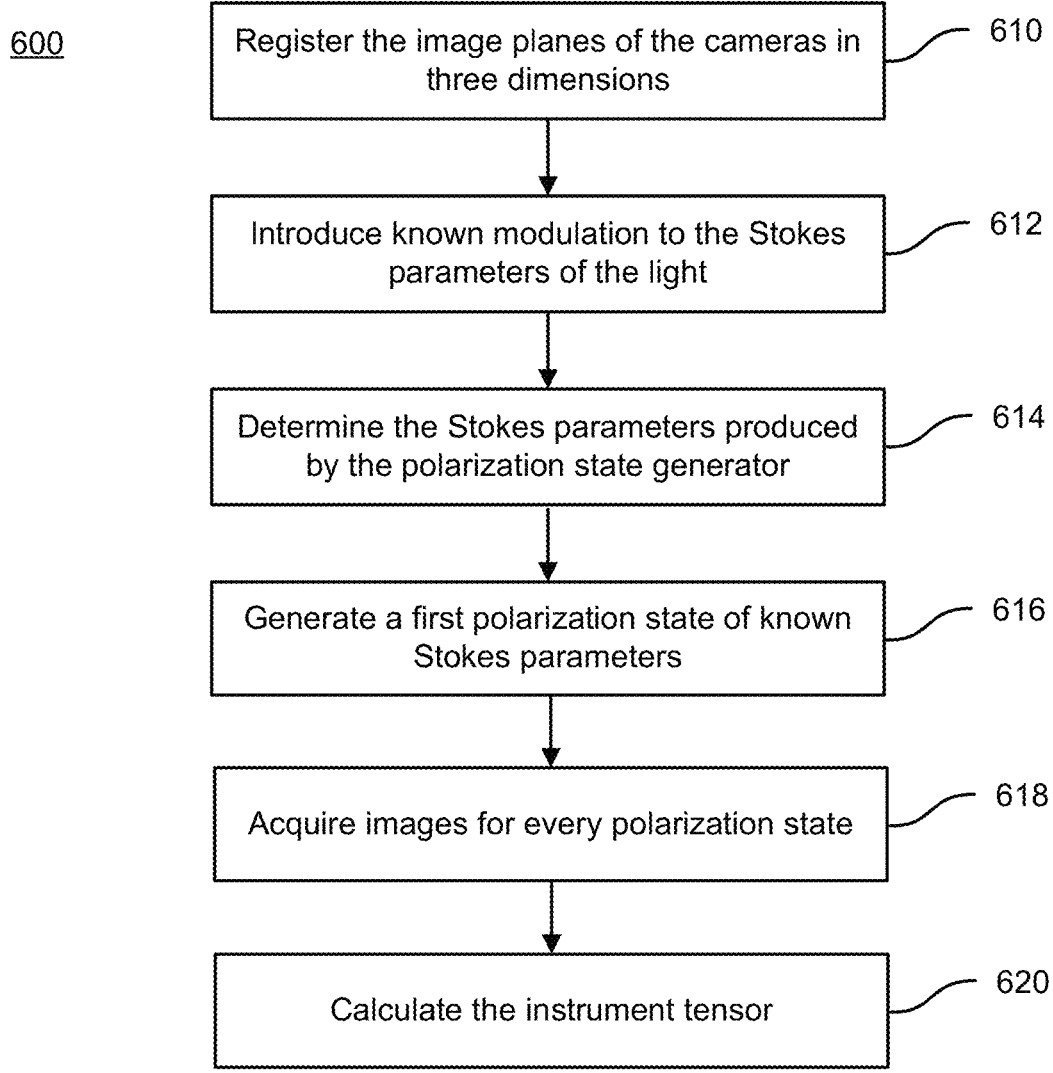
FIG. 6A is a simplified flowchart of a calibration process according to an embodiment of the present invention.

FIG. 6A is a simplified flowchart of a calibration process according to an embodiment of the present invention. The procedure discussed in relation to FIG. 6A can be utilized to calibrate the instrument at one wavelength and is then repeated at each wavelength. The method 600 includes, if using a polarization-resolved imaging system with multiple cameras, registering the image planes of the cameras in three dimensions (610). In an embodiment, this is performed by a) imaging a common sample (e.g. an Argolight target) using all cameras of the polarization-resolved imaging system, b) computing a spatial transformation matrix that results in overlap of features present in all camera images, and c) applying the spatial transformation matrix to all camera images.

The method also includes using a polarization state generator positioned at the sample plane to introduce known modulation to the Stokes parameters of the light (612). As an example, a high-extinction linear polarizer can be rotated as a polarization state generator. The method further includes determining the Stokes parameters produced by the polarization state generator (614). In some of the microscopes described herein, the angle of the transmission axis of the polarizer, $\theta_0$, and the Stokes vector of the light incident on the linear polarizer, $S_{ex}$, are determined to determine the Stokes parameters produced by the polarization state generator.

The following steps outline one method of determining the Stokes parameters of light exiting the linear polarizer: (i) remove the 50/50 non-polarizing beam splitter 530 (this allows polarizing beam splitter 532 in transmission mode to be treated as an ideal linear polarizer oriented at 0°); (ii) rotate the linear polarizer through a range of angles; (iii) for every angle, record the intensity incident on camera $I_0$; (iv) determine $S_i$ and $\theta_0$ from a fit to the following equation, where $M_{LP}(\theta)$ is the Muller matrix of an ideal linear polarizer at angle $\theta$:

$$I_0(\theta)=M_{LP}(0)*M_{PSG}(\theta+\theta_0)*S_i;$$

(v) calculating the Stokes vector of light exiting the linear polarizer at angle $\theta$ as:

$$S_{samp}=M_{PSG}(\theta+\theta_0)*S_i;\text{ and}$$

(vi) replace the 50/50 non-polarizing beam splitter 530. In some embodiments, at step (iii), camera $I_{45}$, $I_{90}$, or $I_{135}$ can be utilized in place of camera $I_0$, with corresponding changes to the intensity model.

Referring once again to FIG. 6A, the method includes setting the polarization stage generator to generate a first polarization state of known Stokes parameters $S_{samp}$ (616). For every polarization state, images I are acquired with the polarization-resolved imaging system (618). Steps 614 and 616 are repeated for a plurality of states of the polarization stage generator.

Furthermore, the method includes calculating the instrument tensor A as follows (620):

$$I = \begin{bmatrix} I_0 \\ I_{45} \\ I_{90} \\ I_{135} \end{bmatrix} = A * S_{samp}$$

$$A = I S_{samp}^{-1}$$

It should be appreciated that the specific steps illustrated in FIG. 6A provide a particular method of performing a calibration process according to another embodiment of the present invention. Other sequences of steps may also be performed according to alternative embodiments. For example, alternative embodiments of the calibration may use polarization state generator that uses unpolarized illumination. Further, alternative embodiments of the present disclosure may perform the steps outlined above in a different order. Moreover, the individual steps illustrated in FIG. 6A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6B:
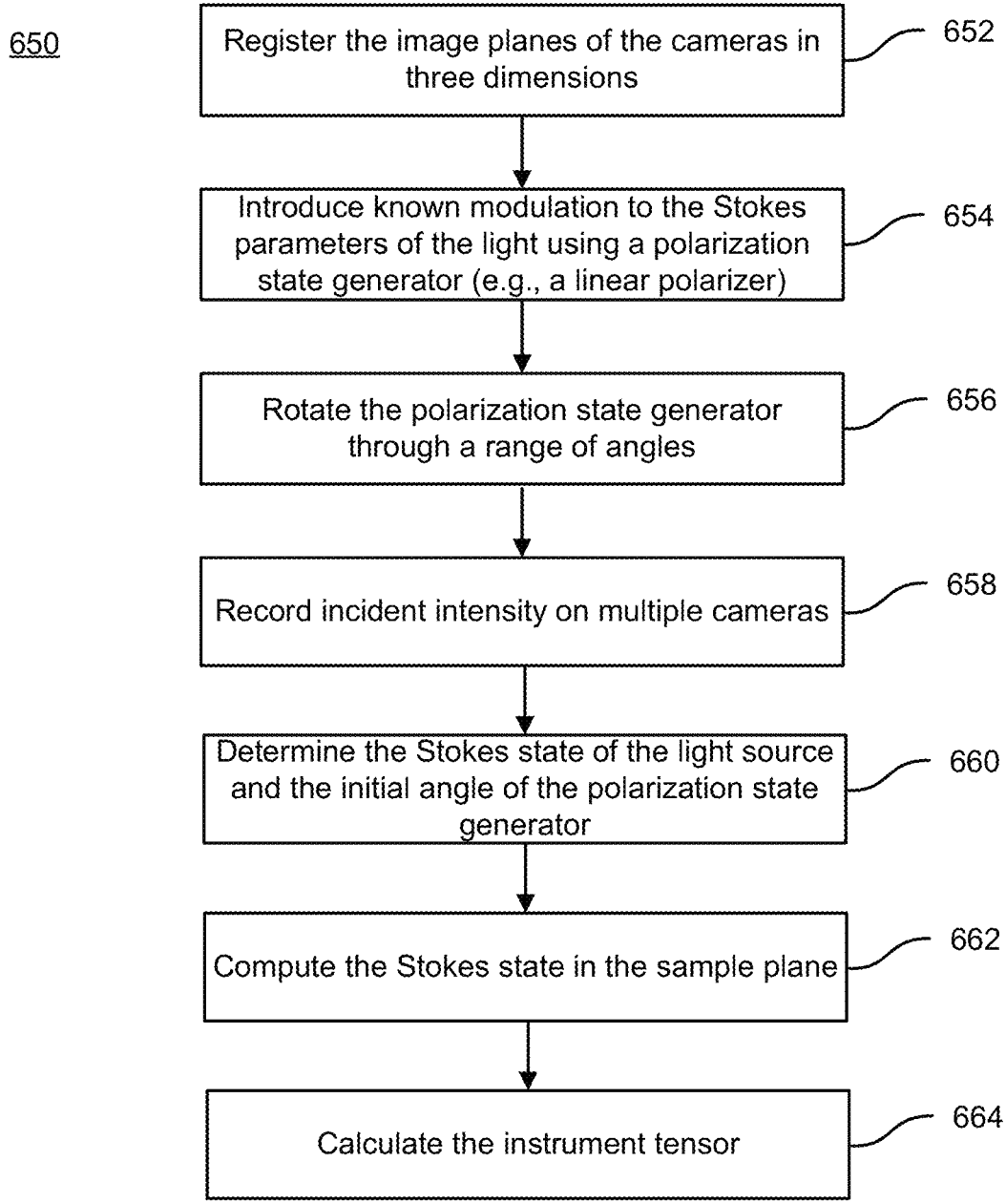
FIG. 6B is a simplified flowchart of a calibration process according to another embodiment of the present invention.

FIG. 6B is a simplified flowchart of a calibration process according to another embodiment of the present invention. In the embodiment illustrated in FIG. 6B, the 50/50 non-polarizing beam splitter 530, as well as polarizing beam splitter 532 and polarizing beam splitter 542, remain in place in the light-path during calibration and the calibration process can be referred to as a single-step calibration method. The procedure discussed in relation to FIG. 6B can be utilized to calibrate the instrument at one wavelength and can then be repeated at each additional wavelength.

The method 650 includes registering the image planes of the cameras in three dimensions (652). In an embodiment, this is performed by a) imaging a common sample (e.g. an Argolight target) using all cameras of the polarization-resolved imaging system, b) computing a spatial transformation matrix that results in overlap of features present in all camera images, and c) applying the spatial transformation matrix to all camera images.

The method also includes using a polarization state generator, for example, a high-extinction linear polarizer, positioned at the sample plane, to introduce known modulation to the Stokes parameters of the light (654). The method further includes rotating the polarization state generator (e.g., the linear polarizer) through a range of angles (656), and, for every angle, recording the intensity incident on the four cameras $I_0$, $I_{45}$, $I_{90}$, and $I_{135}$ in the four polarization paths of the microscope (658). The method further includes determining (660) the Stokes state of the light source, $S_i$, and the initial angle of the polarization state generator, $\theta_o$, from a fit to the $I_0$ intensity as a function of the polarizer angle $\theta$ using the following equation:

$$I_0(\theta)=M_{LP}(0)*M_{50/50}*M_{PSG}(\theta+\theta_0)*S_i,$$

where $M_{PSG}(\theta)$ is the Muller matrix of the polarization state generator, e.g., an ideal linear polarizer, at angle $\theta$ and $M_{50/50}$ is the Mueller matrix of a linear diattenuator with 50% transmission.

The method additionally includes computing (662) the Stokes state in the sample plane, $S_{samp}$, by multiplying the Mueller matrix for the polarization stage generator by the Stokes state of the light source: $S_{samp}=M_{PSG}(\theta+\theta_0)*S_i$. The method also includes calculating the instrument tensor (662) from the Stokes state in the sample plane, $S_{samp}$, and the measured intensities in the four channels at every pixel, I(r), as:

$$A=I(r)*S_{samp}^{-1}$$

It should be appreciated that the specific steps illustrated in FIG. 6B provide a particular method of performing a calibration process according to another embodiment of the present invention. Other sequences of steps may also be performed according to alternative embodiments. For example, alternative embodiments of the present invention may perform the steps outlined above in a different order. Moreover, the individual steps illustrated in FIG. 6B may include multiple sub-steps that may be performed in various sequences as appropriate to the individual step. Furthermore, additional steps may be added or removed depending on the particular applications. One of ordinary skill in the art would recognize many variations, modifications, and alternatives.

In these embodiments, we utilize a spatially varying instrument tensor. The quantities $I_0$, $I_{45}$, $I_{90}$, $I_{135}$ are two-dimensional images (not averages of the image intensity as is common). This allows accounting for spatial polarization distortions. Moreover, the spatially varying instrument tensor is calculated as follows:

$$I_{ink} = \sum_j A_{ijk} S_{jnk}$$

$$A_{ijk} = \sum_n I_{ink} S_{jnk}^{-1}$$

where i is the number of microscope channels (i=4), j is the number of Stokes vector components (in the systems described herein, j=3, since $S_3$ cannot be measured), k is the number of image pixels (k=5.0 megapixels), and n is the number of calibration measurements (n=351). It should be noted that the index numbers and variables (i.e., i, j, k, and n) correspond to a particular embodiment as described herein and can be varied in other implementations.

The images recorded by the four cameras of four-camera polarization-resolved imaging system may have spatial misregistration even after careful alignment. Accordingly, transformation matrices can be calculated that will align the $I_{45}°$, $I_{90}°$, and $I_{135}°$ channels to the $I_0°$ channel.

Figure 7:
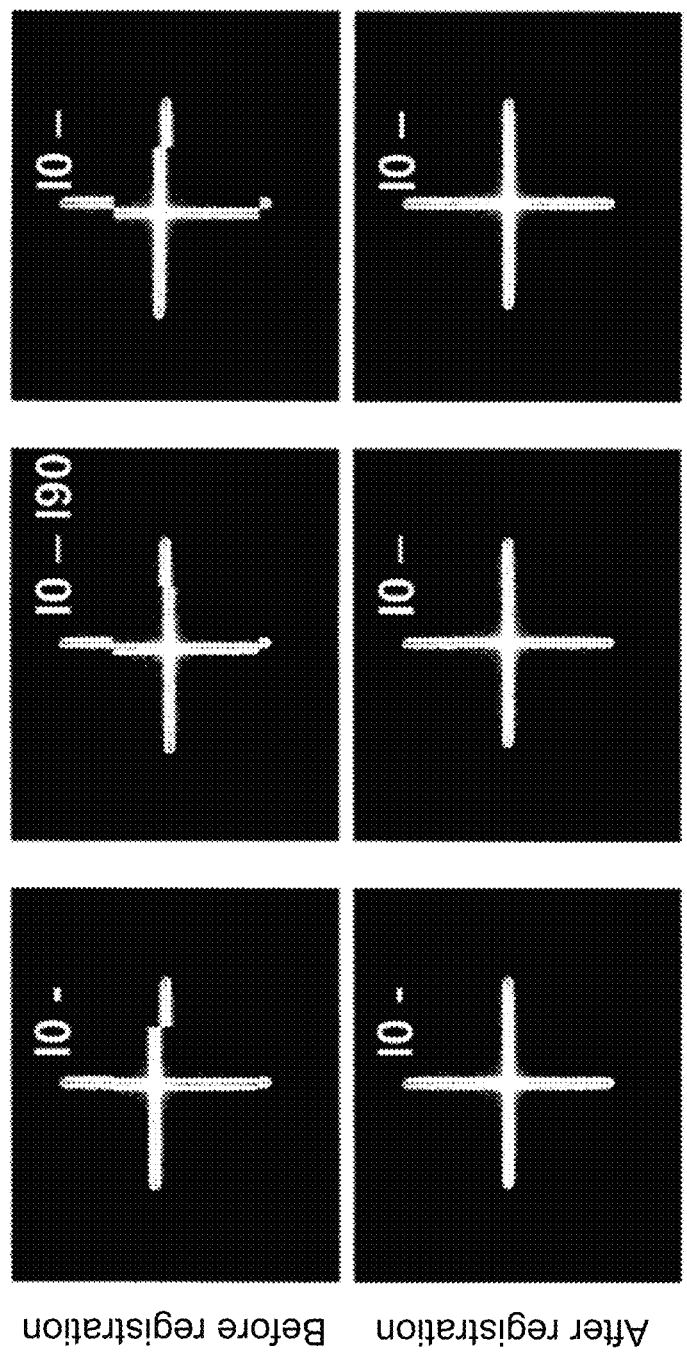
FIG. 7 shows overlays of sets of images before and after correction of spatial mis-registration according to an embodiment of the present invention.

In one implementation, an Argolight test target, which emits nearly isotropic light, was imaged through four-camera polarization-resolved imaging system 528 as illustrated in FIG. 5A. FIG. 7 shows overlays of sets of images before and after correction of spatial mis-registration according to an embodiment of the present invention. As an example, registration is achieved using the imregcorr algorithm available in MATLAB, which uses a phase correlation algorithm to calculate a similarity transform, accounting for translation, rotation, and scaling between the input images.

FIGS. 8A-8L illustrate components of a calibration tensor and their deviation from the theoretical values according to an embodiment of the present invention. Images shown in FIGS. 8A-8L illustrate the distribution of instrument tensor component $A_{ij}$ over the dimensions of the image. The color bar on each image is centered at the theoretical value of that component of the instrument tensor ($A_{ij}^{theoretical}$), shown as a black line across the color bar:

$$A_{ij}^{theoretical} = \begin{bmatrix} 0.25 & 0.25 & 0 \\ 0.25 & 0 & 0.25 \\ 0.25 & -0.25 & 0 \\ 0.25 & 0 & -0.25 \end{bmatrix}$$

The mean value of the calibrated instrument tensor across the images is:

$$\langle A_{ij} \rangle = \begin{bmatrix} 0.2612 & 0.2608 & -0.0006 \\ 0.2005 & -0.0017 & 0.1997 \\ 0.1987 & -0.1992 & -0.0067 \\ 0.2170 & -0.0363 & -0.2121 \end{bmatrix}$$

The calibration is performed at 525 nm. The grey value of the image shows the deviation of the calibrated instrument tensor from the theoretical value of the instrument tensor. Small variation in grey value across each image further shows the distribution of that instrument tensor component across the image space. Spatial calibration of the instrument tensor accounts for polarization distortions across the field of view.

FIG. 9 is a table illustrating calibrated Stokes vectors for illumination light $S_{in}$ and the average instrument tensor $\langle A_\lambda \rangle$ at eight different wavelengths. In FIG. 9, wavelengths of nm, 460 nm, 500 nm, 525 nm, 580 nm, 660 nm, 740 nm, and 770 nm are utilized. Based on the second ($S_1$) and third ($S_2$) value of the Stokes vector, the illumination light is of approximately circular polarization at all wavelengths. Deviation from circular state is accounted for by the calibration and reconstruction algorithms discussed herein. Presented values of the average instrument tensor $\langle A_\lambda \rangle$ show the change in instrument tensor components with wavelength. Accurate calibration at each wavelength is critical for the reconstruction of wavelength-dependent material properties.

FIGS. 10A-10E show the contribution of steps of the procedure for calibrating the instrument tensor to the overall accuracy in determining $S_1$ parameter. Plotted is the error in measuring the $S_1$ parameter, i.e. $S_1^{input} - S_1^{measured}$, for 200 pixels spaced along the image diagonal as a function of the angle of a linear polarizer placed at the sample plane when using (FIG. 10A) the complete procedure for calibrating the instrument tensor, (FIG. 10B) using the calibration procedure omitting the spatial registration of the four cameras, (FIG. 10C) using the calibration procedure omitting the determination of the Stokes parameter of input light $S_{illumination}$, (FIG. 10D) using the average instrument tensor $\langle A_{ij} \rangle$, and (FIG. 10E) omitting the calibration procedure and using the theoretical value of the instrument matrix.

Figure 10A:
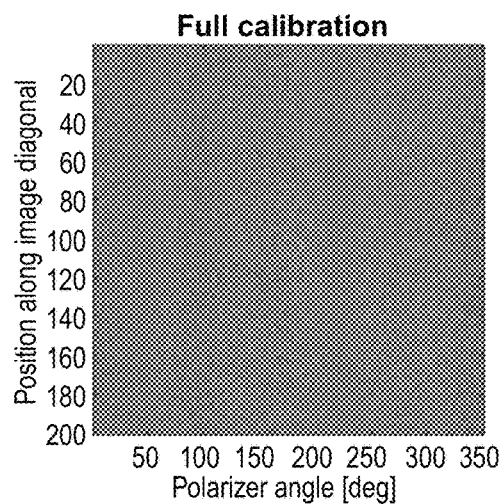
FIG. 10A-10E illustrate the contribution of steps of the procedure for calibrating the instrument tensor to the overall accuracy in determining the $S_1$ parameter.
Figure 10D:
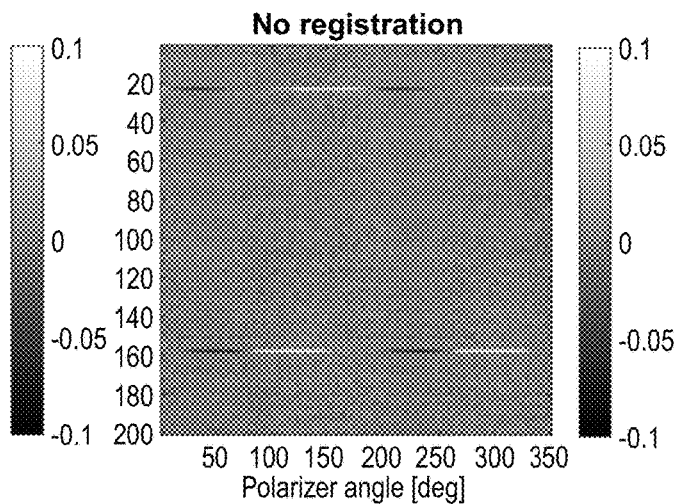
Figure 10B:
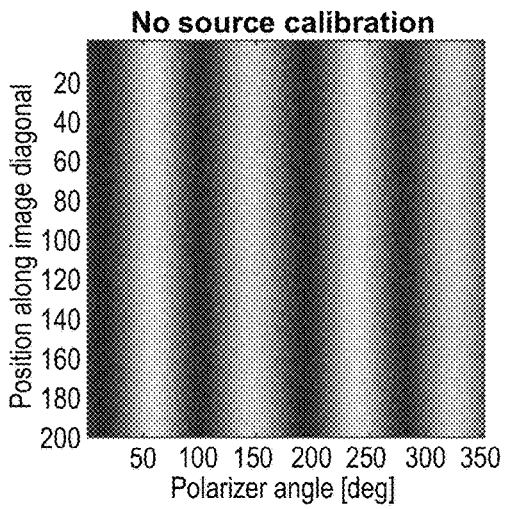
Figure 10E:
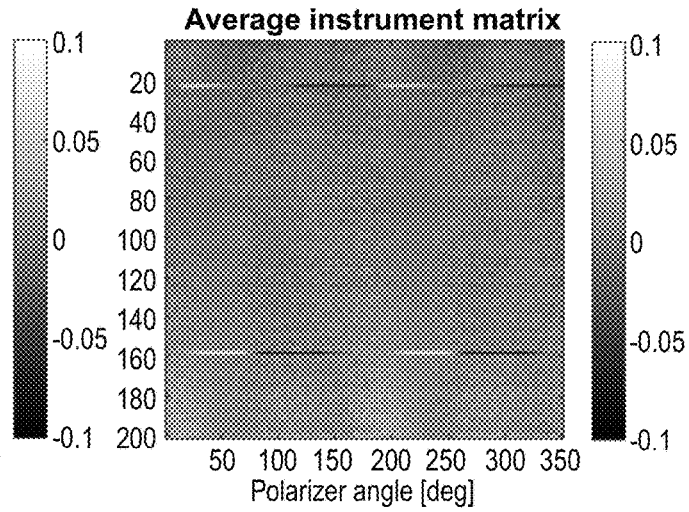
Figure 10C:
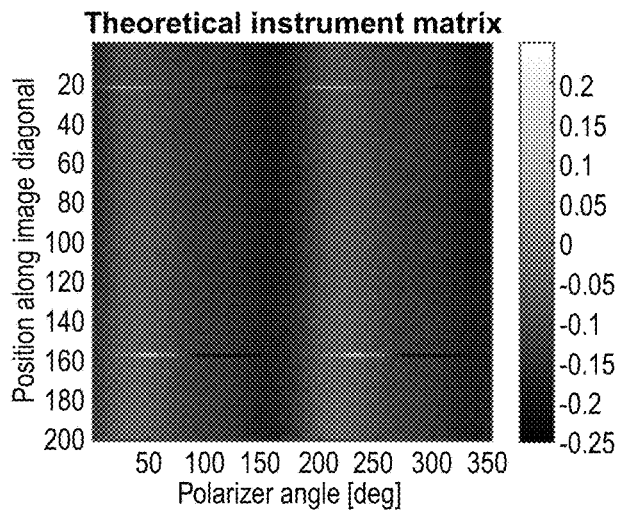

Referring to FIG. 10A, using the full calibration procedure leads to unbiased determination of the $S_1$ parameter. The measurement is limited by photon shot noise. Referring to FIG. 10B, omitting the spatial registration of the four cameras leads to a large error in determining the $S_1$ parameter for some pixels, which may be "hot pixels" or may have reduced transmission due to dust on the imaging optics. The error for most other pixels is lower, but still higher compared to using the full instrument tensor calibration procedure. Referring to FIG. 10C, omitting the calibration of the Stokes parameter of input light $S_{illumination}$ results in large error, which is periodic in the value of the polarizer angle, i.e. dependent on the value of the $S_1$ parameter. Referring to FIG. 10D, using the average instrument tensor $\langle A_{ij} \rangle$ results in large error in determining the $S_1$ parameter for some pixels, which may be "hot pixels" or may have reduced transmission due to dust on the imaging optics. The error also varies with pixel position along the image diagonal, suggesting spatial variation of the polarization distortions. Referring to FIG. 10E, using the theoretical instrument matrix leads to large error in determining the $S_1$ parameter. Note the expanded color scale of this panel.

Similar trends are observed when considering the error in measuring the $S_2$ parameter, i.e. $S_2^{input} - S_2^{measured}$.

Figure 11A:
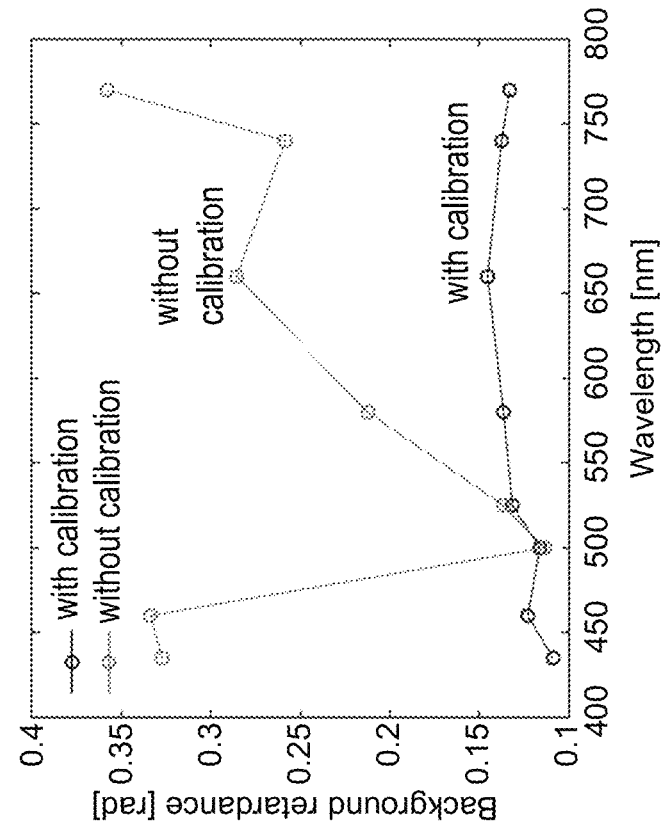
FIGS. 11A-11B are plots showing the retardance in a background region with and without calibration reported in radians and nanometers.
Figure 11B:
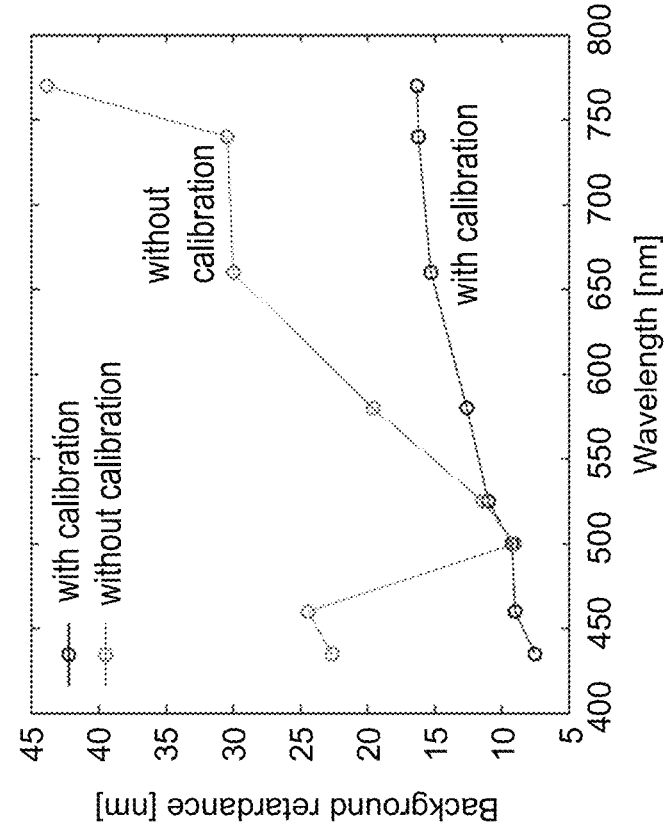

FIGS. 11A-11B show the importance of wavelength-dependent calibration in measuring retardance. Background retardance in a glass slide was computed using wavelength-dependent calibration (black lines) or by applying the instrument matrix calibrated at 525 nm across all wavelengths (gray lines). FIG. 11A shows the measured retardance in nanometers and FIG. 11B shows the measured retardance in radians. Large error in the measured retardance is observed when wavelength-dependent calibration is not performed, obscuring the trend of increasing retardance in nanometers with increasing wavelength.

The spatial resolution of the imaging system was measured using an Argolight test target and the Daybook analysis software available from Argolight of Pessac, France. The Argolight test target has fluorescent line structures at decreasing spacing. As the line spacing decreases, the microscope loses the ability to resolve peaks from each line. The line spacing at which 26.5% contrast between the two lines is reached is defined as the Rayleigh contrast criterion. The microscope resolution is given by ½ of the line spacing at the Rayleigh contrast criterion.

The measured spatial resolution in the four channels of four-camera polarization-resolved imaging system 528 was found to be:

| Channel | Wavelength | Resolution |
| --- | --- | --- |
| $I_{0°}$ | 530 nm | 247 nm |
| $I_{45°}$ | 530 nm | 259 nm |
| $I_{90°}$ | 530 nm | 261 nm |
| $I_{135°}$ | 530 nm | 302 nm |

The theoretical Rayleigh resolution limit is given by $r=0.61\lambda/NA$. At $\lambda$=nm; used for this measurement, the theoretical resolution is r=270 nm. The inventors have determined that in one implementation, the imaging system meets or exceeds the resolution limit in the $I_{0°}$, $I_{45°}$, and $I_{90°}$ channels. In this particular implementation, the resolution of the $I_{135°}$ channels was 1.1 times larger than the resolution limit; however, the present invention is not limited by this implementation and, in other implementations, the imaging system meets or exceeds the resolution limit in all channels. Thus, embodiments of the present invention achieve diffraction-limited performance.

Figure 12A:
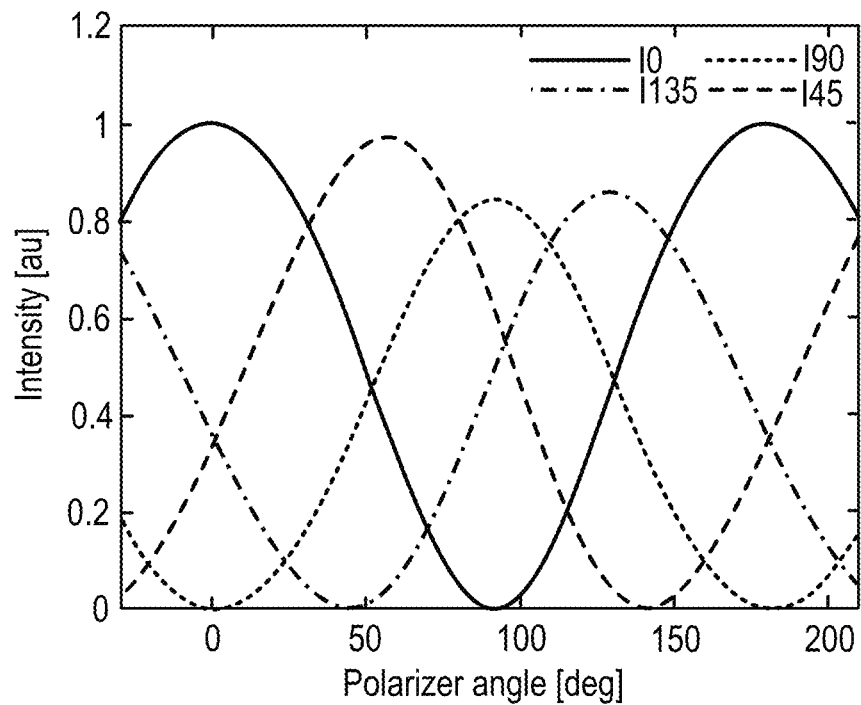
FIGS. 12A-12B are plots illustrating extinction ratios that are achieved using embodiments of the present invention.
Figure 12B:
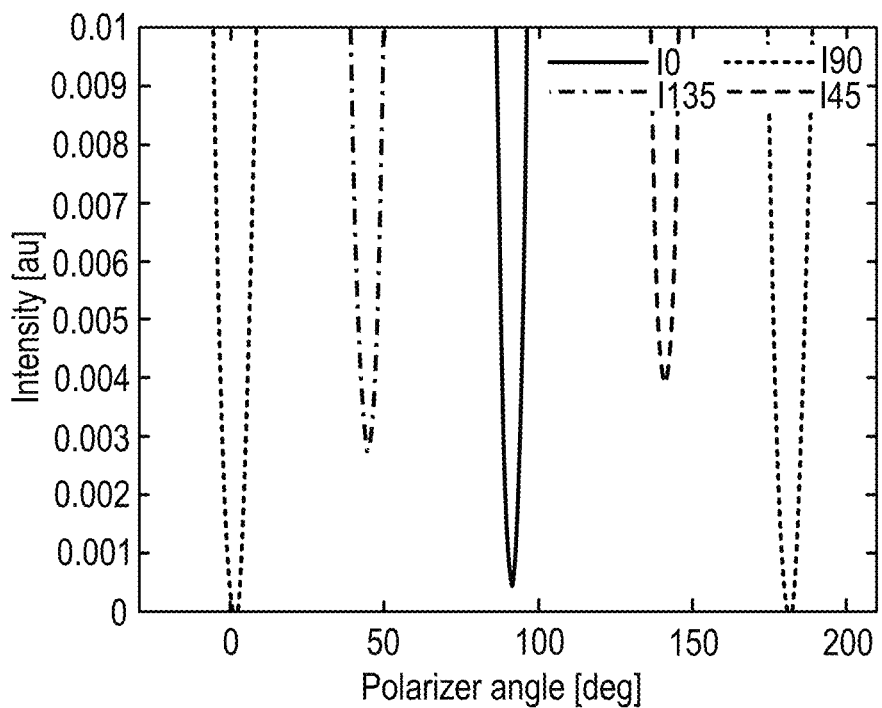

The ability of a polarized microscope to detect weakly birefringent materials is limited by the extinction ratio it can achieve. The extinction ratio is defined as the ratio of maximum to minimum intensity that is detected. FIG. 12A shows the intensity of each of the four channels of a four-camera polarization-resolved imaging system measured as a linear polarizer is rotated in the specimen plane. FIG. 12B is a plot illustrating an enlarged portion of the plot shown in FIG. 12A. The measured extinction ratio for each channel is:

| Channel | Extinction ratio |
| --- | --- |
| $I_{0°}$ | 2400:1 |
| $I_{45°}$ | 250:1 |
| $I_{90°}$ | 3200:1 |
| $I_{135°}$ | 310:1 |

FIG. 13A is a simplified schematic diagram illustrating the use of a single camera to perform polarization-resolved imaging according to an embodiment of the present invention. In this embodiment, a single camera is used to achieve simultaneous detection of multiple polarization channels. As illustrated in FIG. 13A, and similar to the other optical systems described herein, the system includes a light source 1310, a circular polarizer 1312, and a sample holder that can support sample 1314, also referred to as a specimen. The system further includes objective 1316, mirror 1318, tube lens 1320, and polarization-resolved camera 1380. Referring to FIG. 13B, the polarization-resolved camera 1380 is placed in the primary image plane 522 illustrated in FIG. 5A. Light of any polarization state 1384 is incident on lens 1382, which focuses light onto polarization-resolved camera 1380.

An example of a polarization-resolved camera is shown in FIG. 13B. In order to obtain images for light in each of the four linearly polarized states, each pixel set includes four polarization-resolved pixels with wire-grid polarizers oriented at 0°, 45°, 90°, and 135° that are integrated in front of the pixels. As an example, the BFS-U3-51S5P-C camera, available from FLIR® Systems, Inc., can be utilized as polarization-resolved camera 1380. Other orientations of the wire-grid polarizers are also possible. Additional phase masks may also be applied before the polarizer at each pixel to detect custom polarization states. In other embodiments, other polarization states can be utilized, for example, $I_{circular}$, $I_0°$, $I_{60°}$ and $I_{120°}$.

Although the extinction ratio of some polarization-resolved camera (e.g., <500:1) is lower than that achievable in the imaging system described in relation to FIG. 2 (up to and exceeding 4,000:1), the polarization-resolved camera illustrated in FIG. 13B can be suitable for imaging samples with high birefringence.

Figure 14:
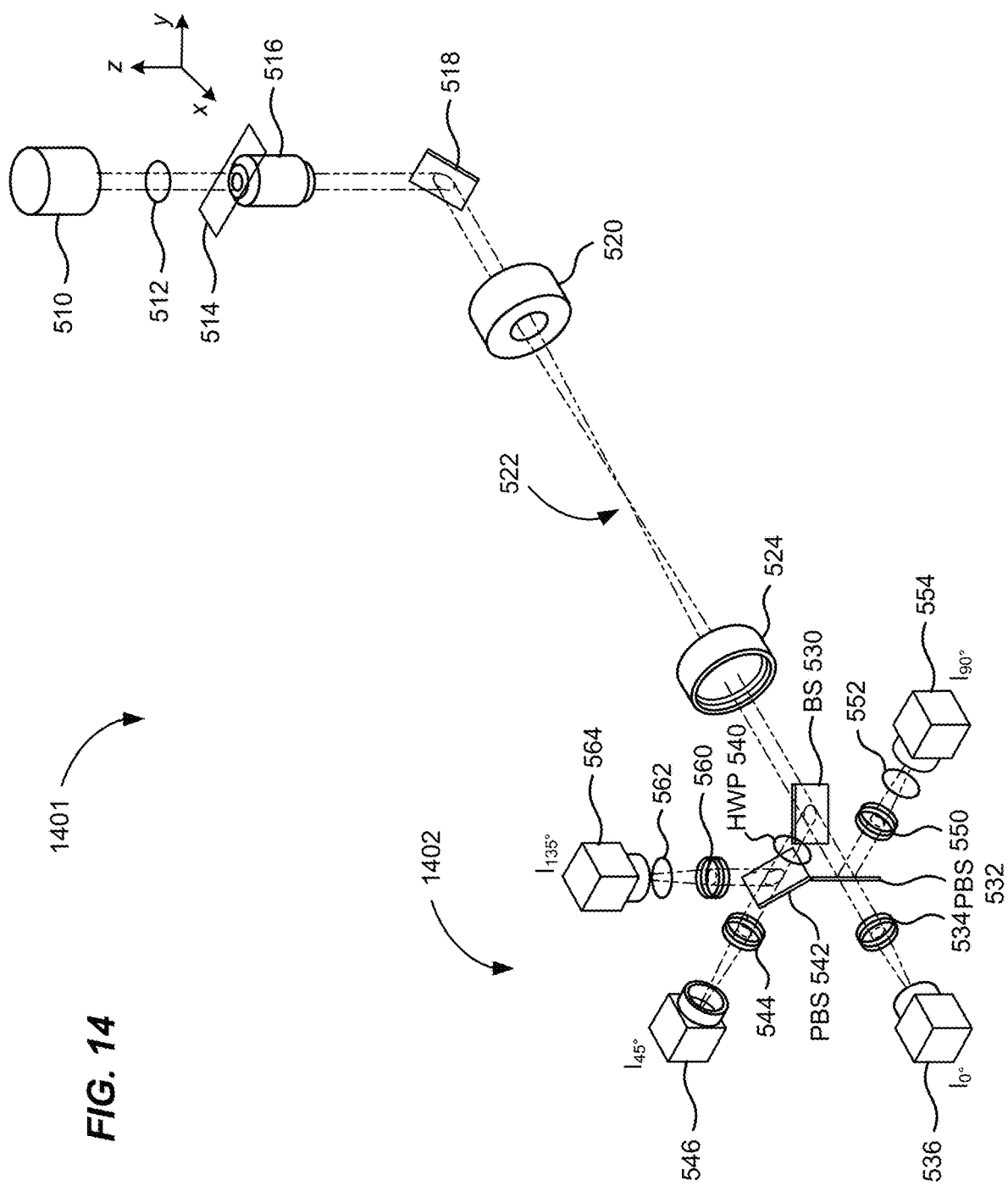
FIG. 14 is a simplified schematic diagram illustrating a spectral, multi-camera polarization-resolved imaging system according to an alternative embodiment of the present invention. The cameras detect polarized light at different focal planes of the specimen.

FIG. 14 is a simplified schematic diagram 1401 illustrating a spectral, multi-camera polarization-resolved imaging system according to an alternative embodiment of the present invention. FIG. 14 includes elements illustrated in FIG. 5A and the description provided in FIG. 5A is applicable to FIG. 14 as appropriate. As illustrated in FIG. 14, in addition to having four cameras focused on a single focal plane (as shown in FIG. 5A), embodiments of the present invention can utilize a plurality of (e.g., four) cameras that are focused at different focal planes to provide a system that is able to perform a single-shot reconstruction of density, anisotropy, orientation, and depolarization. As described more fully below, the optical system 1401 illustrated in FIG. 14 can be utilized to perform imaging of three-dimensional specimens, for example, biological materials, such as cells and tissues, or inorganic materials, such as mineral crystals and plastics.

Referring to FIG. 14, illumination source 510 is utilized to generate illumination light and circular polarizer 512 is used to provide illumination light with a predetermined polarization state. The illumination light at a predetermined wavelength impinges on a specimen supported on specimen holder 514, also referred to as a sample stage. Light scattered as it passes through the specimen is collected by imaging optics 516, reflected off mirror 518, and directed toward lens 520, which may be a tube lens. Lens 520 serves to focus the scattered light at image plane 522, which typically serves as the camera port of the microscope.

In order to provide polarization channels, light propagating away from image plane is collimated using lens 524 and directed to four-camera polarization-resolved imaging system 502. Lens 524 provides an aperture space in which the polarization optics are positioned.

Four-camera polarization-resolved imaging system 1402 shares common elements with four-camera polarization-resolved imaging system 528 discussed in relation to FIG. 5A. However, rather than each of cameras 536, 546, 554, and 564 being focused on image plane 522, at which an image of the specimen is formed, each of the cameras is focused at different axial positions along the z-axis.

Utilizing multiple cameras that are focused at different axial positions, also referred to as longitudinal positions (i.e., different positions along the z-axis) single-shot phase and birefringence measurements are enabled. Referring to FIG. 14, cameras 536, 546, 554, and are positioned in a manner such that each of the cameras is focused on a different focal plane (i.e., a different specimen plane along the z-direction). In other words, all four cameras are located at different axial positions in the image space that are conjugate to different planes in the specimen volume. The physical position of the cameras can be set in order to provide imaging in different focal planes. Alternatively, all four cameras can be located at the same axial position in the image space, but conjugate to different planes in the specimen volume via independent modification of the aperture planes of the cameras.

As an example, camera 536 can be focused on focal plane $z_0$, which can be aligned with a first plane inside the specimen; camera 546 can be focused on focal plane $z_1 > z_0$, which can be aligned with a second plane inside the specimen; camera 554 can be focused on focal plane $z_2 > z_1$, which can be aligned with a third plane inside the specimen; and camera can be focused on focal plane $z_3 > z_2 > z_1 > z_0$, which can be aligned with a fourth plane inside the specimen. Thus, each camera, which measures light having a polarization state aligned with either 0° ($I_0°$), 45° ($I_{45}°$), 90° ($I_{90}°$), or 135° ($I_{135}°$), is focused at a different plane. Since each of the cameras receives an image of a portion of the specimen positioned in a different axial plane, simultaneous reconstruction of phase and birefringence from a single set of four defocused polarization channels can then be carried out using joint deconvolution.

Figure 15:
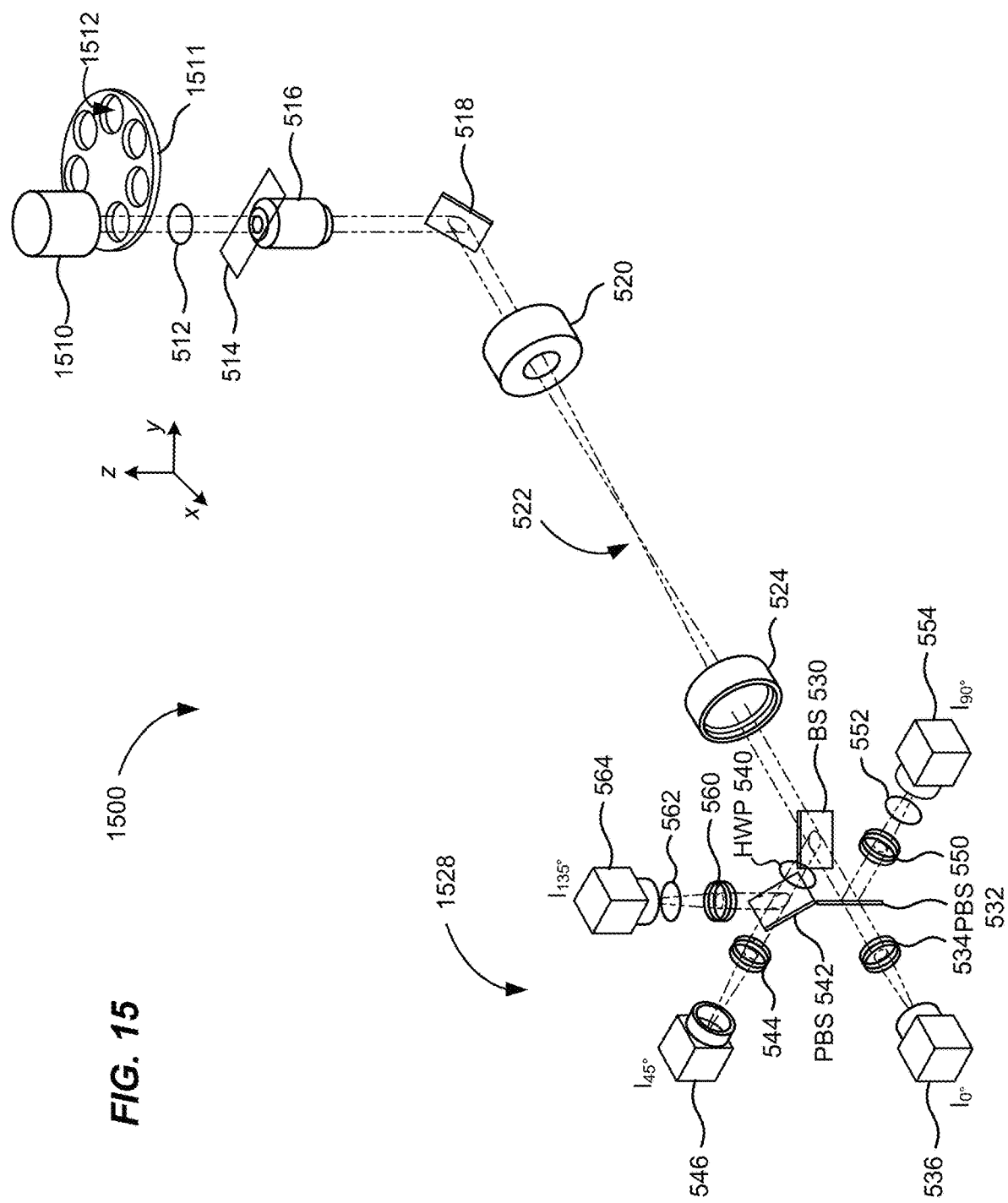
FIG. 15 is a simplified schematic diagram illustrating a spectral, multi-camera polarization-resolved imaging system utilizing a broadband source and bandpass filters according to an embodiment of the present invention.

FIG. 15 is a simplified schematic diagram illustrating a spectral, multi-camera polarization-resolved imaging system utilizing a broadband source and bandpass filters 1500 according to an embodiment of the present invention. FIG. 15 includes elements illustrated in FIG. 5A and the description provided in FIG. 5A is applicable to FIG. 15 as appropriate. As illustrated in this configuration suitable for spectral imaging, birefringence and/or phase measurements at multiple wavelengths can be performed by using broadband illumination source 1510 and interchangeable set of bandpass filters 1511. In FIG. 15, each aperture 1512 of interchangeable set of bandpass filters 1511 passes a predetermined wavelength or range of wavelengths. In addition to a broadband source and a set of bandpass filters, other sources of wavelength-controlled light can be utilized, for example, a programmable light source that emits predetermined wavelengths or ranges of wavelengths. Cameras 536, 546, 554, and 564 can be focused on a same plane as discussed in relation to FIG. 5A or focused on different planes as discussed in relation to FIG. 14.

In operation, the spectral, multi-camera polarization-resolved imaging system utilizing a broadband source and bandpass filters 1511 is operated to generate illumination light having a first wavelength or first wavelength range. The specimen is positioned at a first specimen position defining a first lateral position in the x-y plane and a first axial position along the z-axis. Four polarization channels are collected using four-camera polarization-resolved imaging system 1528. These polarization channels, as well as additional sets of polarization channels associated with different specimen positions and different wavelengths as discussed below, are utilized for processing using the calibration tensor $A_\lambda$ and the deconvolution process as discussed in relation to FIGS. 1A and 1B.

The position of the specimen is then translated to a second specimen position characterized by a second axial position (i.e., a different position along the z-axis). Four additional polarization channels at this second axial position are collected using four-camera polarization-resolved imaging system 528. By translating the specimen to additional specimen positions, an array of sets of polarization channels is obtained. Once an array of desired size is obtained, providing sets of polarization channels disposed throughout the volume of the specimen, the wavelength of the illumination light is changed to a second wavelength or second wavelength range. In the embodiment illustrated in FIG. 15, interchangeable set of bandpass filters 1510 is adjusted to utilize a second bandpass filter. At this second wavelength or range of wavelengths, an array of sets of polarization channels is obtained as discussed above, providing sets of polarization channels disposed throughout the volume of the specimen that are associated with the second wavelength or range of wavelengths. This process is repeated for subsequent wavelengths or ranges of wavelengths until a sufficient number of arrays have been collected.

It should be noted that in the embodiment illustrated in FIG. 15, the wavelength of the illumination light is fixed while the axial position of the specimen is varied. Alternatively, the axial position of the specimen can be fixed while the wavelength of the illumination light is varied. Thus, in this alternative embodiment, a set of polarization channels are obtained at a first wavelength for a first axial position. Then, by varying the wavelength of the illumination light, multiple sets of polarization channels are obtained at the first axial position. Subsequently, the axial position is changed to a second axial position and additional multiple sets of polarization channels are obtained for different wavelengths at this second axial position. Accordingly, an array of multiple sets of polarization channels is obtained. One of ordinary skill in the art would recognize many variations, modifications, and alternatives.

Figure 16:
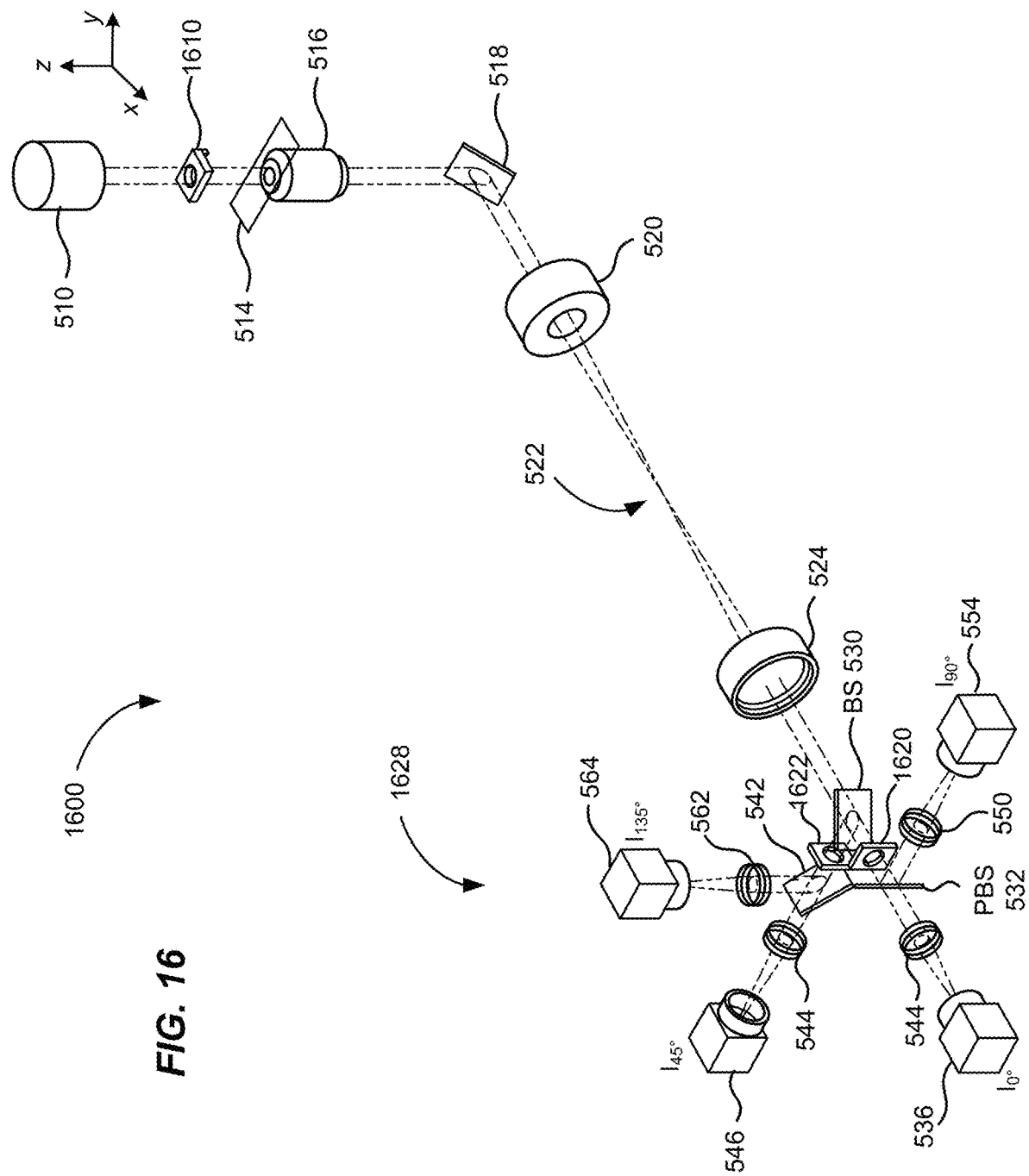
FIG. 16 is a simplified schematic diagram illustrating a spectral, multi-camera polarization-resolved imaging system utilizing polarization modulators according to an embodiment of the present invention.

FIG. 16 is a simplified schematic diagram 1600 illustrating a spectral, multi-camera polarization-resolved imaging system utilizing polarization modulators according to an embodiment of the present invention. FIG. 16 includes elements illustrated in FIG. 5A and the description provided in FIG. 5A is applicable to FIG. 16 as appropriate. If the anisotropy of the sample is small, the background noise may be larger than the sample anisotropy, resulting in the anisotropy measurement being difficult to make. Utilizing the embodiment of the present invention illustrated in FIG. 16, the sensitivity of the measurement to small changes in anisotropy can be improved. Thus, in addition to digital compensation for polarization aberrations present in the optical system provided by the calibration tensor, the embodiment of the present invention illustrated in FIG. 16 provides optical compensation for polarization aberrations present in the optical system that complements the digital compensation provided by the calibration tensor. In other words, the calibration tensor discussed in relation to FIG. 9 compensates for polarization aberrations present in the optical system. Generally, since the polarization aberrations present in the optical system are small in comparison to the anisotropy of specimens, this compensation provided by the calibration tensor is sufficient to achieve a desired signal-to-noise ratio. However, if the anisotropy of the specimen is small in comparison to the polarization aberrations present in the optical system, the programmable polarization modulators illustrated in FIG. 16 provide additional pre-compensation that improves the signal-to-noise ratio.

In FIG. 16, the illumination module is modified to include programmable polarization modulator 1610. Two additional polarization modulators 1620 and 1622 are also inserted in the beam paths transmitted and reflected by 50/50 non-polarizing beam splitter in four-camera polarization-resolved imaging system 1628. As illustrated in FIG. 16, polarization modulator 1620 is inserted in the first optical path before PBS 532 and polarization modulator 1622 is inserted in the second optical path before PBS 542.

In one embodiment of the current invention, programmable polarization modulator outputs a circular polarization state of left- or right-handedness. Programmable polarization modulators 1620 and 1622 in the detection path are operated close to extinction relative to the polarization of the illumination path to detect elliptical states of set orientation. Operating close to extinction, the background intensity is reduced, enabling measurement of small anisotropies. One of ordinary skill in the art would recognize many variations, modifications, and alternatives.

Polarization switching in the illumination path and the detection path may also be multiplexed to probe how the specimen interacts with light of different polarization. Multiplexing the illumination and detection polarization stages will increase the rate of data acquisition. In some embodiments, polarization modulators 1610, 1620, and 1622 are programmable polarization modulators.

Figure 17:
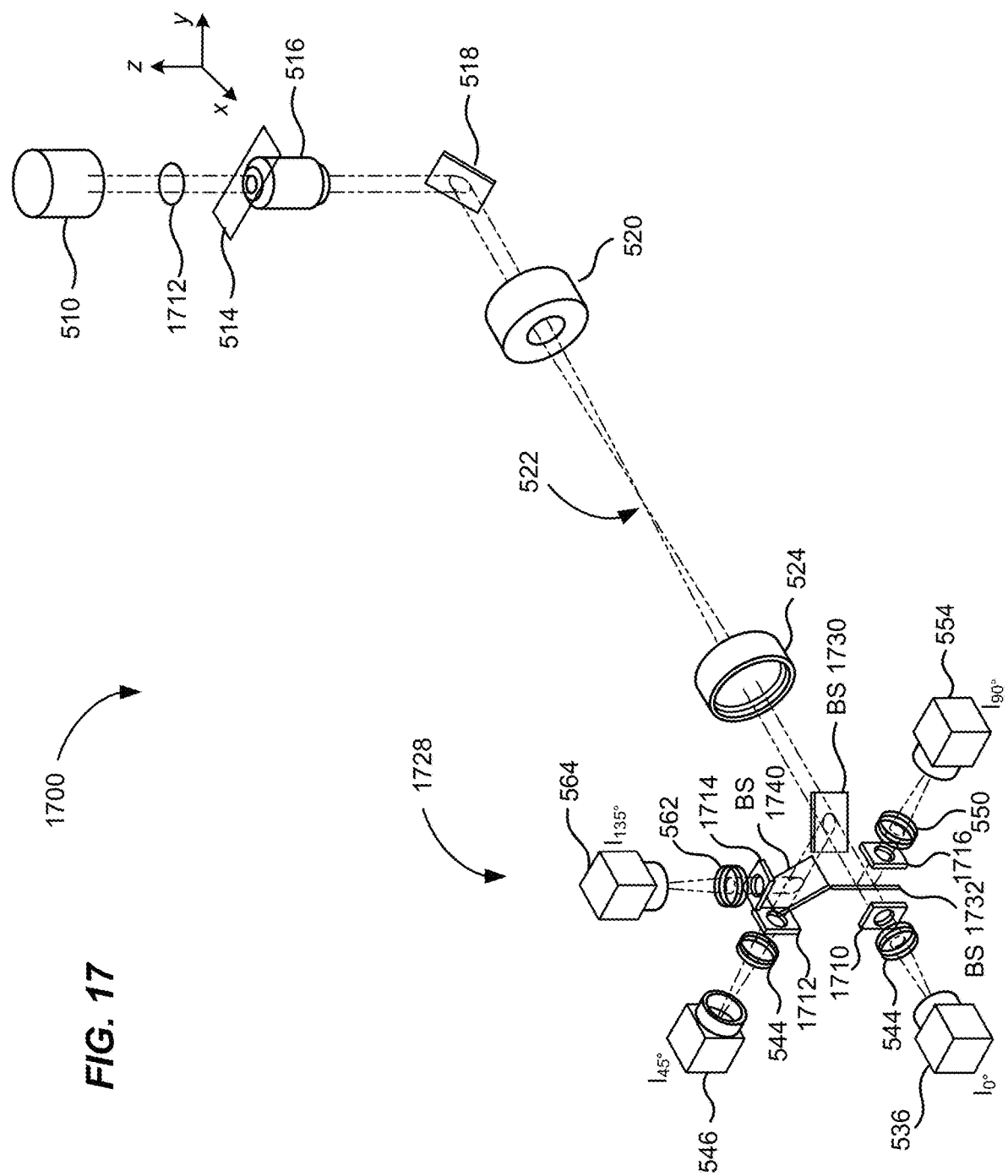
FIG. 17 is a simplified schematic diagram illustrating a spectral, multi-camera polarization-resolved imaging system utilizing separate polarization modulators in each detection path according to an embodiment of the present invention.

FIG. 17 is a simplified schematic diagram illustrating a spectral, multi-camera polarization-resolved imaging system utilizing polarization modulators in the detection path according to an embodiment of the present invention. FIG. 17 includes elements illustrated in FIG. 5A and the description provided in FIG. 5A is applicable to FIG. 17 as appropriate. In the implementation illustrated in FIG. 17, the design of the imaging system is extended to allow fully customizable polarization state detection in each of the four optical paths of four-camera polarization-resolved imaging system 1728. Three non-polarizing beam splitters 1730, 1732, and 1740, which can be broadband non-polarizing beam splitters, are used to direct light from the primary image plane 522 towards the four cameras 536, 546, 554, and 564. In each of the optical paths leading to the cameras, polarization modulators 1710, 1712, 1714, and 1716 are inserted along the optical path extending from the non-polarizing beam splitters 1730, 1732, and 1740. Circular polarizer 1712 is used to set the polarization state of the illumination light. Thus, this design, although less light-efficient than other embodiments discussed here, provides fully customizable polarization state detection since the four cameras can acquire a set of four polarization-resolved images with polarization states of distinct orientations and two ellipticities.

Figure 18:
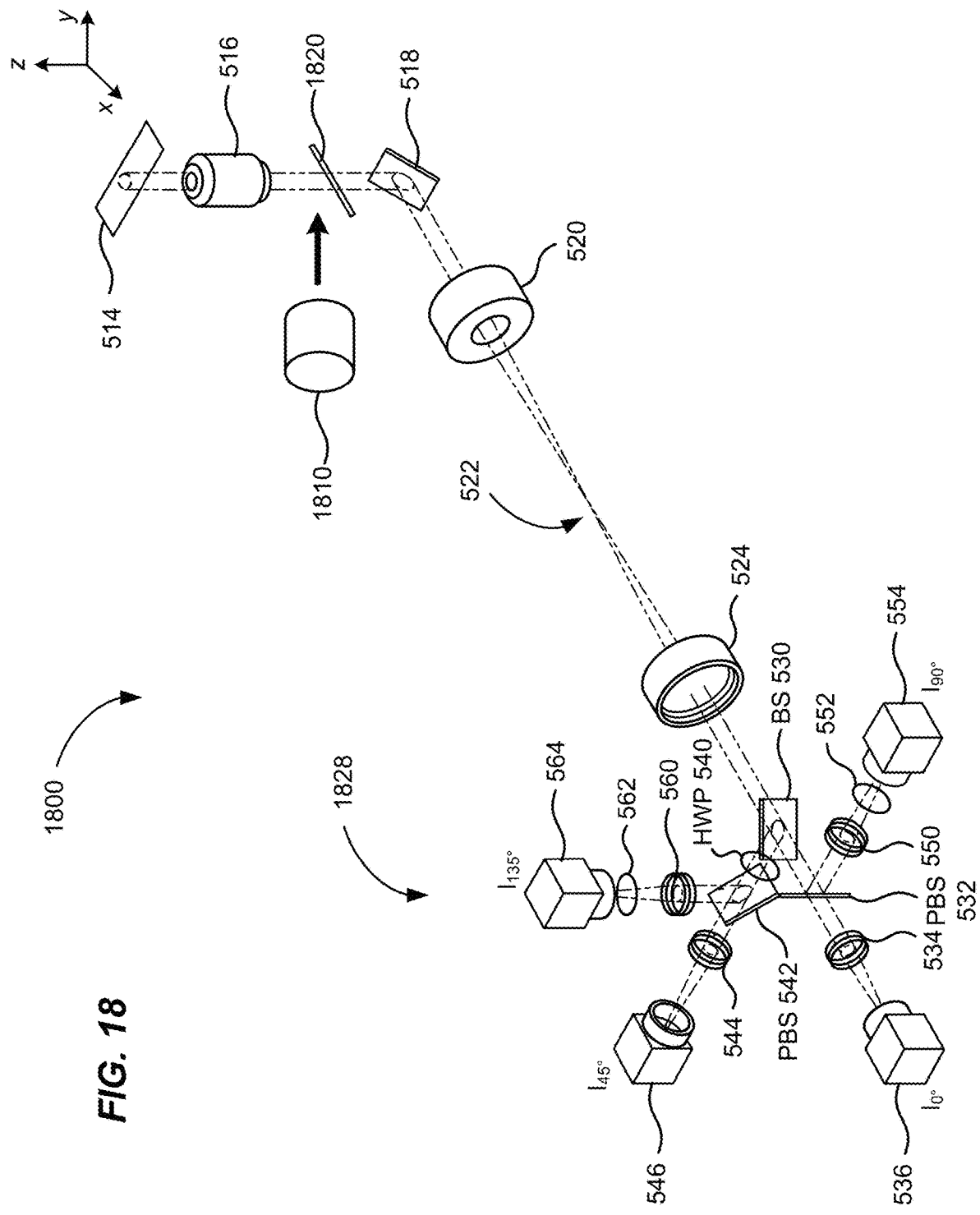
FIG. 18 is a simplified schematic diagram illustrating a spectral, multi-camera polarization-resolved transmission and fluorescent imaging system according to an embodiment of the present invention.

FIG. 18 is a simplified schematic diagram illustrating a spectral, multi-camera polarization-resolved combined transmission and fluorescence imaging system 1800 according to an embodiment of the present invention. FIG. 18 includes elements illustrated in FIG. 5A and the description provided in FIG. 5A is applicable to FIG. 18 as appropriate. Referring to FIG. 1A, transmission source 110 as well as reflection source 111 are provided in the embodiment illustrated in FIG. 18 in order to enable transmission imaging, fluorescent imaging, or multiplexed transmission and fluorescence imaging.

The Stokes parameters can be used to estimate the fluorophore concentration (c) and to calculate the anisotropy (ρ) and ensemble orientation (ϕ) of fluorophores in the specimen:

$$c \sim S_0 - S_0^{BG}$$

$$\rho = \frac{1}{2} a\sin\left(\sqrt{S_1^{norm^2} + S_2^{norm^2}}\right)$$

$$\phi = \frac{1}{2} a\tan\left(-\frac{S_2^{norm}}{S_1^{norm}}\right)$$

The inventors have determined that fluorescence anisotropy measurements conducted using the system illustrated in FIG. 18 may benefit from calibration of the fluorescence light source polarization state. Ideally, fluorophores at the sample should be excited by an unpolarized or isotropically polarized light source. However, the polarization state of the light source may deviate from ideal.

Accordingly, the polarization state of the fluorescence light source is calibrated by imaging a distribution of fluorophores with fixed random orientation (e.g., in dye-embedded plastic slides). Isotropic excitation of the fluorophores will result in zero anisotropy of the sample image. Anisotropic excitation will result in preferential excitation of fluorophores of a given orientation, leading to a detectable sample anisotropy. The polarization state of the fluorescence light source is calibrated based on these results.

As illustrated in relation to FIG. 18, in addition to transmission imaging using illumination source 510 as discussed in relation to FIG. 5A, fluorescence anisotropy measurements of multiple fluorophores can be performed by inserting dichroic mirror 1820 between objective lens 516 and mirror 518. The multichannel scanning profile illustrated in FIG. 5D can be utilized to obtain both transmission and fluorescence images. Multiple long-pass dichroic mirrors 1820 can be exchanged to image fluorophores with distinct absorption and emission spectra. Alternatively, a single multi-band dichroic mirror 1820 can be used to image multiple fluorophores. Excitation light of a given wavelength from excitation light source 1810 is reflected from dichroic mirror 1820, is focused by objective lens 516, and impinges on a specimen supported on specimen holder 514. In the illustrated embodiment, the excitation light is unpolarized. Fluorescent emission from the specimen is collected by objective lens 516, passes through dichroic mirror 1820 and is imaged (in a manner similar to imaging of light after transmission through the specimen) after reflection from mirror 518. Thus, in addition to imaging in transmission, imaging of fluorescent emission can be performed as is customary in fluorescence microscopy. Wavelength-dependent optical properties of biological specimens can be used to enhance the contrast of particular structures in label-free imaging. Moreover, anisotropy measurements of multiple fluorophores can be used to measure the orientation of one structure relative to another. Information from fluorescence and label-free imaging can be combined to gain more complete understanding of the specimen.

Referring to FIG. 18, operation of four-camera polarization-resolved imaging system 1828 is similar to that discussed in relation to FIG. 5A. Thus, four-camera polarization-resolved imaging system 1828 can be utilized in transmission to characterize specimens as well as in reflection for fluorescence imaging applications. One of ordinary skill in the art would recognize many variations, modifications, and alternatives.

For fluorescence applications, scientific CMOS detectors with low read noise and dark current noise are available. Such detectors permit imaging at long exposures (0.1-1 s) to reduce photo-bleaching for samples that do not display fast dynamics on these timescales.

Figure 19:
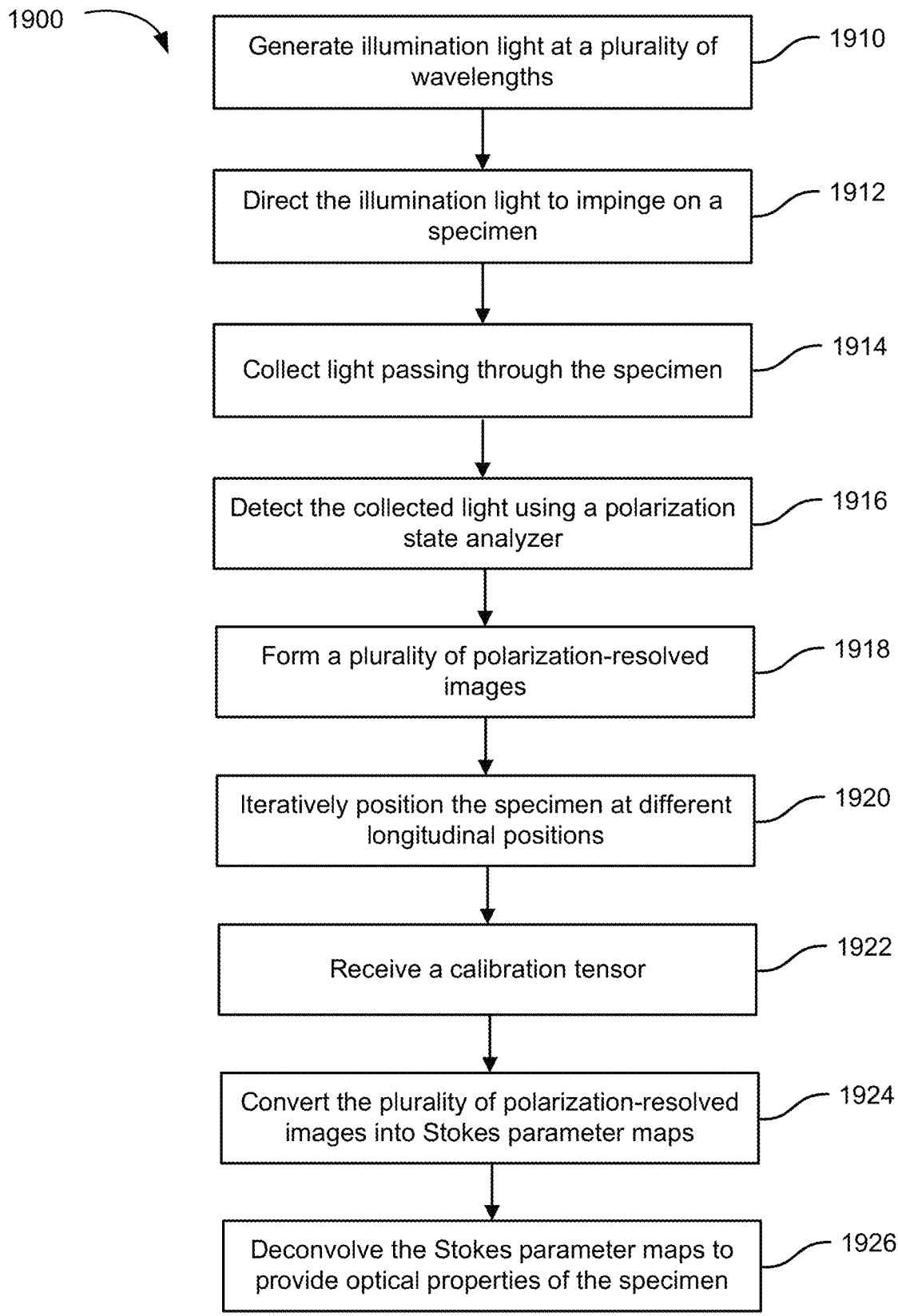
FIG. 19 is simplified flowchart illustrating a method of measuring optical properties of a specimen according to an embodiment of the present invention.

FIG. 19 is a simplified flowchart illustrating a method of measuring optical properties of a specimen according to an embodiment of the present invention. Referring to FIG. 19, the method 1900 includes generating illumination light at a plurality of wavelengths (1910) and directing the illumination light to impinge on a specimen (1912). The specimen can be a biological material, such as cells and tissues, or an inorganic material, such as mineral crystals and plastics. As discussed in relation to FIGS. 1A-1B, a plurality of different illumination wavelengths can be generated and utilized. In some embodiments, each of the plurality of different illumination wavelengths is utilized in turn as the illumination light is directed to impinge on the specimen and the measurements are made. The method also includes, for each of the plurality of illumination wavelengths, collecting sample light passing through the specimen (1914) and detecting the collected sample light using a polarization state analyzer (1916) to form a plurality of polarization channels (1918).

Collecting sample light can include focusing the sample light onto image sensors of the polarization state analyzer.

The plurality of polarization channels can be obtained using a variety of different imaging systems. As an example, imaging systems using multiple cameras, each associated with a different polarization state, can be used. In this embodiment, the method can include translating the specimen, collecting additional sample light passing through the specimen (e.g., light collected with the specimen positioned at different planes), and detecting the additional collected sample light using the polarization state analyzer to form a plurality of additional polarization channels, also referred to as sets of polarization channels. For this imaging implementation, the specimen is disposed in an image plane and translating the specimen comprises motion orthogonal to the image plane.

Alternatively, a single camera with pixel sets that includes four polarization-resolved pixels can be used. As discussed above, the specimen can be translated to iteratively position the specimen at different axial positions (1920) and provide a plurality of polarization channels for each illumination wavelength and each specimen position. One of ordinary skill in the art would recognize many variations, modifications, and alternatives.

The method further includes receiving a calibration tensor (1922). The calibration tensor is associated with the imaging optics and can compensate for polarization aberrations in the imaging optics. The method also includes converting the plurality of polarization channels for each of the illumination wavelengths and each of the specimen positions into Stokes parameter maps using the calibration tensor (1924) and deconvolving the Stokes parameter maps to provide density, anisotropy, and orientation measurements of the specimen (1926).

It should be appreciated that the specific steps illustrated in FIG. 19 provide a particular method of measuring optical properties of a specimen according to another embodiment of the present invention. Other sequences of steps may also be performed according to alternative embodiments. For example, alternative embodiments of the present disclosure may perform the steps outlined above in a different order. Moreover, the individual steps illustrated in FIG. 19 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 20:
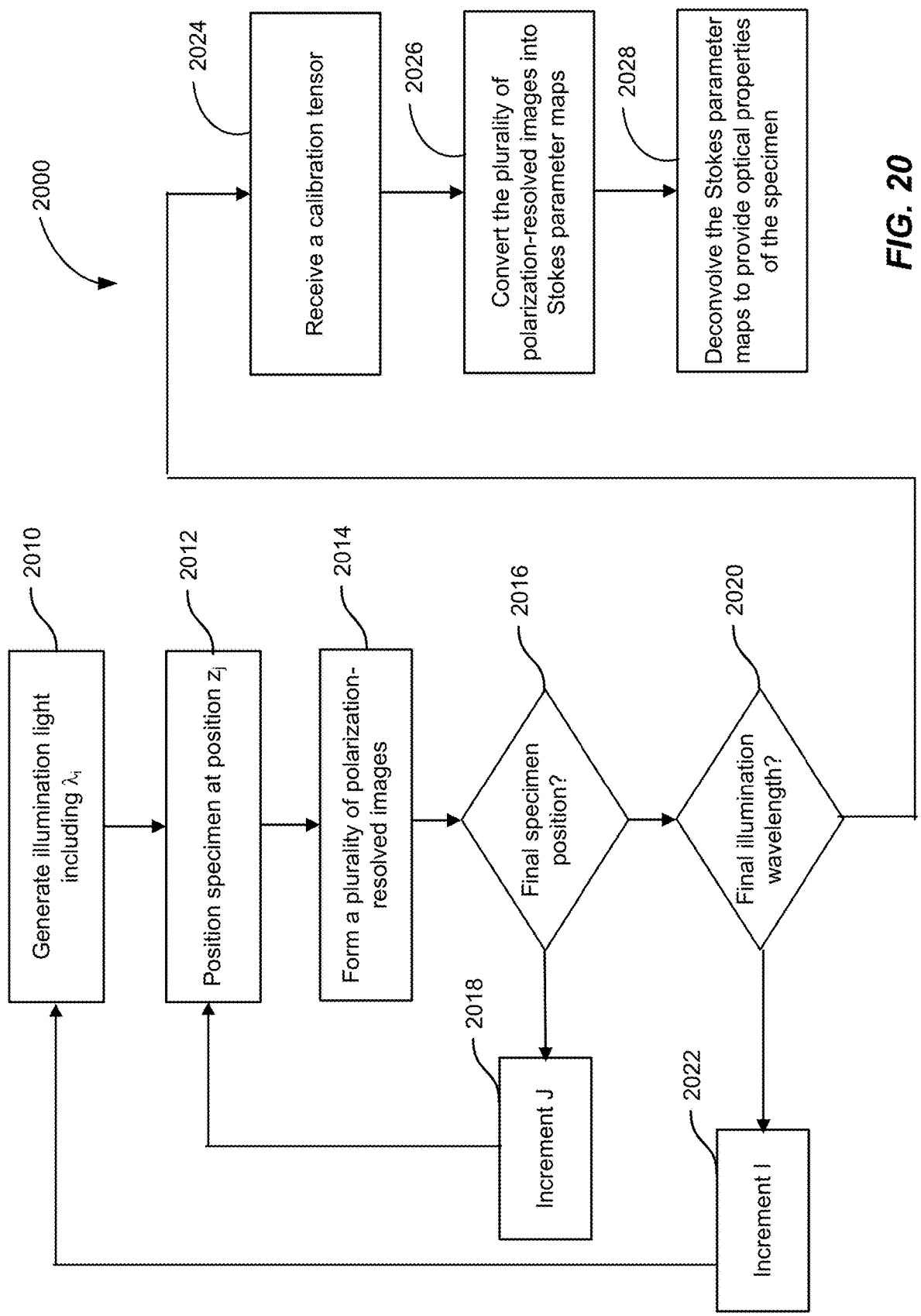
FIG. 20 is a simplified flowchart illustrating a method of measuring optical properties of a specimen according to another embodiment of the present invention.

FIG. 20 is a simplified flowchart illustrating a method of measuring optical properties of a specimen according to another embodiment of the present invention. The method 2000 includes a) generating illumination light at a predetermined wavelength $\lambda_i$ (2010) and b) positioning the specimen (e.g., a primary cell) at a predetermined axial position $z_j$ (2012). As discussed in relation to FIG. 5A, motion of the specimen stage along the axial z-axis can be utilized to achieve this predetermined axial position $z_j$. The specimen can be disposed in an image plane orthogonal to the predetermined axial position $z_j$. The method also includes c) directing the illumination light at the predetermined wavelength $\lambda_i$ to be incident on the specimen, d) collecting sample light passing through the specimen, and e) forming a set of polarization channels of the specimen associated with the illumination light at the predetermined wavelength $\lambda_i$ and the predetermined axial position $z_j$ (2014). As discussed above, the set of polarization channels can be detected using a polarization state analyzer and images collected that are associated with light that is linearly polarized along 0°, 45°, 90°, and 135° directions.

The method also includes determining if the final specimen position has been achieved (2016) and f) incrementing j to j+1 to define an updated predetermined axial position $z_{j+1}$ (2018) until all specimen positions have been achieved. After all the axial positions of the specimen have been achieved, the method includes determining if all the illumination wavelengths have been generated (2020) and h) incrementing i to i+1 (2022) until all illumination wavelengths have been generated. Thus, using this method will enable g) repeating b) through f) a plurality of times to provide multiple sets of polarization channels of the specimen at the position $z_j$, with each set of polarization channels being associated with one of the plurality of illumination wavelengths and h) incrementing i to i+1 to define an updated predetermined wavelength $\lambda_{i+1}$. By repeating a) through h) a plurality of times, the method provides an array of multiple sets of polarization channels of the specimen.

The method also includes receiving a calibration tensor (2024), converting the array of multiple sets of polarization channels into Stokes parameter maps using the calibration tensor (2026), and deconvolving the Stokes parameter maps to provide 3D density, 3D anisotropy, and 3D orientation measurements of the specimen (2028).

It should be appreciated that the specific steps illustrated in FIG. 20 provide a particular method of measuring optical properties of a specimen according to another embodiment of the present invention. Other sequences of steps may also be performed according to alternative embodiments. For example, alternative embodiments of the present disclosure may perform the steps outlined above in a different order. Moreover, the individual steps illustrated in FIG. 20 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 21:
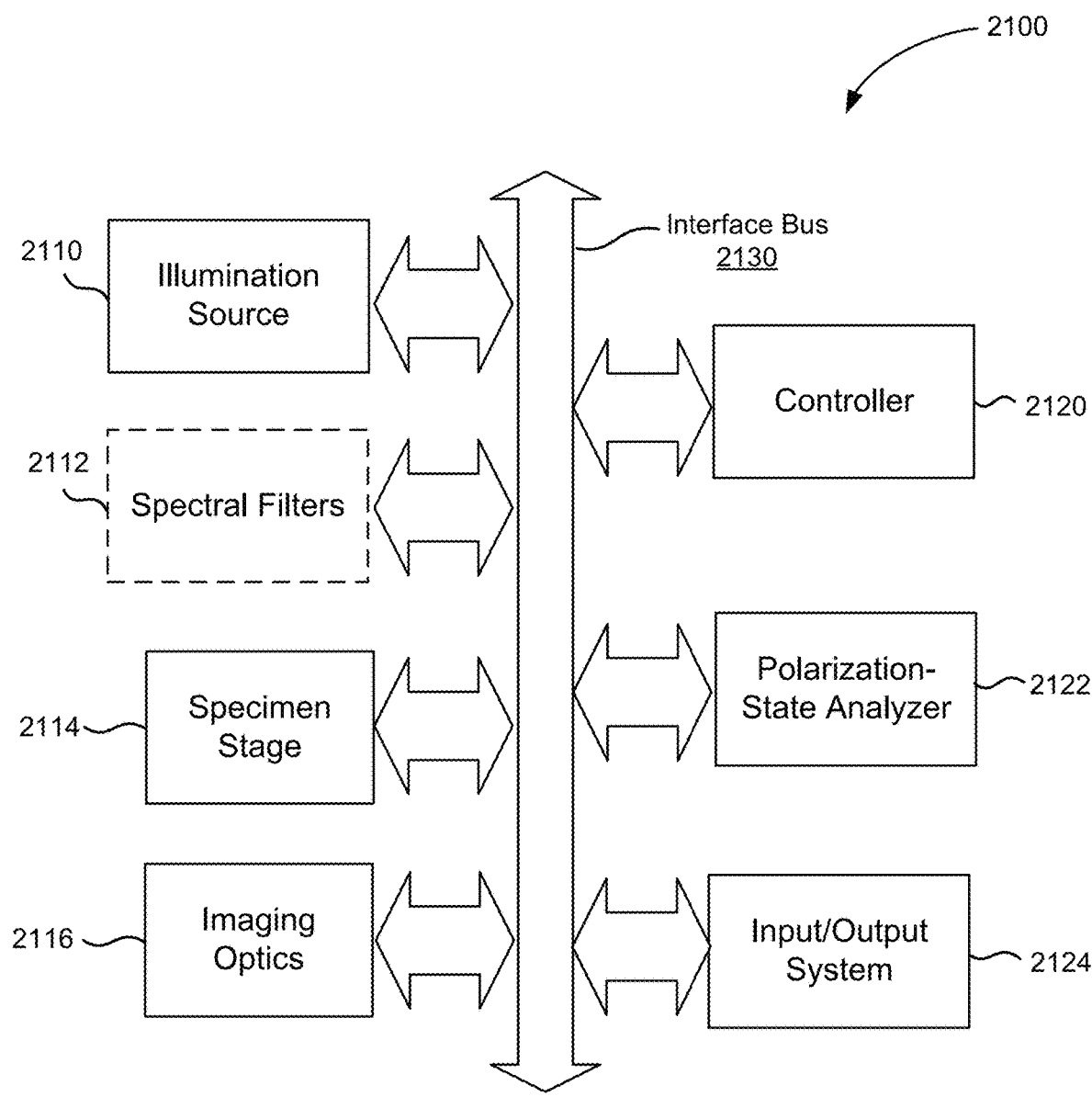
FIG. 21 is a simplified schematic diagram illustrating a spectral polarization-resolved imaging system according to an embodiment of the present invention.

FIG. 21 is a simplified schematic diagram illustrating a spectral polarization-resolved imaging system according to an embodiment of the present invention. The polarization-resolved imaging system 2100 includes an illumination source 2110, which can function in conjunction with optional spectral filters 2112. Illumination light from illumination source 2110 can be generated at a plurality of illumination wavelengths, for example, over predetermined wavelength bands or at predetermined wavelengths.

Polarization-resolved imaging system 2100 also includes specimen stage 2114. Illumination light at the predetermined wavelength can impinge on a specimen supported on specimen stage 2114, which can also be referred to as a sample stage. Light scattered as it passes through the specimen is collected by imaging optics 2116, which can include objective as illustrated in FIGS. 1A and 1B. Imaging optics 2116 serve to focus the light scattered from the specimen at an image plane, which typically serves as the camera port of the microscope. By translating the specimen, multiple sets of polarization channels can be collected for each of the illumination wavelengths. By varying the illumination wavelength, an array of multiple sets of polarization channels can be assembled.

Polarization-resolved imaging system 2100 further includes controller 2120, polarization state analyzer 2122, and an input/output system 2124. The various elements of polarization-resolved imaging system 2100 are connected via interface bus 2130, which provides for control and data signals to be transmitted to/from and received to/from one or more of the various elements. Polarization state analyzer 2122 can take several forms, including multiple cameras, each associated with a different polarization state or a single camera with pixel sets that includes four polarization-resolved pixels.

FIGS. 22A-22D are transmission, optical path length, retardance and fast axis orientation images of a test target acquired with excitation at 525 nm. The test target is written by laser nanostructuring process and contains three birefringent line gratings at decreasing line frequency and a cartwheel-like structure with radially distributed spokes. The birefringent material in the structures has slow axis orientation perpendicular to the direction of the nanostructured features, and therefore fast axis orientation parallel to the direction of the features. The images were acquired with 0.4 NA illumination and 10×0.45 NA detection. At these imaging settings, only the low frequency line grating is well resolved. White boxes drawn over the three line gratings indicate areas over which the transmission, optical path length, retardance and fast axis orientation signals were averages and reported as a function of wavelength in FIGS. 22E-22H.

Figure 22A:
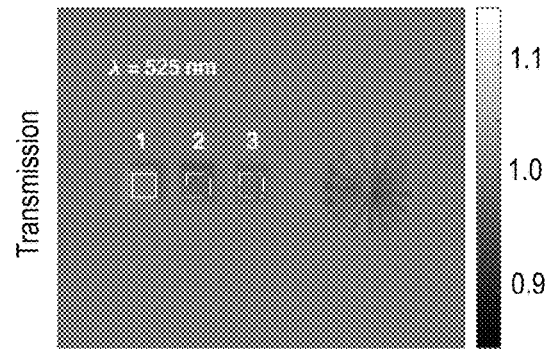
FIGS. 22A-22D are transmission, optical path length, retardance, and orientation images of a test target at a single wavelength according to an embodiment of the present invention.
Figure 22B:
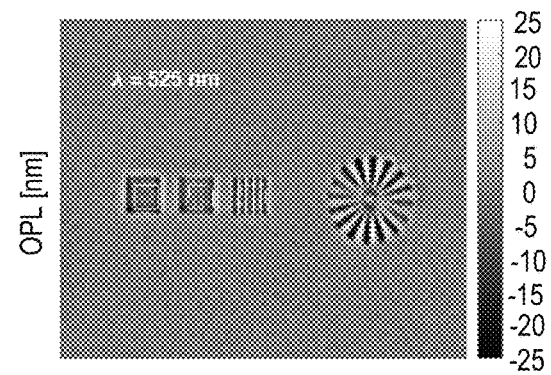
Figure 22C:
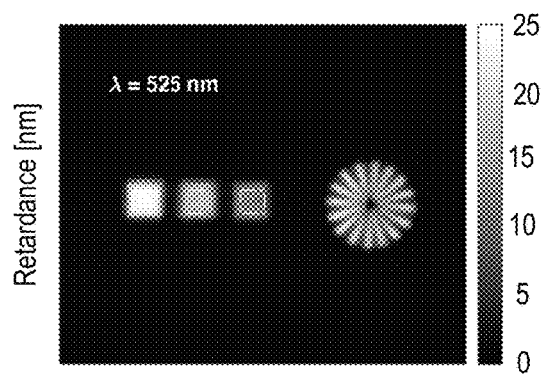
Figure 22D:
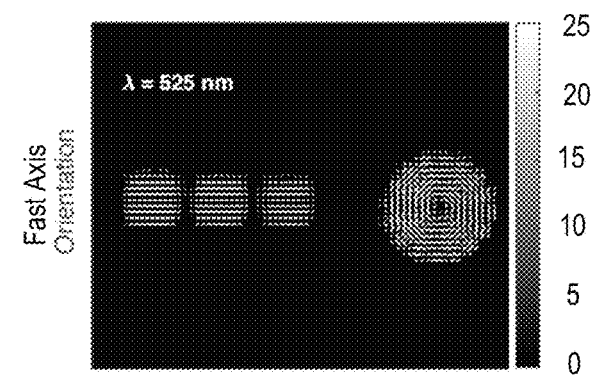
Figure 22E:
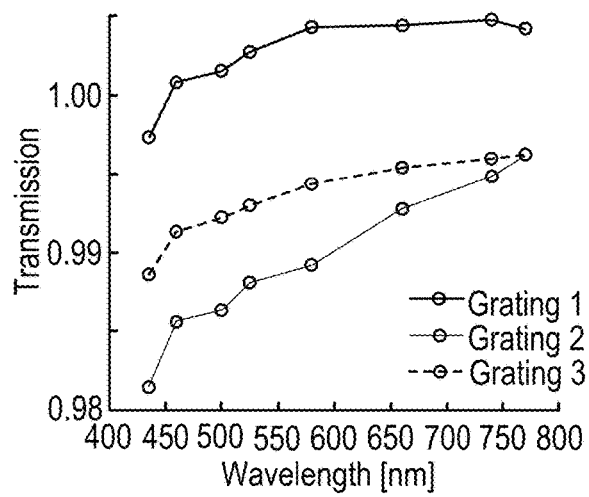
FIGS. 22E-22H are plots showing transmission, optical path length, retardance, and orientation of three gratings of the test target as a function of wavelength according to an embodiment of the present invention.
Figure 22F:
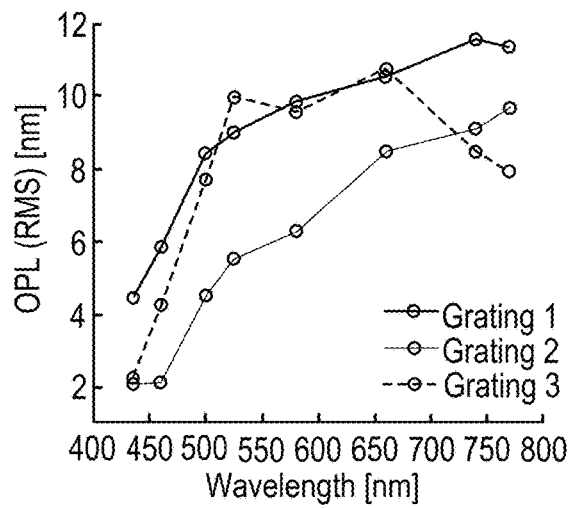
Figure 22G:
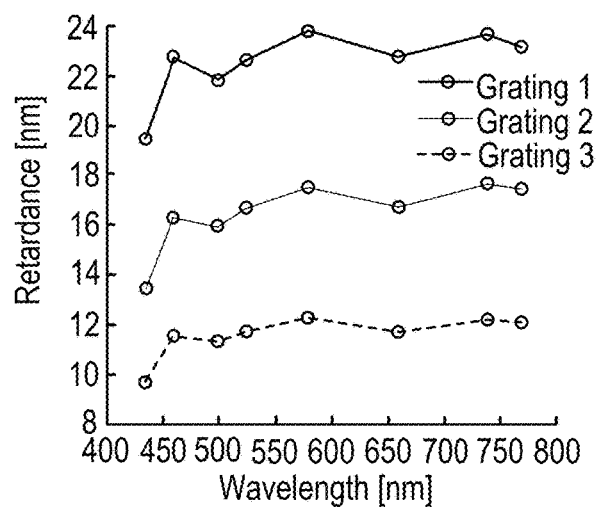
Figure 22H:
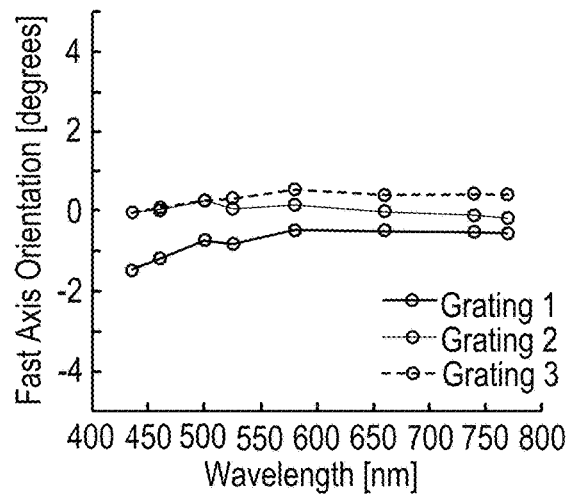

FIG. 22A shows the transmission of features in the test target. The line gratings have transmission inversely proportional to the line frequency. FIG. 22B shows that the features in the test target have negative phase density. The optical path length in the features is ~5 nm shorter compared to the surroundings. FIG. 22C shows a map of the retardance of the structures. The retardance of the line gratings decreases with decreasing line frequency. FIG. 22D shows the orientation of the fast axis of the structures. The measured orientation is given by the orientation of white lines drawn over the image. The fast axis of the line gratings is horizontal, parallel to the direction of the features. The fast axis measured in the cartwheel-like structure rotates and remains tangential to the wheel.

FIGS. 22E-22H show the average transmission, optical path length, retardance, and orientation of the three line gratings at eight wavelengths. The transmission of the line gratings increases with wavelength. The rate of increase is inversely proportional to the grating frequency. The optical path length of the line gratings shows an increase with wavelength. The retardance and orientation of the line gratings remain relatively constant with wavelength. Small variations in the measured retardance of the gratings with wavelength may be characteristic of their material properties. The measured orientation of the gratings remains constant at 0° (i.e. horizontal) within 1-2° error.

FIGS. 23A-23D are transmission, optical path length, retardance, and fast axis orientation images of the mouse brain slice that includes corpus callosum acquired with excitation at 525 nm. The images were acquired with 0.4 NA illumination and 10×0.45 NA detection. White boxes indicate areas of the white matter and grey matter over which the transmission, optical path length, retardance and orientation signals were averaged and reported as a function of wavelength in FIGS. 23E-23H.

Figure 23A:
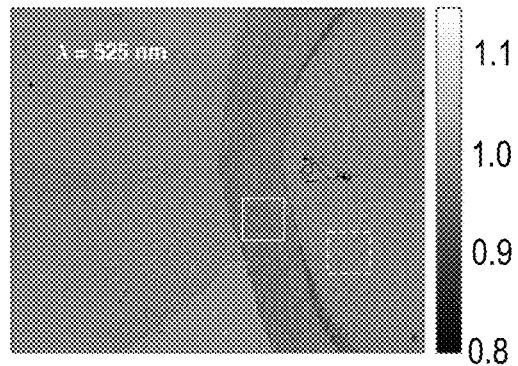
FIGS. 23A-23D are transmission, optical path length, retardance, and orientation images of the corpus callosum in a mouse brain tissue at a single wavelength according to an embodiment of the present invention.
Figure 23B:
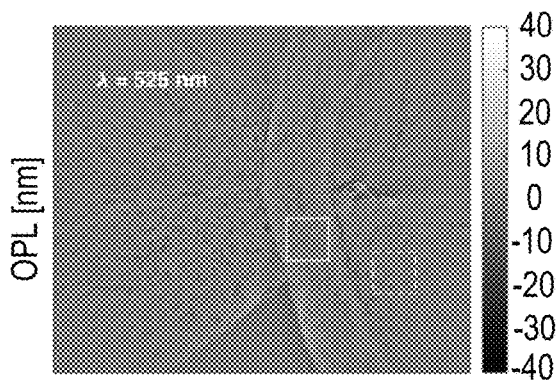
Figure 23C:
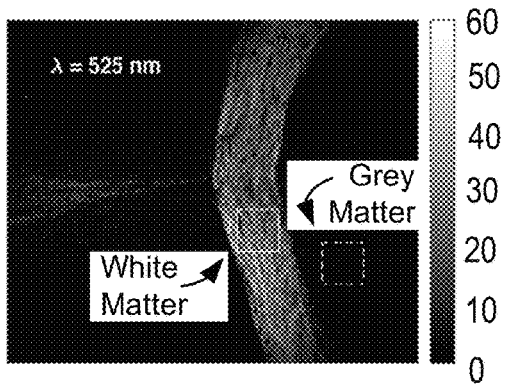
Figure 23D:
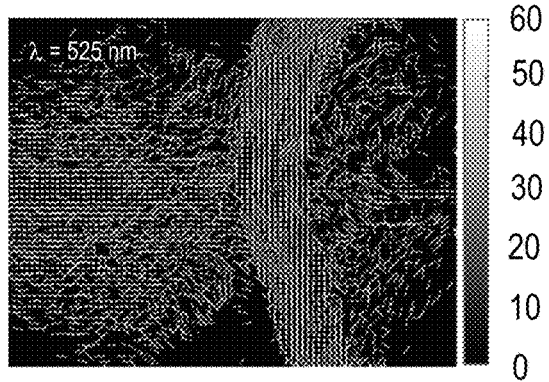

In FIGS. 23A-23B, transmission and optical path length images show features of axons in the white matter and neuron cell bodies in the gray matter of the brain. Strong retardance is detected only from axons in the white matter due to myelination around the axon (FIG. 23C). The slow axis is perpendicular to the axons due to myelination, and therefore, the fast axis orientation is parallel to axon bundles (FIG. 23D).

The inventors have determined that contrast can be enhanced via control of the illumination numerical aperture (NA). In some cases, when the illumination NA matches the imaging NA, contrast can be adversely impacted. In some embodiments, the illumination NA is set to approximately half (e.g., 60%) of the imaging NA in order to balance contrast and resolution. Moreover, at high resolutions, the inventors have determined that scattering by the sample can suppress the anisotropy that is measured. Accordingly, embodiments of the present invention, in order to enhance the contrast of anisotropic structures in the sample, suppress the scattering by isotropic structures in the sample using index matching, thereby resulting in the isotropic structures appearing transparent.

Figure 25:
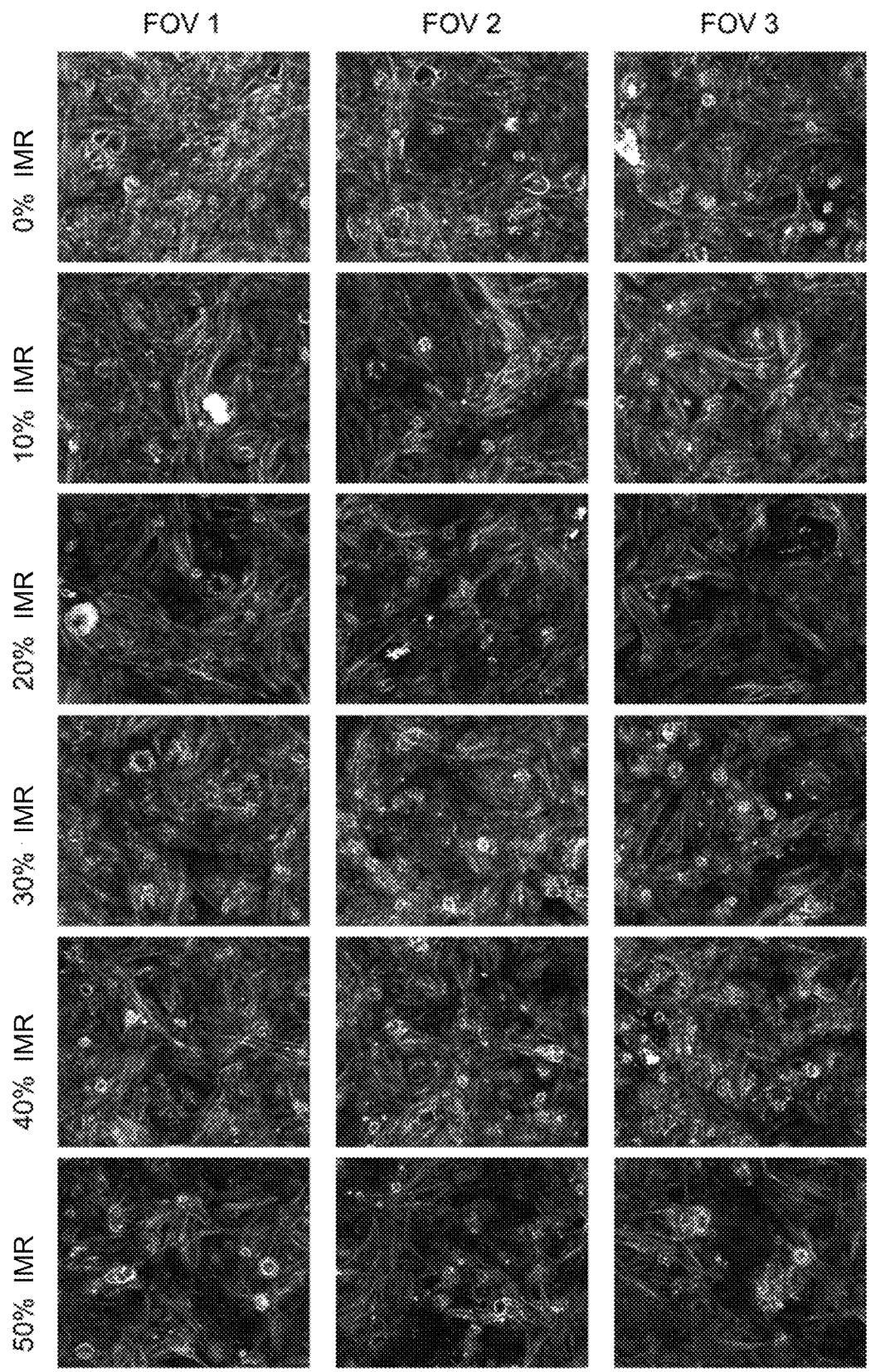
FIG. 25 illustrates a series of retardance measurements in live cardiomyocytes using cell culture media with varying fractions of an index matching reagent according to an embodiment of the present invention.

FIG. 25 illustrates a series of retardance measurements in live cardiomyocytes using cell culture media with varying fractions of an index matching reagent according to an embodiment of the present invention. To obtain the images illustrated in FIG. 25, an index matching reagent (IMR) in the form of a high density, inert liquid (e.g., Iodixanol) was mixed into the cell culture medium in different proportions. Based on the fraction of the IMR in the media, the inventors determined that the refractive index of the IMR varies between 1.34 (0% index matching reagent) and 1.42 (50% index matching reagent).

The inventors determined that, for the cardiomyocytes illustrated in FIG. 25, use of 20% IMR (i.e., refractive index of 1.37 for the particular IMR used in this exemplary embodiment) enhanced the retardance contrast from sarcomeres across a number of fields of view (e.g., FOV 1, FOV 2, and FOV 3) This index matching technique is applicable to the imaging of a wide range of anisotropic structures and is particularly useful for reduction of scattering during dynamic imaging of anisotropic structures in live cells. The inventors have determined that index matching within a range is suitable for many applications. In some embodiments, the difference between the index of refraction of the cell culture media and the index of refraction of the IMR is controlled to be less than 1% to produce images of the desired contrast. This level of control provides for high contrast imaging across the cell, which can be characterized by a varying index of refraction across the cell. Accordingly, some embodiments utilize index matching of the average index of refraction of the cell to the index of refraction of the surrounding media to effectively remove the offset between the average index of refraction of the cell and the index of refraction of the surrounding media. In other embodiments, the difference between the index of refraction of the cell culture media and the index of refraction of the IMR is ±5%.

Figure 23E:
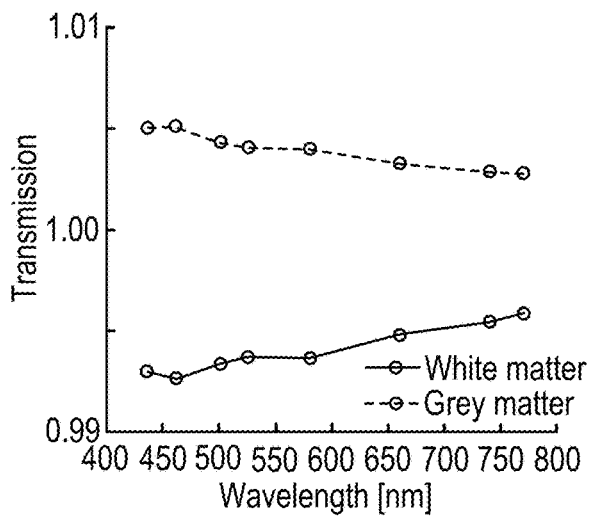
FIGS. 23E-23H are plots of the transmission, optical path length, retardance, and orientation of sub-regions of grey and white matter of the specimen illustrated in FIGS. 23A—23D.
Figure 23F:
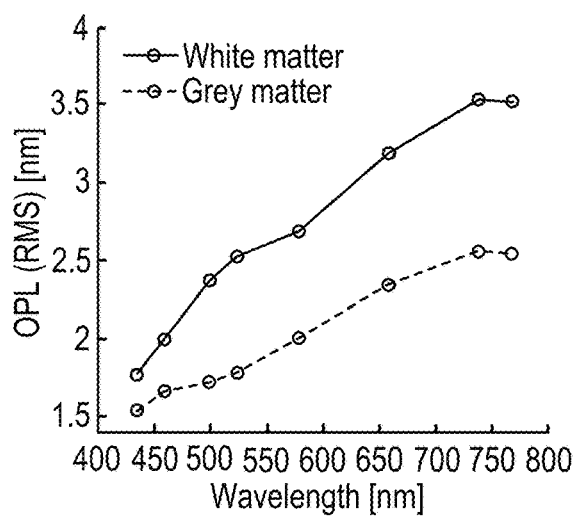
Figure 23G:
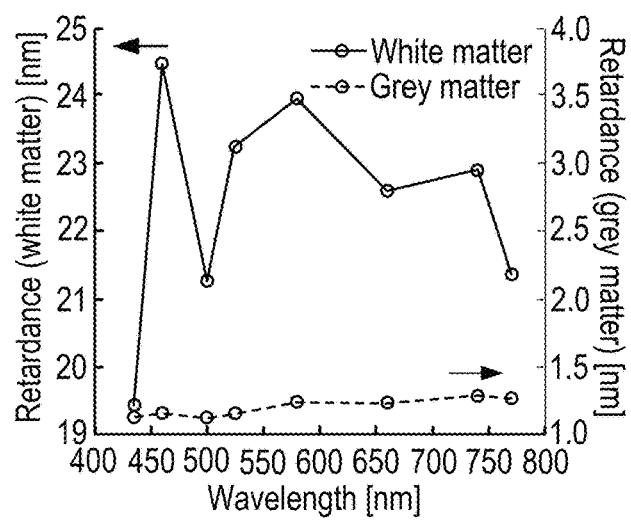
Figure 23H:
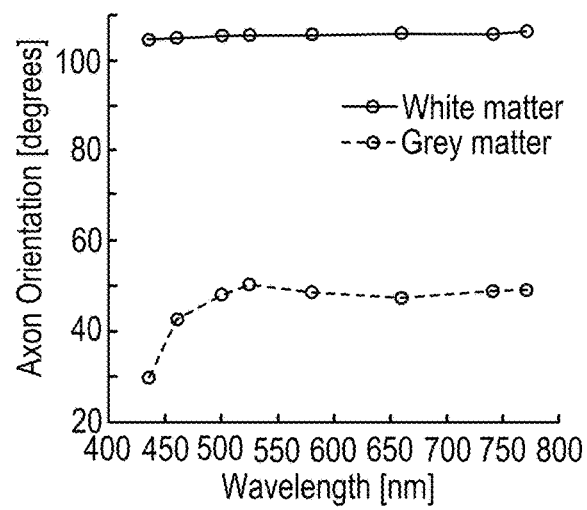

FIGS. 23E-23H show the average transmission, optical path length, retardance, and orientation of regions of the white matter and grey matter at eight wavelengths. The transmission in the white matter and grey matter increases with wavelength (FIG. 23E). The region of the grey matter has higher transmission compared to the measured region of the white matter. The root-mean-square (RMS) optical path length in the two regions increases with wavelength (FIG. 23F). The average retardance of the white matter region is higher compared to the average retardance of the grey matter region (FIG. 23G). For better visualization, data are plotted on separate y-axes: retardance from white matter is plotted on the left, and retardance from grey matter is plotted on the right. Variation of retardance with wavelength may be indicative of the material properties of the brain matter. The measured axon orientation in the white matter is constant with wavelength (FIG. 23H). The axon orientation in the grey matter shows some change with wavelength.

Figure 24A:
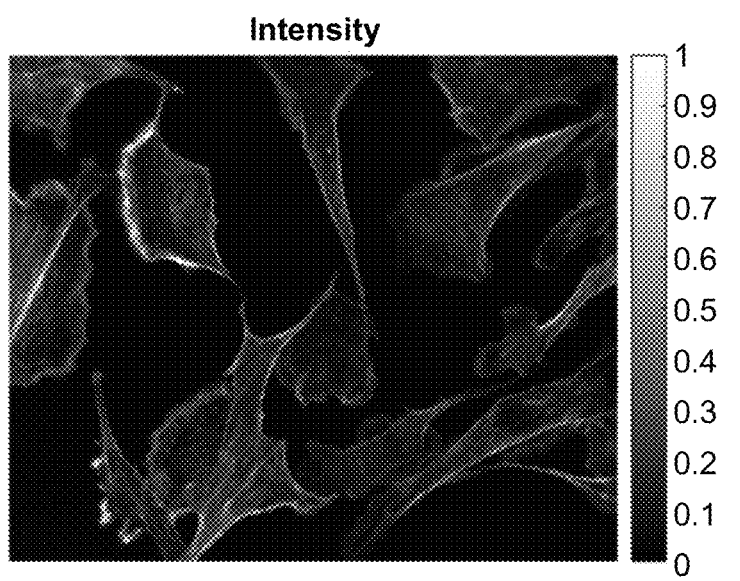
FIG. 24A shows an intensity image of fluorescent phalloidin-labeled actin filaments in fixed cells.
Figure 24B:
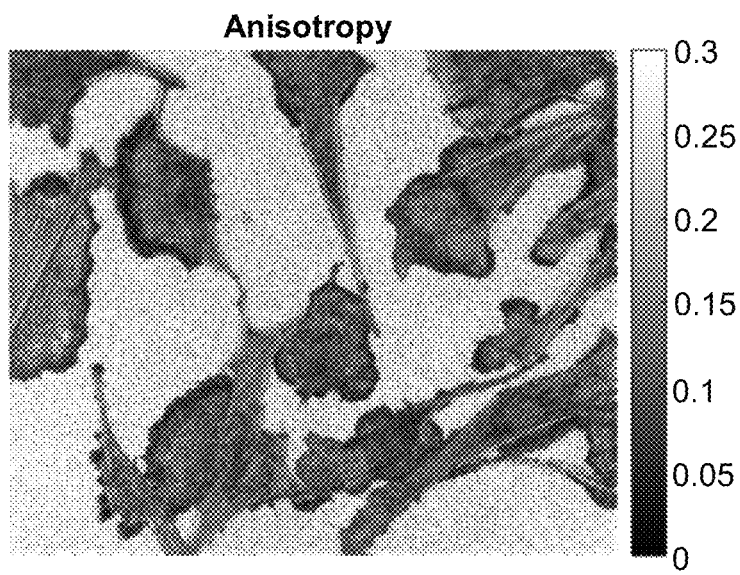
FIG. 24B shows an anisotropy image of fluorescent phalloidin-labeled actin filaments in fixed cells.
Figure 24C:
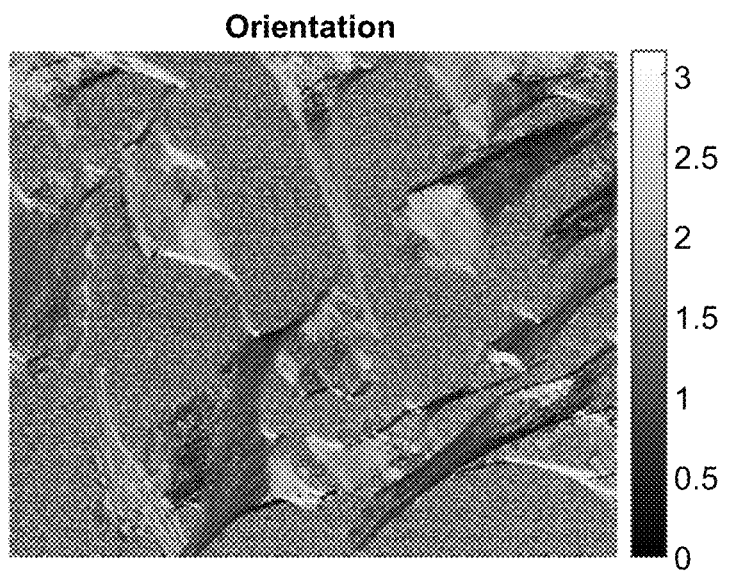
FIG. 24C shows an orientation image of fluorescent phalloidin-labeled actin filaments in fixed cells.

FIG. 24A shows an intensity image of fluorescent phalloidin-labeled actin filaments in fixed cells. FIG. 24B shows an anisotropy image of fluorescent phalloidin-labeled actin filaments in fixed cells. FIG. 24C shows an orientation image of fluorescent phalloidin-labeled actin filaments in fixed cells. Referring to FIG. 24A, the intensity image shows the spatial distribution of actin in the cells. Referring to FIG. 24B, actin filament bundles called stress fibers show high anisotropy. Disordered actin in lamellipodia has lower anisotropy. Referring to FIG. 24C, the measured orientation of anisotropic structures is given by the orientation of white lines in the image. The measured orientation of actin filaments follows the direction of the filament bundle, as is expected. Anisotropic actin found in lamellipodia does not have preferred orientation. Broadly, fluorescence anisotropy measurements can report on the rotational mobility of fluorescently labeled proteins and their orientation relative to a structure of interest.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system comprising:
   an illumination source;
   a specimen stage operable to support a specimen;
   imaging optics;
   a polarization state analyzer optically coupled to the imaging optics; and
   one or more processors in communication with the illumination source and the polarization state analyzer, the one or more processors configured to perform operations comprising:
   generating a plurality of illumination wavelengths;
   positioning the specimen at a plurality of specimen positions and orientations;
   receiving an array of multiple sets of polarization channels from the polarization state analyzer;
   receiving a calibration tensor associated with the imaging optics;
   converting the array of multiple sets of polarization channels into Stokes parameter maps;
   deconvolving the Stokes parameter maps to provide 3D density, 3D anisotropy, and 3D orientation measurements of the specimen at multiple wavelengths;
   denoising the Stokes parameter maps to sensitively detect changes in density, anisotropy, and orientation using data correlation across spatial and temporal dimensions; and
   segmenting specific structures from dispersion of density, anisotropy, and orientation from above measurements.

2. The system of claim 1 wherein an illumination numerical aperture of the system is operable to be adjusted relative to an imaging numerical NA of the system to increase contrast of the density, anisotropy, and orientation for the specimen.

3. The system of claim 1 wherein the polarization state analyzer comprises a set of four cameras, each camera of the set of four cameras being operable to image light in one of four distinct polarization states.

4. The system of claim 3 wherein the polarization state analyzer further comprises:
   a broadband non-polarizing beam splitter operable to direct light along a first optical path or a second optical path;
   a broadband first polarizing beam splitter disposed along the first optical path and operable to direct light having a first polarization state to a first lens and a first camera and light having a third polarization state orthogonal to the first polarization state to a third lens and a third camera;
   a broadband half wave plate disposed along the second optical path; and
   a broadband second polarizing beam splitter disposed along the second optical path and operable to direct light having a second polarization state to a second lens and a second camera and light having a fourth polarization state orthogonal to the second polarization state to a fourth lens and a fourth camera.

5. The system of claim 3 wherein the polarization state analyzer further comprises:
   a first broadband non-polarizing beam splitter operable to direct light along a first optical path or a second optical path;
   a second broadband non-polarizing beam splitter disposed along the first optical path and operable to direct light along the first optical path to a first lens and a first camera or along a third optical path to a third lens and a third camera;
   a third broadband non-polarizing beam splitter disposed along the second optical path and operable to direct light along the second optical path to a second lens and a second camera or along a fourth optical path to a fourth lens and a fourth camera; and
   a polarization modulator disposed in each of the first optical path, the second optical path, the third optical path, and the fourth optical path.

6. The system of claim 5 wherein the set of four cameras are operable to acquire a set of four polarization-channels with polarization states having distinct orientations and two ellipticities.

7. The system of claim 1 wherein the polarization state analyzer comprises a single camera having a polarization-resolved pixel format.

8. The system of claim 1 wherein each set of polarization channels includes a plurality of images associated with different axial positions of the specimen.

9. The system of claim 8 wherein the array of multiple sets of polarization channels is acquired with different illumination wavelengths.

10. The system of claim 8 wherein each set of polarization channels comprises:
    a first image obtained using light having a polarization state aligned with 0°;
    a second image obtained using light having a polarization state aligned with 45°;
    a third image obtained using light having a polarization state aligned with 90°; and
    a fourth image obtained using light having a polarization state aligned with 135°.

11. The system of claim 1 wherein converting the array of multiple sets of polarization channels into Stokes parameter maps comprises using an inverse of the calibration tensor.

12. The system of claim 1 wherein the specimen comprises primary cells from an organism, tissue from an organism, live small organism, clinical biopsy, cell culture, optical storage device including laser etched glass, or liquid crystalline material.

13. A method of measuring optical properties of a specimen, the method comprising:
    generating illumination light at a plurality of illumination wavelengths;

for each of the plurality of illumination wavelengths:
  directing the illumination light to impinge on the specimen;
  collecting sample light passing through the specimen; and
  detecting the collected sample light using a polarization state analyzer to form a set of polarization channels;
receiving a calibration tensor;
converting the set of polarization channels for each of the illumination wavelengths into Stokes parameter maps using the calibration tensor; and
deconvolving the Stokes parameter maps to provide density, anisotropy, and orientation measurements of the specimen.

14. The method of claim 13 further comprising:
translating the specimen;
collecting additional sample light passing through the specimen; and
detecting the collected additional sample light using the polarization state analyzer to form multiple sets of polarization channels.

15. The method of claim 14 wherein the specimen is disposed in an image plane and translating the specimen comprises motion orthogonal to the image plane.

16. The method of claim 13 wherein collecting sample light comprises focusing the sample light onto image sensors of the polarization state analyzer.

17. The method of claim 13 wherein the calibration tensor is associated with imaging optics.

18. The method of claim 13 wherein the specimen comprises primary cells from an organism, tissue from an organism, live small organism, clinical biopsy, cell culture, optical storage device including laser etched glass, or liquid crystalline material.

* * * * *